United States Patent
Sato

(10) Patent No.: US 12,113,976 B2
(45) Date of Patent: Oct. 8, 2024

(54) IMAGE ENCODING DEVICE AND METHOD AND IMAGE DECODING DEVICE AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 18/204,010

(22) Filed: May 31, 2023

(65) Prior Publication Data

US 2023/0308646 A1    Sep. 28, 2023

Related U.S. Application Data

(63) Continuation of application No. 17/887,884, filed on Aug. 15, 2022, now abandoned, which is a
(Continued)

(30) Foreign Application Priority Data

Mar. 21, 2013    (JP) .................................. 2013-058679

(51) Int. Cl.
*H04N 19/82*    (2014.01)
*H04N 19/105*    (2014.01)
(Continued)

(52) U.S. Cl.
CPC ......... *H04N 19/119* (2014.11); *H04N 19/105* (2014.11); *H04N 19/174* (2014.11);
(Continued)

(58) Field of Classification Search
CPC .. H04N 19/119; H04N 19/105; H04N 19/174; H04N 19/176; H04N 19/187; H04N 19/30; H04N 19/46; H04N 19/70
See application file for complete search history.

(56) References Cited

U.S. PATENT DOCUMENTS 6,173,013 B1    1/2001  Suzuki et al.
9,473,779 B2    10/2016  Rapaka et al.
(Continued)

FOREIGN PATENT DOCUMENTS

CN    102077594 A    5/2011
CN    102577390 A    7/2012
(Continued)

OTHER PUBLICATIONS

Benjamin Bross, et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, Jan. 14-23, 2013, pp. i-298, 12$^{th}$ Meeting: Geneva, CH.

(Continued)

*Primary Examiner* — Patrick E Demosky
(74) *Attorney, Agent, or Firm* — Paratus Law Group, PLLC

(57) ABSTRACT

The present disclosure relates to an image encoding device and method and an image decoding device and method, which are capable of suppressing an increase in encoding or decoding workload. A current layer of image data including a plurality of layers is encoded and/or decoded with reference to encoding-related information of some areas, of another layer encoded for each of a plurality of certain areas obtained by dividing a picture, according to control of control information used to control the certain area in which the encoding-related information of the other layer is referred to regarding the current layer of the image data. The present disclosure can be applied to image processing devices such as an image encoding device for performing scalable coding on image data and an image decoding device for decoding an encoded data obtained by performing scalable coding on image data.

15 Claims, 57 Drawing Sheets

Related U.S. Application Data continuation of application No. 17/237,661, filed on Apr. 22, 2021, now abandoned, which is a continuation of application No. 14/773,834, filed as application No. PCT/JP2014/056311 on Mar. 11, 2014, now abandoned.

(51) Int. Cl.

| H04N 19/119 | (2014.01) |
|---|---|
| H04N 19/174 | (2014.01) |
| H04N 19/176 | (2014.01) |
| H04N 19/187 | (2014.01) |
| H04N 19/30 | (2014.01) |
| H04N 19/46 | (2014.01) |
| H04N 19/70 | (2014.01) |

(52) U.S. Cl.
CPC ......... *H04N 19/176* (2014.11); *H04N 19/187* (2014.11); *H04N 19/30* (2014.11); *H04N 19/46* (2014.11); *H04N 19/70* (2014.11)

(56) References Cited

U.S. PATENT DOCUMENTS

| 2007/0086516 | A1 | 4/2007 | Lee et al. | |
|---|---|---|---|---|
| 2007/0133675 | A1 | 6/2007 | Honda et al. | |
| 2009/0010331 | A1 | 1/2009 | Jeon et al. | |
| 2009/0016621 | A1 | 1/2009 | Nakagawa et al. | |
| 2009/0074060 | A1 | 3/2009 | Kim et al. | |
| 2009/0147848 | A1 | 6/2009 | Park et al. | |
| 2009/0168872 | A1 | 7/2009 | Jeon et al. | |
| 2009/0252220 | A1 | 10/2009 | Choi et al. | |
| 2009/0296808 | A1 | 12/2009 | Regunathan et al. | |
| 2009/0310680 | A1 | 12/2009 | Jeon et al. | |
| 2010/0172412 | A1 | 7/2010 | Shimada et al. | |
| 2011/0243234 | A1 | 10/2011 | Kondo et al. | |
| 2012/0075436 | A1 | 3/2012 | Chen et al. | |
| 2014/0003504 | A1* | 1/2014 | Ugur | H04N 19/167 |
| | | | | 375/240.12 |
| 2014/0092985 | A1 | 4/2014 | Kim et al. | |
| 2014/0254669 | A1* | 9/2014 | Rapaka | H04N 19/503 |
| | | | | 375/240.12 |
| 2015/0103896 | A1 | 4/2015 | Kim et al. | |
| 2015/0237376 | A1 | 8/2015 | Alshina et al. | |
| 2015/0304667 | A1 | 10/2015 | Suehring et al. | |

FOREIGN PATENT DOCUMENTS

| CN | 102823253 A | 12/2012 |
|---|---|---|
| JP | H09-037260 A | 2/1997 |
| JP | 2001-346047 A | 12/2001 |
| JP | 2002-044671 A | 2/2002 |
| JP | 2006-014086 A | 1/2006 |
| JP | 2007-235314 A | 9/2007 |
| JP | 2008-543160 A | 11/2008 |
| JP | 2009-512342 A | 3/2009 |
| JP | 2009-538084 A | 10/2009 |
| JP | 2009-540666 A | 11/2009 |
| JP | 2009-540773 A | 11/2009 |
| JP | 5143829 B2 | 2/2013 |
| JP | 6607414 B2 | 11/2019 |
| KR | 10-2006-0122665 A | 11/2006 |
| KR | 10-2007-0076504 A | 7/2007 |
| WO | WO 2007/081189 A1 | 7/2007 |
| WO | WO 2008/030067 A1 | 3/2008 |
| WO | WO 2008/060262 A1 | 5/2008 |
| WO | WO 2010/001918 A1 | 1/2010 |
| WO | WO 2012/039936 A1 | 3/2012 |
| WO | WO 2012/105406 A1 | 8/2012 |
| WO | WO 2013/001730 A1 | 1/2013 |
| WO | WO 2014/107565 A1 | 7/2014 |

OTHER PUBLICATIONS

Kazushi Sato, SHVC: On Inter-layer Prediction, Joint Collaborative Team on Video Coding (JCT-VC) of ITU-T SG 16 WP 3 and ISO/IEC JTC 1/SC 29/WG 11, Jan. 14-23, 2013, pp. 1-5, 12$^{th}$ Meeting: Geneva, CH.

Oct. 4, 2016, EP communication issued for related EP application No. 14768731.3.

Kazushi Sato, AHG9: Inter-layer Prediction Signaling, Joint Collaborative Team on Video Coding (JCT-VC) of ITU-T SG 16 WP 3 and ISO/IEC JTC 1/SC 29/WG 11, 13$^{th}$ meeting, Apr. 18-26, Incheon, KR, pp. 1-6.

K. Ugur, M. Hannuksela, et al., Indication of inter-layer and motion constrained prediction constraints, Joint Collaborative Team on Video Coding (JCT-VC) of ITU-T SG 16 WP 3 and ISO/IEC JTC 1/SC 29/WG 11, 14$^{th}$ meeting, Jul. 25-Aug. 2, 2013, Vienna, AT, pp. 1-5.

Krishna Rapaka, et al., MV-HEVC/SHVC HLS: Parallel Processing Indications for Tiles in HEVC Extensions, Joint Collaborative Team on Video Coding (JCT-VC) of ITU-T SG 16 WP 3 and ISO/IEC JTC 1/SC 29/WG 11, 14$^{th}$ meeting, Jul. 25-Aug. 2, 2013, Vienna, AT, pp. 1-4.

Tzu-Der Chuang, et al., AHG9: Inter-layer prediction flag and inter-layer syntax prediction flag, Joint Collaborative Team on Video Coding (JCT-VC) of ITU-T SG 16 WP 3 and ISO/IEC JTC 1/SC 29/WG 11, 12$^{th}$ meeting, Jan. 14-23, 2013, Geneva, CH, pp. 1-5.

Do-Kyoung Kwon, et al., Description of scalable video coding technology proposal by Texas Instruments Inc., Joint Collaborative Team on Video Coding (JCT-VC) of ITU-T SG 16 WP 3 and ISO/IEC JTC 1/SC29/WG 11, 11$^{th}$ Meeting, Oct. 10-19, 2012, Shanghai, CN, pp. 1-44.

Chulkeun Kim, et al., Description of scalable video coding technology proposal by LG Electronics and MediaTek (differential coding mode on), Joint Collaborative Team on Video Coding (JCT-VC) of ITU-T SG 16 WP 3 and ISO/IEC JTC1/SC29/WG 11, 11th Meeting, Oct. 10-19, 2012, Shanghai, CN, pp. 1-38.

Kemal Ugur, et al., Motion and inter-layer prediction constrained SEI message, Joint Collaborative Team on Video Coding (JCT-VC) of ITU-T SG 16 WP 3 and ISO/IEC JTC 1/SC 29/WG 11, 14$^{th}$ Meeting, Jul. 25-Aug. 2, 2013, Vienna, AT, pp. 1-5.

Jan. 30, 2018, Chinese Office Action issued for related CN Application No. 201480015390.8.

Feb. 6, 2018, Japanese Office Action issue for related JP Application No. 2015-506710.

Chen et al, AHG7: Parallel decoding SEI message for MV-HEVC, Joint Collaborative Team on 3D Video Coding Extension Development of ITU-T SG 16 WP 3 and ISO/IEC JTC 1/SC 29/WG 11, 3$^{rd}$ Meeting, Jan. 17-23, 2013, pp. 1-5, Geneva, CH.

Jun. 5, 2018, Chinese Office Action issued for related CN Application No. 201610334412.8.

Aug. 20, 2018, European Summons issued for related EP application No. 14768731.3.

Schwarz et al., Overview of the Scalable Video Coding Extension of the H.264/AVC Standard, IEEE Transactions on Circuits and Systems for Video Technology, Sep. 2007, pp. 1103-1120, vol. 17, No. 9, IEEE.

Hendry et al., Inter layer prediction indication flags and pictures management, Joint Collaborative Team on Video Coding (JCT-VC) of ITU-T SG 16 WP 3 and ISO/IEC JTC 1/SC 29/WG 11, Jan. 14-23, 2013, pp. 1-6, 12$^{th}$ Meeting: Geneva, CH.

Feb. 28, 2019, Japanese Office Action issued for related JP Application No. 2018-084829.

Jun. 21, 2019, European Search Report issued for related EP Application No. 19173497.9.

Fuldseth, Replacing slices with tiles for high level parallelism, Joint Collaborative Team on Video Coding (JCT-VC) of ITU-T SG16 WP3 and ISO/IEC JTC1/SC29/WG11, Jan. 20-28, 2011, pp. 1-4, 4th Meeting: Daegu, KR.

\* cited by examiner

FIG. 12

| 0 | 1 | 2 |
|---|---|---|
| 3 | 4 | 5 |
| 6 | 7 | 8 |

FIG. 13

| pic_parameter_set_rbsp( ) { | Descriptor |
|---|---|
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_flag | u(1) |
|   cabac_init_present_flag | u(1) |
|   num_ref_idx_l0_default_active_minus1 | ue(v) |
|   num_ref_idx_l1_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   transquant_bypass_enable_flag | u(1) |
|   tiles_enabled_flag | u(1) |
|   entropy_coding_sync_enabled_flag | u(1) |
|   if( tiles_enabled_flag ) { | |
|     tile_setting_from_ref_layer_flag | u(1) |
|     if( !tile_setting_from_ref_layer_flag ) { | |
|       num_tile_columns_minus1 | ue(v) |
|       num_tile_rows_minus1 | ue(v) |
|       uniform_spacing_flag | u(1) |
| | |
|       if( !uniform_spacing_flag ) { | |
|         for( i = 0; i < num_tile_columns_minus1; i++ ) | |
|           column_width_minus1[ i ] | ue(v) |
|         for( i = 0; i < num_tile_rows_minus1; i++ ) | |
|           row_height_minus1[ i ] | ue(v) |
|       } | |

FIG. 14

| | |
|---|---|
| inter_layer_tile_prediction_restriction_flag | u(1) |
| if( inter_layer_tile_prediction_restriction_flag ) { | |
|   for( i=0; i < num_tile_columns_minus1; i++ ) | |
|     for( j=0; j < num_tile_rows_minus1; j++ ) { | |
|       num_ref_tiles_minus1 | ue(v) |
|       for( k=0; k < num_ref_tiles_minus1; k++ ) | |
|         ref_tile[k] | ue(v) |
|     } | |
| } | |
|   loop_filter_across_tiles_enabled_flag | u(1) |
| } | |
| loop_filter_across_slices_enabled_flag | u(1) |
| deblocking_filter_control_present_flag | u(1) |
| if( deblocking_filter_control_present_flag ) { | |
|   deblocking_filter_override_enabled_flag | u(1) |
|   pps_disable_deblocking_filter_flag | u(1) |
|   if( !pps_disable_deblocking_filter_flag ) { | |
|     pps_beta_offset_div2 | se(v) |
|     pps_tc_offset_div2 | se(v) |
|   } | |
| } | |
| pps_scaling_list_data_present_flag | u(1) |
| if( pps_scaling_list_data_present_flag ) | |
|   scaling_list_data( ) | |
| lists_modification_present_flag | u(1) |
| log2_parallel_merge_level_minus2 | ue(v) |
| slice_segment_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

FIG. 15

| slice_segment_header( ) { | Descriptor |
|---|---|
|   first_slice_segment_in_pic_flag | u(1) |
|   if( RapPicFlag ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for ( i = 0; i < num_extra_slice_header_bits; i++ ) | |
|       slice_reserved_undetermined_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps && num_long_term_ref_pics_sps > 1 ) | |
|             lt_idx_sps[ i ] | u(v) |
|           else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
|       if( sps_temporal_mvp_enable_flag ) | |
|         slice_temporal_mvp_enable_flag | u(1) |
|       } | |
|     if( sample_adaptive_offset_enabled_flag ) { | |
|       slice_sao_luma_flag | u(1) |
|       slice_sao_chroma_flag | u(1) |

FIG. 16

| | |
|---|---|
| } | |
| if( slice_type == P \|\| slice_type == B ) { | |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| if( lists_modification_present_flag && NumPocTotalCurr > 1 ) | |
| ref_pic_lists_modification( ) | |
| if( slice_type == B ) | |
| mvd_l1_zero_flag | u(1) |
| if( cabac_init_present_flag ) | |
| cabac_init_flag | u(1) |
| if( slice_temporal_mvp_enable_flag ) { | |
| if( slice_type == B ) | |
| collocated_from_l0_flag | u(1) |
| if( ( collocated_from_l0_flag && num_ref_idx_l0_active_minus1 > 0 ) <br> \|\| ( !collocated_from_l0_flag && <br>     num_ref_idx_l1_active_minus1 > 0 ) ) <br> [Ed. (GJS): Does the logic of this condition check make sense when the slice is not a B slice? (YK): No perfectly, as the value of num_ref_idx_l1_active_minus1 is not inferred for a P slice, though it could also be interpreted that the check of the value of num_ref_idx_l1_active_minus1 is not needed for P slices as the value of collocated_from_l0_flag has to be equal to 1.] | |
| collocated_ref_idx | ue(v) |
| } | |
| if( ( weighted_pred_flag && slice_type == P) \|\| <br>   ( weighted_bipred_flag && slice_type == B ) ) | |
| pred_weight_table( ) | |
| five_minus_max_num_merge_cand | ue(v) |
| } | |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( deblocking_filter_control_present_flag ) { | |
| if( deblocking_filter_override_enabled_flag ) | |
| deblocking_filter_override_flag | u(1) |
| if( deblocking_filter_override_flag ) { | |
| slice_disable_deblocking_filter_flag | u(1) |
| if( !slice_disable_deblocking_filter_flag ) { | |
| slice_beta_offset_div2 | se(v) |
| slice_tc_offset_div2 | se(v) |
| } | |
| } | |
| } | |

FIG. 17

| | |
|---|---|
| if( loop_filter_across_slices_enabled_flag && | |
| ( slice_sao_luma_flag \|\| slice_sao_chroma_flag \|\| | |
| !slice_disable_deblocking_filter_flag ) ) | |
|   slice_loop_filter_across_slices_enabled_flag | u(1) |
| } | |
| if( tiles_enabled_flag \|\| entropy_coding_sync_enabled_flag ) { | |
|   num_entry_point_offsets | ue(v) |
|   inter_layer_tile_prediction_restriction_flag | u(1) |
|   if( num_entry_point_offsets > 0 ) { | |
|     offset_len_minus1 | ue(v) |
|     for( i = 0; i < num_entry_point_offsets; i++ ) { | |
|       entry_point_offset_minus1[ i ] | u(v) |
|       if( inter_layer_tile_prediction_restriction_flag ) { | |
|         num_ref_tiles_minus1 | ue(v) |
|         for( j=0; j < num_ref_tiles_minus1; j++) | |
|           ref_tile[j] | ue(v) |
|       } | |
|     } | |
|   } | |
| } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
| } | |
| byte_alignment( ) | |
| } | |

FIG. 50

IMAGE ENCODING DEVICE AND METHOD AND IMAGE DECODING DEVICE AND METHOD

CROSS REFERENCE TO PRIOR APPLICATION

This application is a continuation of U.S. patent application Ser. No. 17/887,884 (filed on Aug. 15, 2022), which is a continuation of U.S. patent application Ser. No. 17/237,661 (filed on Apr. 22, 2021), which is a continuation of U.S. patent application Ser. No. 14/773,834 (filed on Sep. 9, 2015), which is a National Stage patent Application of PCT International Patent Application No. PCT/JP2014/056311 (filed on Mar. 11, 2014) under 35 U.S.C. § 371, which claims priority to Japanese Patent Application No. 2013-058679 (filed on Mar. 21, 2013), which are all hereby incorporated by reference in their entirety.

TECHNICAL FIELD

The present disclosure relates to an image encoding device and method and an image decoding device and method, and more particularly, to an image encoding device and method and an image decoding device and method, which are capable of suppressing an increase in encoding or decoding workload.

BACKGROUND ART

Recently, devices for compressing and encoding an image by adopting a encoding scheme of handling image information digitally and performing compression by an orthogonal transform such as a discrete cosine transform and motion compensation using image information-specific redundancy for the purpose of information transmission and accumulation with high efficiency when the image information is handled digitally have become widespread. Moving Picture Experts Group (MPEG) and the like are examples of such encoding schemes.

Particularly, MPEG 2 (ISO/IEC 13818-2) is a standard that is defined as a general-purpose image encoding scheme, and covers interlaced scan images, progressive scan images, standard resolution images, and high definition images. For example, MPEG 2 is now being widely used in a wide range of applications such as professional use and consumer use. Using the MPEG 2 compression scheme, for example, in the case of an interlaced scan image of a standard resolution having 720×480 pixels, a coding amount (bit rate) of 4 to 8 Mbps is allocated. Further, using the MPEG 2 compression scheme, for example, in the case of an interlaced scan image of a high resolution having 1920×1088 pixels, a coding amount (bit rate) of 18 to 22 Mbps is allocated. Thus, it is possible to implement a high compression rate and a preferable image quality.

MPEG 2 is mainly intended for high definition coding suitable for broadcasting but does not support an encoding scheme having a coding amount (bit rate) lower than that of MPEG 1, that is, an encoding scheme of a high compression rate. With the spread of mobile terminals, it is considered that the need for such an encoding scheme will increase in the future, and thus an MPEG 4 encoding scheme has been standardized. An international standard for an image encoding scheme was approved as ISO/IEC 14496-2 in December, 1998.

Further, in recent years, standards such as H.26L (International Telecommunication Union Telecommunication Standardization Sector Q6/16 Video Coding Expert Group (ITU-T Q6/16 VCEG)) for the purpose of image encoding for video conferences have been standardized. H.26L requires a larger computation amount for encoding and decoding than in existing encoding schemes such as MPEG 2 or MPEG 4, but is known to implement high encoding efficiency. Further, currently, as one activity of MPEG 4, standardization of incorporating even a function that is not supported in H.26L and implementing high encoding efficiency based on H.26L has been performed as a Joint Model of Enhanced-Compression Video Coding.

As a standardization schedule, an international standard called H.264 and MPEG-4 Part10 (Advanced Video Coding (hereinafter referred to as "AVC") was established in March, 2003.

Furthermore, as an extension of H.264/AVC, Fidelity Range Extension (FRExt) including an encoding tool necessary for professional use such as RGB or 4:2:2 or 4:4:4 or 8×8 DCT and a quantization matrix which are specified in MPEG-2 was standardized in February, 2005. As a result. H.264/AVC has become an encoding scheme capable of also expressing film noise included in movies well and is being used in a wide range of applications such as Blu-Ray Discs (trademark).

However, in recent years, there is an increasing need for high compression rate encoding capable of compressing an image of about 4000×2000 pixels, which is 4 times that of a high-definition image, or delivering a high-definition image in a limited transmission capacity environment such as the Internet. To this end, improvements in encoding efficiency have been under continuous review by Video Coding Experts Group (VCEG) under ITU-T.

In this regard, currently, in order to further improve the encoding efficiency to be higher than in AVC, Joint Collaboration Team-Video Coding (JCTVC), which is a joint standardization organization of ITU-T and ISO/IEC, has been standardizing an encoding scheme called High Efficiency Video Coding (HEVC). A committee draft that is a draft specification for the HEVC standard was issued in January, 2013 (see Non-Patent Literature 1).

In HEVC, it is possible to perform parallel processing based on a tile or wavefront parallel processing in addition to a slice that is also defined in AVC.

Moreover, the existing image encoding schemes such as MPEG-2 and AVC have a scalability function of dividing an image into a plurality of layers and encoding the plurality of layers.

In other words, for example, for a terminal having a low processing capability such as a mobile phone, image compression information of only a base layer is transmitted, and a moving image of low spatial and temporal resolutions or a low quality is reproduced, and for a terminal having a high processing capability such as a television or a personal computer, image compression information of an enhancement layer as well as a base layer is transmitted, and a moving image of high spatial and temporal resolutions or a high quality is reproduced. That is, image compression information according to a capability of a terminal or a network can be transmitted from a server without performing the transcoding process.

CITATION LIST

Non-Patent Literature

Non-Patent Literature 1: Benjamin Bross, Woo-Jin Han, Gary J. Sullivan, Jens-Rainer Ohm, Gary J. Sullivan, Ye-Kui Wang, Thomas Wiegand, "High Efficiency Video Coding (HEVC) text specification draft 10 (for FDIS & Consent)," JCTVC-L1003_v4, Joint Collaborative Team on Video Coding (JCT-VC) of ITU-T SG 16 WP 3 and ISO/IEC JTC 1/SC 29/WG 11 12th Meeting: Geneva. CH, 14-23 Jan. 2013

SUMMARY OF INVENTION

Technical Problem

However, in the method of the related art, when encoding-related information of the base layer such as decoded image information or the motion information is referred to in encoding and decoding of the enhancement layer, the entire picture of the base layer was a target for reference.

For this reason, workload was likely to increase, for example, in encoding and decoding of the enhancement layer, the number of memory accesses for referring to the encoding-related information of the base layer increases.

The present disclosure has been made in light of the foregoing, and it is desirable to suppress an increase in encoding or decoding workload.

Solution to Problem

According to an embodiment of the present technology, there is provided an image encoding device including: a generation section configured to generate control information used to control a certain area in which encoding-related information, of another layer encoded for each of a plurality of certain areas obtained by dividing a picture, is referred to regarding a current layer of image data including a plurality of layers; an encoding section configured to encode the current layer of the image data with reference to the encoding-related information of some areas of the other layer according to control of the control information generated by the generation section; and a transmission section configured to transmit encoded data of the image data generated by the encoding section and the control information generated by the generation section.

The control information may be information limiting an area in which the encoding-related information is referred to by designating an area in which reference to the encoding-related information of the other layer is permitted, designating an area in which reference to the encoding-related information is prohibited, or designating an area in which the encoding-related information is referred to.

The control information may designate the area using an identification number allocated in a raster scan order, information indicating positions of the area in vertical and horizontal directions in a picture, or information indicating a data position of the area in the encoded data.

The transmission section may further transmit information indicating whether or not to control an area in which the encoding-related information is referred to.

The encoding-related information may be information used for generation of a prediction image used in encoding of the image data.

The information used for the generation of the prediction image may include information used for texture prediction of the image data and information used for syntax prediction of the image data. The control information may be information used to independently control an area in which the information used for the texture prediction is referred to and an area in which the information used for the syntax prediction is referred to.

The generation section may generate the control information for each of the plurality of certain areas obtained by dividing the picture of the current layer of the image data. The encoding section may encode the current layer of the image data with reference to the encoding-related information of some areas of the other layer for each of the areas according to control of the control information of each area generated by the generation section.

The transmission section may further transmit information indicating whether or not an area division of the current layer is similar to an area division of the other layer.

The area may be a slice or a tile of the image data.

According to an embodiment of the present technology, there is provided an image encoding method including: generating control information used to control a certain area in which encoding-related information, of another layer encoded for each of a plurality of certain areas obtained by dividing a picture, is referred to regarding a current layer of image data including a plurality of layers; encoding the current layer of the image data with reference to the encoding-related information of some areas of the other layer according to control of the generated control information; and transmitting encoded data generated by encoding the image data and the generated control information.

According to another embodiment of the present technology, there is provided an image decoding device including: a reception section configured to receive encoded data of a current laver of image data including a plurality of layers and control information used to control a certain area in which encoding-related information, of another layer encoded for each of a plurality of certain areas obtained by dividing a picture of the image data, is referred to; and a decoding section configured to decode the encoded data with reference to the encoding-related information of some areas of the other layer according to control of the control information received by the reception section.

The control information may be information limiting an area in which the encoding-related information is referred to by designating an area in which reference to the encoding-related information of the other layer is permitted, designating an area in which reference to the encoding-related information is prohibited, or designating an area in which the encoding-related information is referred to.

The control information may designate the area using an identification number allocated in a raster scan order, information indicating positions of the area in vertical and horizontal directions in a picture, or information indicating a data position of the area in the encoded data.

The reception section may further receive information indicating whether or not to control an area in which the encoding-related information is referred to.

The encoding-related information may be information used for generation of a prediction image used in decoding of the encoded data.

The information used for the generation of the prediction image may include information used for texture prediction of the image data and information used for syntax prediction of the image data. The control information may be information used to independently control an area in which the information used for the texture prediction is referred to and an area in which the information used for the syntax prediction is referred to.

The reception section may receive the encoded data encoded for each of the plurality of certain areas obtained by dividing the picture of the current layer of the image data and the control information of each of the areas. The decoding section may decode the encoded data received by the reception section with reference to the encoding-related information of some areas of the other layer for each of the areas according to control of the control information of each area.

The reception section may further receive information indicating whether or not an area division of the current layer is similar to an area division of the other layer.

The area may be a slice or a tile of the image data.

According to another embodiment of the present technology, there is provided an image decoding method including: receiving encoded data of a current layer of image data including a plurality of layers and control information used to control a certain area in which encoding-related information, of another layer encoded for each of a plurality of certain areas obtained by dividing a picture of the image data, is referred to; and decoding the encoded data with reference to the encoding-related information of some areas of the other layer according to control of the received control information.

According to one aspect of the present technology, control information used to control an area in which encoding-related information, of another layer encoded for each of a plurality of certain areas obtained by dividing a picture, is referred to regarding a current layer of image data including a plurality of layers is generated, the current layer of the image data is encoded with reference to the encoding-related information of some areas of the other layer according to control of the generated control information, and encoded data generated by encoding the image data and the generated control information is transmitted.

According to another aspect of the present technology, encoded data of a current layer of image data including a plurality of layers and control information used to control an area in which encoding-related information, of another layer encoded for each of a plurality of certain areas obtained by dividing a picture of the image data, is referred to are received, and the encoded data is decoded with reference to the encoding-related information of some areas of the other layer according to control of the received control information.

Advantageous Benefits of Invention

According to the present disclosure, it is possible to encode and decode an image. Particularly, it is possible to suppress an increase in encoding or decoding workload.

BRIEF DESCRIPTION OF DRAWINGS

FIG. 12 is a diagram for describing an example of a method of allocating an identification number of a tile.

FIG. 13 is a diagram for describing an example of syntax of a picture parameter set.

FIG. 14 is a continuation from FIG. 13 for describing an example of syntax of a picture parameter set.

FIG. 15 is a diagram for describing an example of syntax of a slice header.

FIG. 16 is a continuation from FIG. 15 for describing an example of syntax of a slice header.

FIG. 17 is a continuation from FIG. 16 for describing an example of syntax of a slice header.

FIG. 50 is an explanatory diagram illustrating a specific example of an MPD.

DESCRIPTION OF EMBODIMENTS

Hereinafter, modes (hereinafter, referred to as "embodiments") for carrying out the present disclosure will be described. A description will proceed in the following order.

1. Main description of present technology
2. First embodiment (image encoding device)
3. Second embodiment (image decoding device)
4. Third embodiment (multi-view image encoding device and multi-view image decoding device)
5. Fourth embodiment (computer)
6. Application examples
7. Application examples of scalable coding
8. Fifth embodiment (set, unit, module, and processor)
9. Application example of content reproducing system of MPEG-DASH
10. Application example of wireless communication system of Wi-Fi standard 1. Main Description for Present Technology Overview

[Encoding Scheme]

Hereinafter, the present technology will be described in connection with an application to image encoding and decoding of a High Efficiency Video Coding (HEVC) scheme.

<Coding Unit>

In an Advanced Video Coding (AVC) scheme, a hierarchical structure based on a macroblock and a sub macroblock is defined. However, a macroblock of 16×16 pixels is not optimal for a large image frame such as a Ultra High Definition (UHD) (4000×2000 pixels) serving as a target of a next generation encoding scheme.

Figure 1:
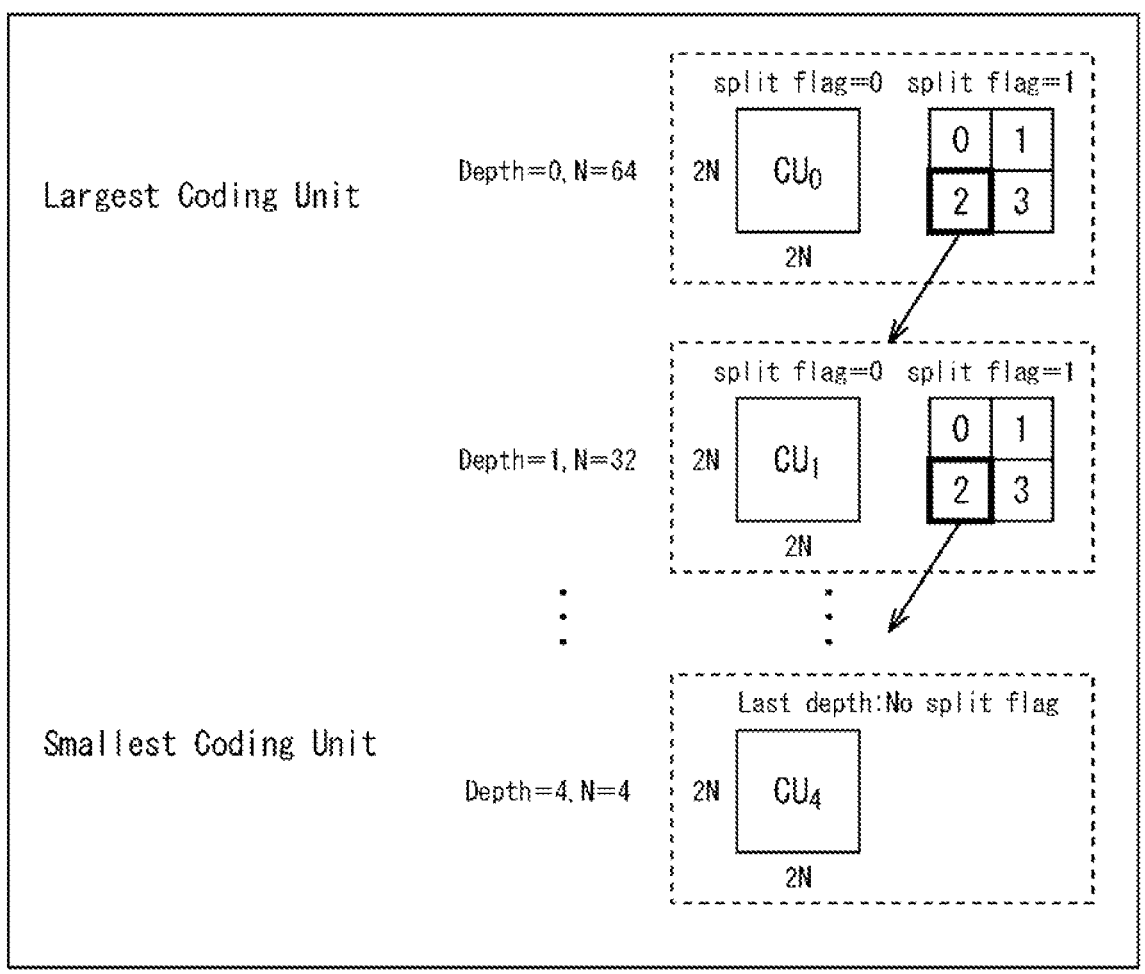
FIG. 1 is a diagram for describing an example of a configuration of a coding unit.

On the other hand, in the HEVC scheme, a coding unit (CU) is defined as illustrated in FIG. 1.

A CU is also referred to as a coding tree block (CTB), and serves as a partial area of an image of a picture unit undertaking a similar role of a macroblock in the AVC scheme. The latter is fixed to a size of 16×16 pixels, but the former is not fixed to a certain size but designated in image compression information in each sequence.

For example, a largest coding unit (LCU) and a smallest coding unit (SCU) of a CU are specified in a sequence parameter set (SPS) included in encoded data to be output. As split-flag=1 is set in a range in which each LCU is not smaller than an SCU, a coding unit can be divided into CUs having a smaller size. In the example of FIG. 1, a size of an LCU is 128, and a largest scalable depth is 5. A CU of a size of 2N×2N is divided into CUs having a size of N×N serving as a layer that is one-level lower when a value of split_flag is 1.

Further, a CU is divided in prediction units (PUs) that are areas (partial areas of an image of a picture unit) serving as processing units of intra or inter prediction, and divided into transform units (TUs) that are areas (partial areas of an image of a picture unit) serving as processing units of orthogonal transform. Currently, in the HEVC scheme, in addition to 4×4 and 8×8, orthogonal transform of 16×16 and 32×32 can be used.

As in the HEVC scheme, in the case of an encoding scheme in which a CU is defined and various kinds of processes are performed in units of CUs, in the AVC scheme, a macroblock can be considered to correspond to an LCU, and a block (sub block) can be considered to correspond to a CU. Further, in the AVC scheme, a motion compensation block can be considered to correspond to a PU. However, since a CU has a hierarchical structure, a size of an LCU of a topmost layer is commonly set to be larger than a macroblock in the AVC scheme, for example, such as 128×128 pixels.

Thus, hereinafter, an LCU is assumed to include a macroblock in the AVC scheme, and a CU is assumed to include a block (sub block) in the AVC scheme. In other words, a "block" used in the following description indicates an arbitrary partial area in a picture, and, for example, a size, a shape, and characteristics thereof are not limited. In other words, a "block" includes an arbitrary area (a processing unit) such as a TU, a PU, an SCU, a CU, an LCU, a sub block, a macroblock, or a slice. Of course, a "block" includes other partial areas (processing units) as well. When it is necessary to limit a size, a processing unit, or the like, it will be appropriately described.

<Mode Selection>

Moreover, in the AVC and HEVC encoding schemes, in order to achieve high encoding efficiency, it is important to select an appropriate prediction mode.

As an example of such a selection method, there is a method implemented in reference software (found at http:// iphome.hhi.de/suehring/tml/index.htm) of H.264/MPEG-4 AVC called a joint model (JM).

In the JM, as will be described later, it is possible to select two mode determination methods, that is, a high complexity mode and a low complexity mode. In both modes, cost function values related to respective prediction modes are calculated, and a prediction mode having a smaller cost function value is selected as an optimal mode for a corresponding block or macroblock.

A cost function in the high complexity mode is represented as in the following Formula (1):

[Math. 1]

$$\text{Cost}(\text{Mode} \in \Omega) = D + \lambda^* R \quad (1)$$

Here, $\Omega$ indicates a universal set of candidate modes for encoding a corresponding block or macroblock, and D indicates differential energy between a decoded image and an input image when encoding is performed in a corresponding prediction mode. $\lambda$ indicates Lagrange's undetermined multiplier given as a function of a quantization parameter. R indicates a total coding amount including an orthogonal transform coefficient when encoding is performed in a corresponding mode.

In other words, in order to perform encoding in the high complexity mode, it is necessary to perform a temporary encoding process once by all candidate modes in order to calculate the parameters D and R, and thus a large computation amount is required.

A cost function in the low complexity mode is represented by the following Formula (2):

[Math. 2]

$$\text{Cost}(\text{Mode} \in \Omega) = D + QP2\text{Quant}(QP)^*\text{HeaderBit} \quad (2)$$

Here, D is different from that of the high complexity mode and indicates differential energy between a prediction image and an input image. QP2Quant (QP) is given as a function of a quantization parameter QP, and HeaderBit indicates a coding amount related to information belonging to a header such as a motion vector or a mode including no orthogonal transform coefficient.

In other words, in the low complexity mode, it is necessary to perform a prediction process for respective candidate modes, but since a decoded image is not necessary, it is unnecessary to perform an encoding process. Thus, it is possible to implement a computation amount smaller than that in the high complexity mode.

<Scalable Coding>

Figure 2:
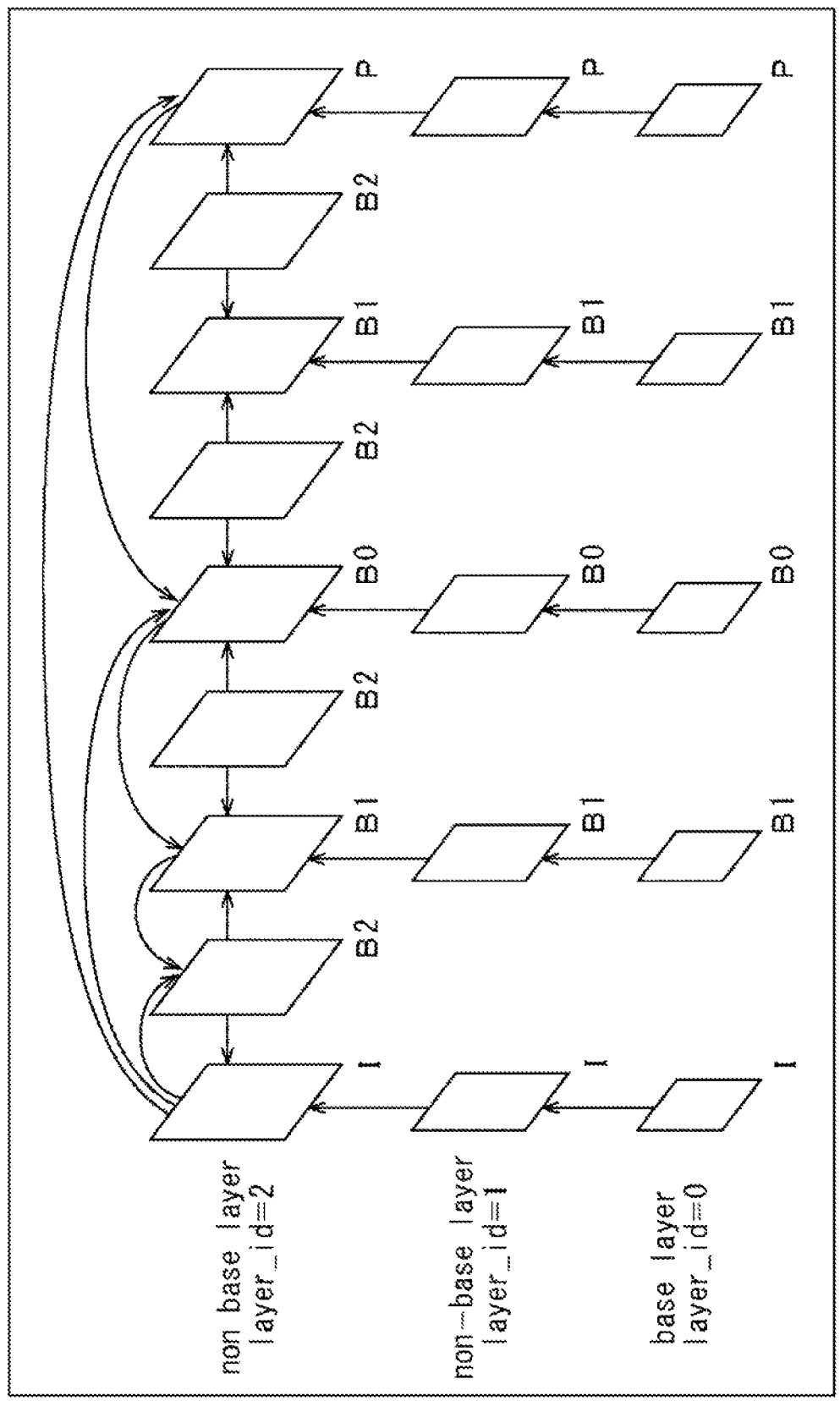
FIG. 2 is a diagram illustrating an example of a scalable layered image encoding scheme.

Moreover, the existing image encoding schemes such as MPEG2 and AVC have a scalability function. Scalable coding refers to a scheme of dividing (hierarchizing) an image into a plurality of layers and performing encoding for each layer. FIG. 2 is a diagram illustrating an example of a layered image encoding scheme.

As illustrated in FIG. 2, in hierarchization of an image, one image is divided into a plurality of layers based on a certain parameter with a scalability function. In other words, a hierarchized image (a layered image) includes a plurality of layers that differs in a value of a certain parameter. The plurality of layers of the layered image is configured with a base layer on which encoding and decoding are performed using only an image of its own layer without using an image of another layer and a non-base layer (which is also referred to as an "enhancement layer") on which encoding and decoding are performed using an image of another layer. For the non-base layer, an image of the base layer may be used, and an image of another non-base layer may be used.

Generally, in order to reduce the redundancy, the non-base layer is configured with data (differential data) of a differential image between an image of its own and an image of another layer. For example, when one image is hierarchized into two layers, that is, the base layer and the non-base layer (also referred to as an "enhancement layer"), an image of a lower quality than an original image is obtained using only data of the base layer, and an original image (that is, a high-quality image) is obtained by combining data of the base layer with data of the enhancement layer.

As an image is hierarchized as described above, it is possible to obtain images of various qualities according to the situation. For example, for a terminal having a low processing capability such as a mobile phone, image compression information of only a base layer is transmitted, and a moving image of low spatial and temporal resolutions or a low quality is reproduced, and for a terminal having a high processing capability such as a television or a personal computer, image compression information of an enhancement layer as well as a base layer is transmitted, and a moving image of high spatial and temporal resolutions or a high quality is reproduced. In other words, image compression information according to a capability of a terminal or a network can be transmitted from a server without performing the transcoding process.

<Scalable Parameter>

Figure 3:
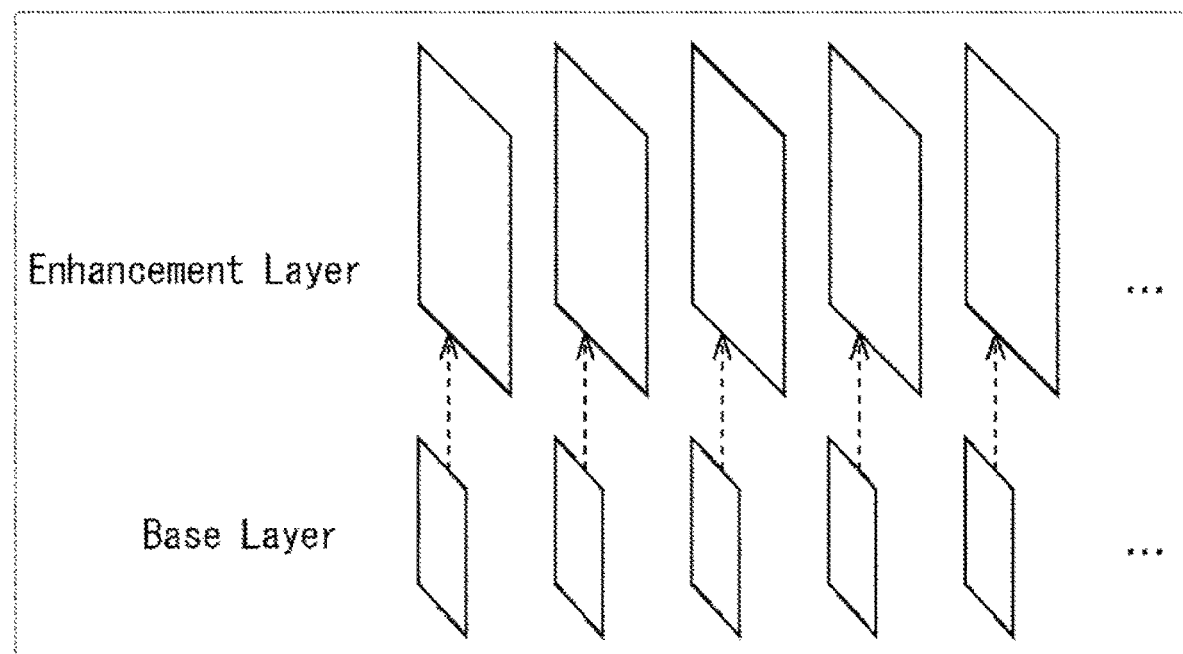
FIG. 3 is a diagram for describing an example of spatial scalable coding.

In such layered image encoding and layered image decoding (scalable encoding and scalable decoding), a parameter with a scalability function is arbitrary. For example, spatial resolution as illustrated in FIG. 3 may be its parameter (spatial scalability). When the spatial scalability differs, respective layers have different resolutions of an image. In other words, each picture is hierarchized into two layers, that is, a base layer of a resolution spatially lower than that of an original image and an enhancement layer that is combined with an image of the base layer to obtain an original image (an original spatial resolution) as illustrated in FIG. 3. Of course, the number of layers is an example, and each picture can be hierarchized into an arbitrary number of layers.

Figure 4:
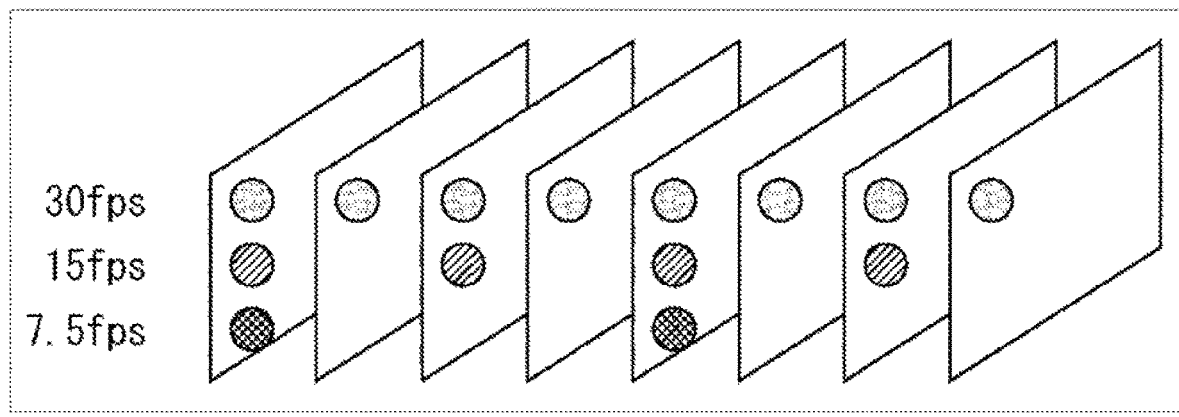
FIG. 4 is a diagram for describing an example of temporal scalable coding.

As another parameter having such scalability, for example, a temporal resolution (temporal scalability) as illustrated in FIG. 4 may be applied. In the case of the temporal scalability, respective layers have different frame rates. In other words, in this case, each picture is hierarchized into layers having different frame rates, a moving image of a high frame rate can be obtained by combining a layer of a high frame rate with a layer of a low frame rate, and an original moving image (an original frame rate) can be obtained by combining all the layers as illustrated in FIG. 4. The number of layers is an example, and each picture can be hierarchized into an arbitrary number of layers.

Figure 5:
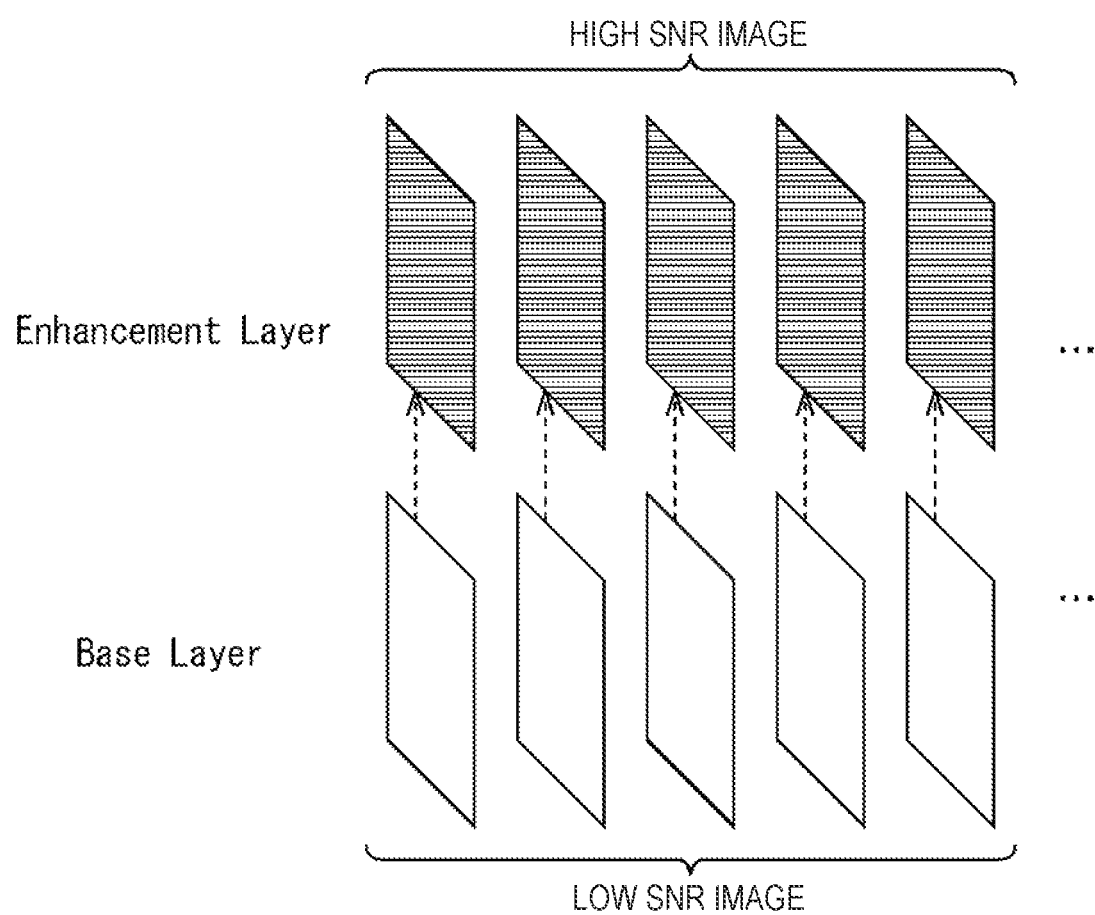
FIG. 5 is a diagram for describing an example of scalable coding of a signal to noise ratio.

Further, as another parameter having such scalability, for example, there is a signal-to-noise ratio (SNR) (SNR scalability). In the case of the SNR scalability, respective layers having different SNRs. In other words, in this case, each picture is hierarchized into two layers, that is, a base layer of an SNR lower than that of an original image and an enhancement layer that is combined with an image of the base layer to obtain an original SNR as illustrated in FIG. 5. In other words, for base layer image compression information, information related to an image of a low PSNR is transmitted, and a high PSNR image can be reconstructed by combining the information with the enhancement layer image compression information. Of course, the number of layers is an example, and each picture can be hierarchized into an arbitrary number of layers.

A parameter other than the above-described examples may be applied as a parameter having scalability. For example, there is bit-depth scalability in which the base layer includes an 8-bit image, and a 10-bit image can be obtained by adding the enhancement layer to the base layer.

Further, there is chroma scalability in which the base layer includes a component image of a 4:2:0 format, and a component image of a 4:2:2 format can be obtained by adding the enhancement layer to the base layer.

<Area Division>

Moreover, in HEVC, it is possible to perform parallel processing based on a tile or wavefront parallel processing in addition to a slice that is also defined in AVC.

Figure 6:
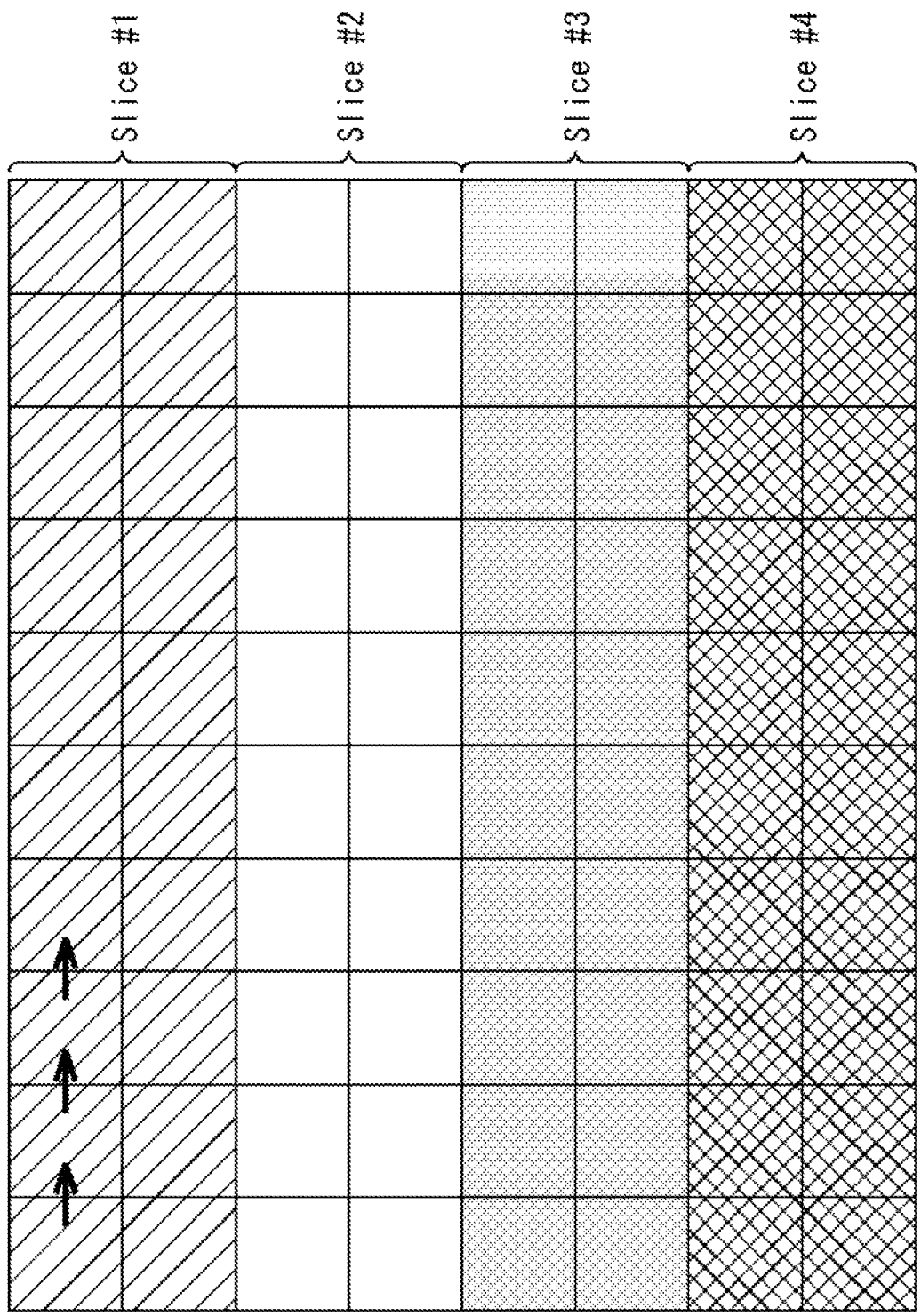
FIG. 6 is a diagram for describing an example of a slice.

FIG. 6 is a diagram illustrating an example of a slice defined in HEVC. Similarly to that of AVC, a slice is a unit in which an encoding process is performed in a raster scan order, and includes a plurality of areas obtained by dividing a picture as illustrated in FIG. 6. Here, in HEVC, slice division can be performed only in units of LCUs. In FIG. 6, the entire square indicates a picture, and a small square indicates an LCU. Further, groups of LCUs having different patterns indicate slices. For example, a slice including LCUs of first and second lines from the top which is indicated by a hatched pattern is a first slice (Slice #1) of the picture. A slice including LCUs of third and fourth lines from the top which is indicated by a white background is a second slice (Slice #2) of the picture. A slice including LCUs of fifth and six lines from the top which is indicated by a gray background is a third slice (Slice #3) of the picture. A slice including LCUs of seventh and eighth lines from the top which is indicated by a mesh pattern is a fourth slice (Slice #4) of the picture. Of course, the number of slices or LCUs formed in the picture and a slice division method are arbitrary and not limited to the example of FIG. 6.

Figure 7:
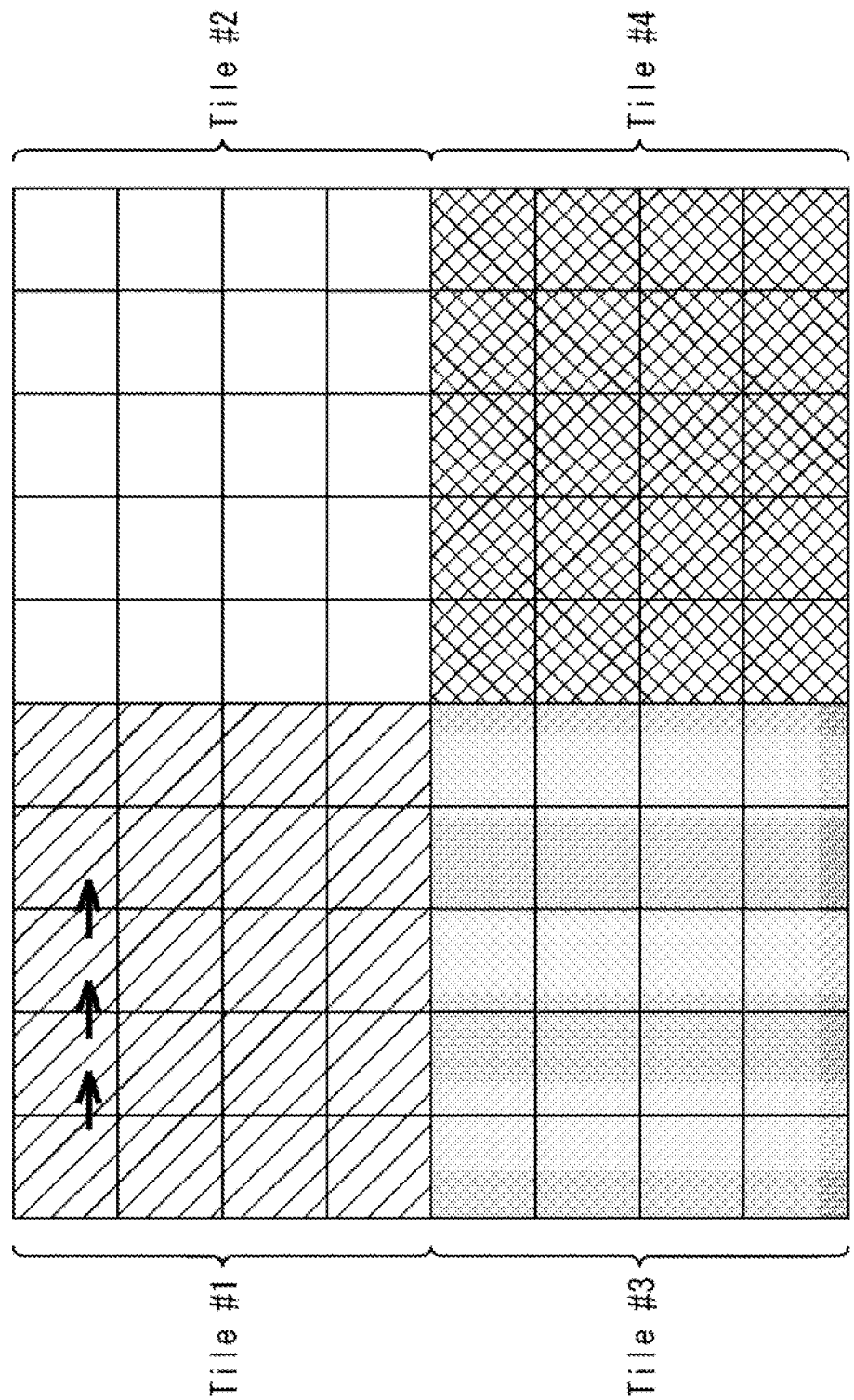
FIG. 7 is a diagram for describing an example of a tile.

FIG. 7 illustrates an example of a tile defined in HEVC. A tile is an area obtained by dividing a picture in units of LCUs, similarly to a slice. However, a slice is an area obtained by dividing a picture so that LCUs are processed in a raster scan order, whereas a tile is an area obtained by dividing a picture into arbitrary rectangles as illustrated in FIG. 7.

In FIG. 7, the entire square indicates a picture, and a small square indicates an LCU. Further, groups of LCUs having different patterns indicate tiles. For example, a slice including 4×4 LCUs on the upper left which is indicated by a hatched pattern is a first tile (Tile #1) of the picture. A tile including 4×4 LCUs on the upper right which is indicated by a white background is a second tile (Tile #2) of the picture. A tile including 4×4 LCUs on the lower left which is indicated by a gray background is a third tile (Tile #3) of the picture. A tile including 4×4 LCUs on the lower right which is indicated by a mesh pattern is a fourth tile (Tile #4) of the picture. Of course, the number of tiles or LCUs formed in the picture and a tile division method are arbitrary and not limited to the example of FIG. 7.

In each tile formed as described above, the LCUs are processed in the raster scan order. Since the tile has a shorter boundary length than the slice, the tile has a characteristic in which a decrease in encoding efficiency by screen division is small.

The slices or tiles divided as described above can be processed independently of one another since there is no dependence relation of prediction, CABAC, or the like in encoding or decoding. In other words, for example, data of slices (or tiles) can be processed in parallel using different central processing units (CPUs) (or different cores).

<Area Division in Scalable Coding>

Moreover, in the scalable coding, encoding-related information of the base layer can be used in encoding of the enhancement layer. Content of the encoding-related information is arbitrary, but includes, for example, texture information such as a decoded image, syntax information such as the motion information or the intra prediction mode information, and the like.

In the scalable coding, after the picture of the base layer is encoded, the picture of the enhancement layer corresponding to the picture is encoded with reference to the encoding-related information of the base layer. In other words, after the base layer is encoded, the obtained encoding-related information of the base layer is supplied and appropriately used for encoding of the enhancement layer. The decoding is also performed in a similar procedure.

However, in the method of the related art, there was no method of controlling an area serving as a reference destination of the encoding-related information in the encoding and decoding of the enhancement layer as described above. In other words, for example, even when the encoding-related information differed by area, the entire picture of the base layer was consistently used as a reference target. For this reason, since even an area that need not be used as the reference destination apparently in the picture of the base layer is used as the reference target, the number of memory accesses and the like unnecessarily increase, and thus the workload of the encoding and decoding of the enhancement layer was likely to unnecessarily increase.

Further, even in the scalable coding, by removing a processing dependence relation between areas such as the slice or the tile as described above, it is possible to perform a process of each area independently and thus perform processes of the areas in parallel. In other words, in this case, it is possible to sequentially perform the encoding and decoding of the base layer and the encoding and decoding of the enhancement layer for each area.

However, when the encoding-related information of the base layer is referred to in the encoding and decoding of the enhancement layer, in the method of the related art, the entire picture is used as the reference target, and thus the dependence relation with another area occurs. Thus, it was likely to be difficult to perform the processes of the areas in parallel.

<Limitation of Reference Target>

In this regard, in the encoding and decoding of the enhancement layer, an area serving as the reference target of the encoding-related information of another layer (for example, the base layer or another enhancement layer) is controlled For example, an area in which encoding-related information is referred to is limited to some areas of a picture of another layer.

Figure 8:
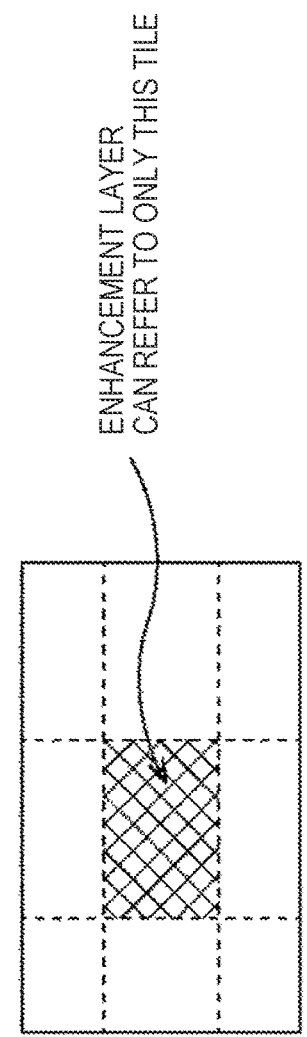
FIG. 8 is a diagram for describing an example of base layer reference control.

FIG. 8 is a diagram illustrating an example of an aspect of limiting the reference target. In the case of FIG. 8, only a tile indicated by a mesh pattern of the base layer is designated as the reference target of the encoding-related information. In this case, the encoding-related information of the other areas (the areas of the white background) is neither included as the reference target nor read from a memory, regarding the encoding and decoding of the enhancement layer. Therefore, an increase in the workload of the encoding and decoding of the enhancement layer is suppressed accordingly.

The limiting method is arbitrary, but an area in which reference to encoding-related information of another layer is permitted may be designated. Further, for example, an area in which reference to encoding-related information for another layer is prohibited may be designated. Furthermore, for example, an area in which encoding-related information of another layer is referred to may be designated.

Since an area serving as a processing unit of encoding or decoding such as a tile or a slice is used as a reference target control unit of encoding-related information, it is possible to reduce the dependence relation between the areas, and thus it is possible to more easily perform processes independently in parallel.

<Specific Example of Area Control>

A more specific example of such control will be described.

For example, as in the example of FIG. 8, in the event of the encoding of the base layer, a picture is divided into tiles, and control is performed such that encoding-related information can be referred to in only a few of the tiles. In this case, for example, reference to encoding-related information is permitted for those few tiles. For example, in the encoding of the base layer, control information designating a tile in which reference to encoding-related information is permitted is generated and supplied for the encoding of the enhancement layer.

The encoding of the enhancement layer is executed according to the control information. In other words, only encoding-related information of a tile permitted by the control information can be referred to, regarding the encoding of the enhancement layer.

Further, regarding the encoding of the base layer, a setting method of setting an area in which reference to encoding-related information is permitted is arbitrary. For example, an area in which reference to encoding-related information is permitted may be designated by the user, an application, or the like, or an area in which reference to encoding-related information is permitted may be decided in advance.

For example, when there is an area in which reference is apparently unnecessary such as a letter box at a common position of pictures of a moving image, the area may be excluded from "an area in which reference to encoding-related information is permitted," that is, other areas may be designated as "an area in which reference to encoding-related information is permitted" in advance before the pictures of the moving image data are encoded.

Further, for example, the user may designate "an area in which reference to encoding-related information is permitted" of each picture, or the user may designate a feature of an image, and an application or the like may designate an area having the designated feature in each picture as "an area in which reference to encoding-related information is permitted." Furthermore, an application or the like may perform area division (for example, tile division, slice division, or the like) so that an area including a certain feature (or a feature designated by the user) is formed in each picture.

Figure 9:
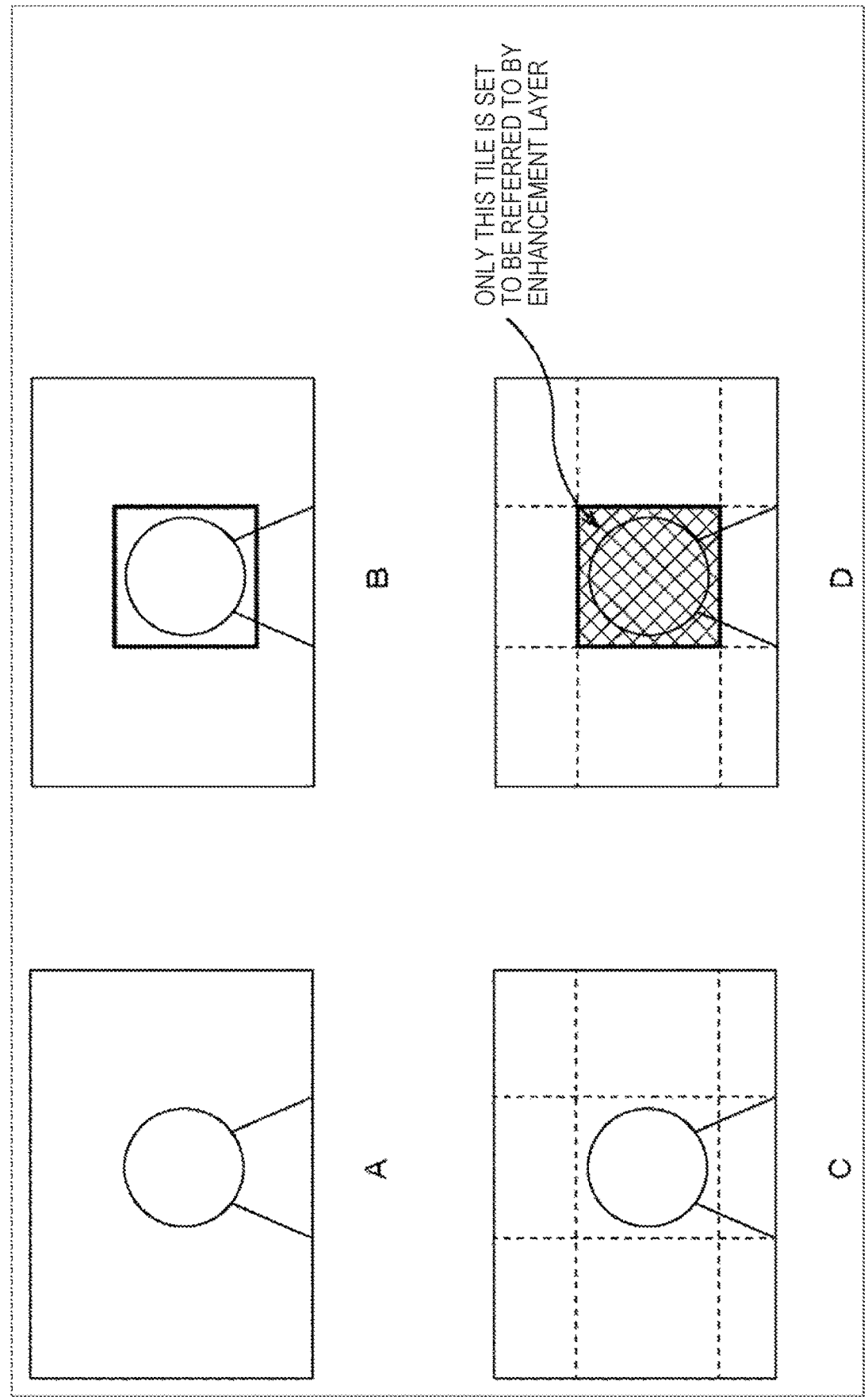
FIG. 9 is a diagram for describing an example of a tile setting.

For example, in the encoding of the base layer, an input image is assumed to be an image including a person (A of FIG. 9). An application performs a face recognition process on the image, and detects a partial area including a face of a person (B of FIG. 9). Then, the application performs tile division on the picture so that the partial area is set as one of tiles (C of FIG. 9). Then, the application designates the tile (that is, the detected partial area) including the face of the person as "an area in which reference to encoding-related information is permitted" (a tile of a mesh pattern in D of FIG. 9).

As described above, the area division (forming of tiles or slices) may be performed in a state in which the encoding-related information is recognized to be referred to by the encoding of the enhancement layer. As a result, "the number of areas in which reference to encoding-related information is permitted" can be reduced. In other words, in the encoding of the enhancement layer, since it is possible to further narrow the range of the base layer to be referred to, it is possible to suppress an increase in workload.

Further, control of an area in which encoding-related information is referred to may be performed in units larger than at least areas (tiles, slices, or the like) as described above. For example, the control may be performed in units of pictures. Further, for example, the control may be performed in units of sequences. Furthermore, the control may be performed in units of moving image data. Moreover, the control information may be prepared in advance.

The example in which "an area in which reference to encoding-related information is permitted" is designated has been described above, but the control method is not limited to this example, and, for example, "an area in which reference to encoding-related information is prohibited" may be adversely designated. In this case, tiles other than a few tiles in which reference is prohibited are used as the reference target.

In this case, for example, in the encoding of the base layer, it is desirable to generate control information designating a tile in which reference to encoding-related information is prohibited and supply the control information for the encoding of the enhancement layer.

The encoding of the enhancement layer is executed according to the control information, similarly to the case in which reference is permitted. In other words, only encoding-related information of titles other than the tiles prohibited by the control information can be referred to, regarding the encoding of the enhancement layer.

Of course, in this case, a setting method is arbitrary, similarly to the case in which reference is permitted. Further, the number of areas in which reference to encoding-related information of the base layer is permitted (or prohibited) may be one or several.

As described above, regardless of whether reference to encoding-related information is permitted or prohibited, in the encoding of the enhancement layer, it is arbitrary whether or not a picture is divided into tiles (or slices). Further, how to perform division is also arbitrary. Even if the enhancement layer is encoded in units of areas such as tiles or slices, encoding of each area is performed based on the control information. In other words, only encoding-related information of a tile (or a slice) (other than a prohibited tile (or slice)) permitted by the control information can be referred to in encoding of all areas.

As described above, when the enhancement layer is encoded in units of areas such as tiles or slices, an area in which reference to encoding-related information is permitted (or prohibited) may be set for each area of the enhancement layer. In other words, an area in which reference to encoding-related information of the base layer is permitted (or prohibited) may not be the same in each area of the enhancement layer.

For example, the control information may be information (for example, a correspondence table) in which the areas of the enhancement layer and the areas of the base layer are associated (synchronized). In this case, only the encoding-related information of the areas of the base layer associated by the correspondence table can be referred to in encoding of the areas of the enhancement layer.

It is possible to perform more appropriate control by controlling the reference destination of the encoding-related information for each area of the enhancement layer as described above. Therefore, it is possible to suppress an increase in encoding or decoding workload. Further, it is possible to reduce the dependence relation between the areas.

Figure 10:
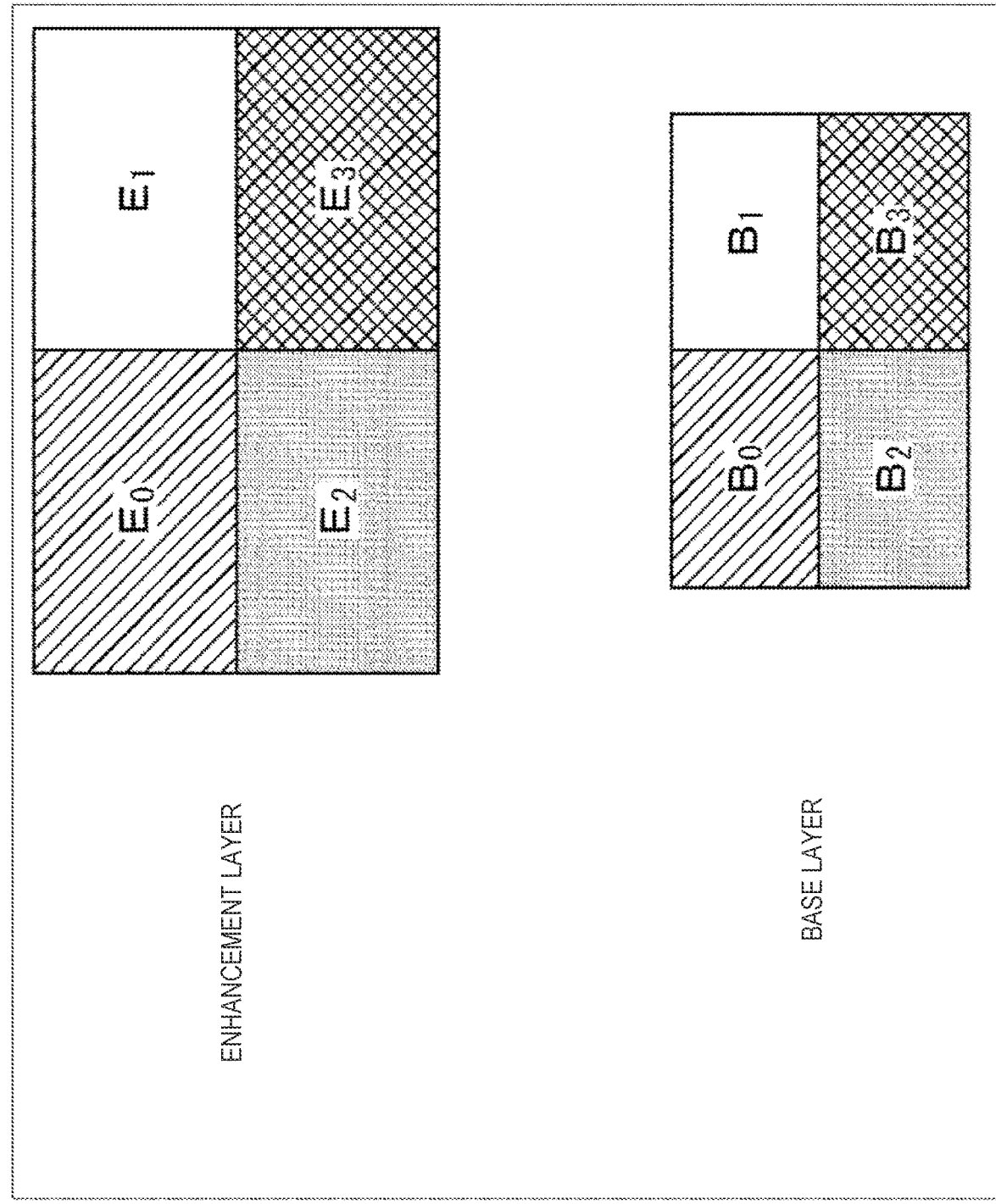
FIG. 10 is a diagram for describing another example of base layer reference control.

For example, the area of the enhancement layer may be permitted to refer to encoding-related information of different areas of the base layer as illustrated in FIG. 10. In the case of the example of FIG. 10, the reference destination of the encoding-related information of the base layer in encoding of a tile $E_0$ of the enhancement layer is limited to a tile $B_0$ of the base layer. The reference destination of the encoding-related information of the base layer in encoding of a tile $E_1$ of the enhancement layer is limited to a tile $B_1$ of the base layer. The reference destination of the encoding-related information of the base layer in encoding of a tile $E_2$ of the enhancement layer is limited to a tile $B_2$ of the base layer. The reference destination of the encoding-related information of the base layer in encoding of a tile $E_3$ of the enhancement layer is limited to a tile $B_3$ of the base layer.

Figure 11:
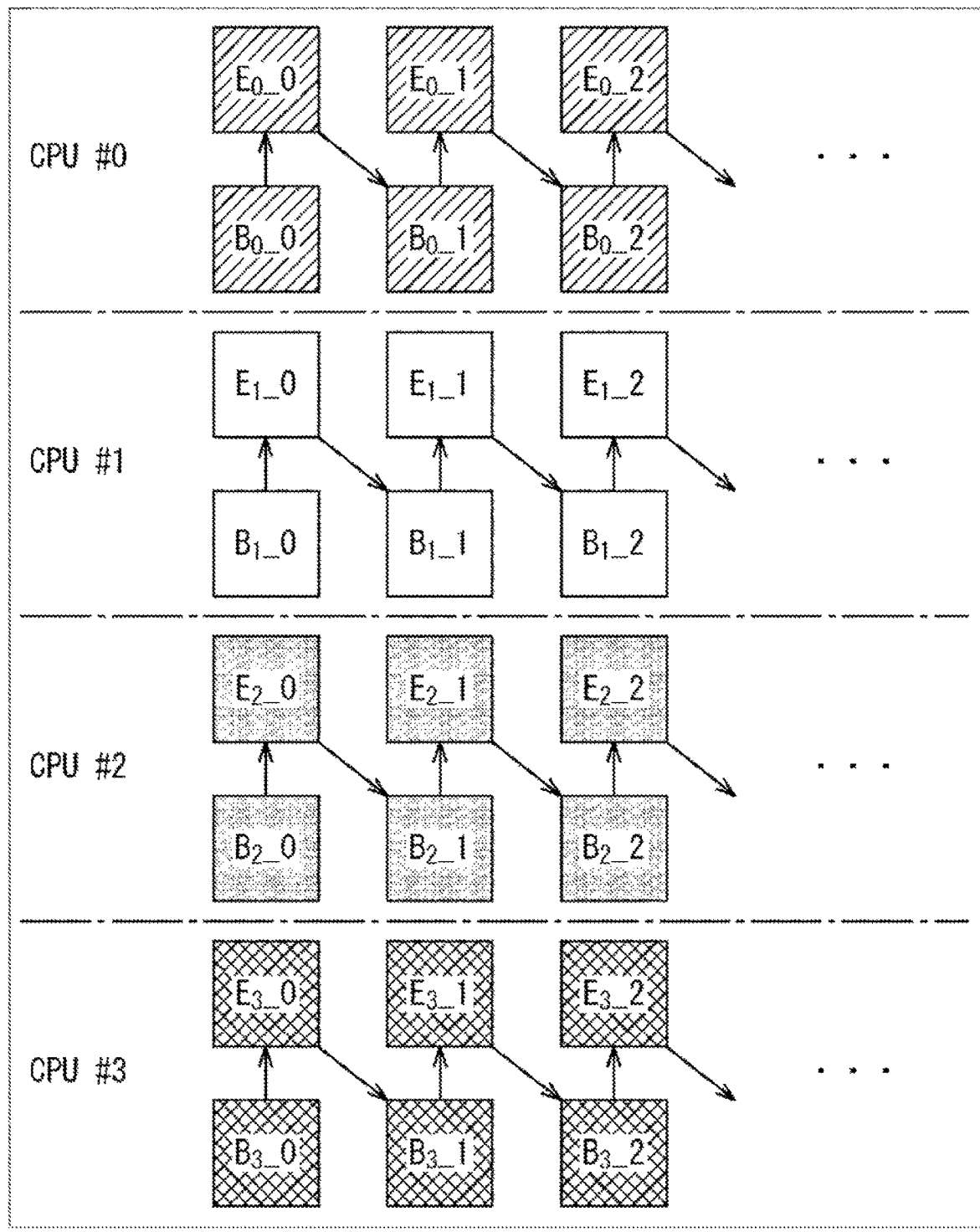
FIG. 11 is a diagram for describing an example of a parallel process.

Since the areas of the enhancement layer are permitted to refer to the encoding-related information of the different areas of the base layer as in the example of FIG. 10, it is possible to reduce the dependence relation between the areas and perform the parallel process more easily as illustrated in FIG. 11.

In the case of an example of FIG. 11, a first CPU #0 performs encoding on tiles #0 of respective frames in the order of a tile #0 ($B_0$_0) of the base layer of a frame #0, a tile #0 ($E_0$_0) of the enhancement layer of the frame #0, a tile #0 ($B_0$_1) of the base layer of a frame #1, a tile #0 ($E_0$_1) of the enhancement layer of the frame #1, a tile #0 ($B_0$_2) of the base layer of a frame #2, and a tile #0 ($E_0$_2) of the enhancement layer of the frame #2.

In parallel to this, a second CPU #1 performs encoding on tiles #1 of respective frames in the order of a tile #1 ($B_1$_0) of the base layer of the frame #0, a tile #1 ($E_1$_0) of the enhancement layer of the frame #0, a tile #1 ($B_1$_1) of the base layer of the frame #1, a tile #1 ($E_1$_1) of the enhancement layer of the frame #1, a tile #1 ($B_1$_2) of the base layer of the frame #2, and a tile #1 ($E_1$_2) of the enhancement layer of the frame #2.

Further, in parallel to the above processes, a third CPU #2 performs encoding on tiles #2 of respective frames in the order of a tile #2 ($B_2$_0) of the base layer of the frame #0, a tile #2 ($E_2$_0) of the enhancement layer of the frame #0, a tile #2 ($B_2$_1) of the base layer of the frame #1, a tile #2 ($E_2$_1) of the enhancement layer of the frame #1, a tile #2 ($B_2$_2) of the base layer of the frame #2, and a tile #2 ($E_2$_2) of the enhancement layer of the frame #2.

Further, in parallel to the above processes, a fourth CPU #3 performs encoding on tiles #2 of respective frames in the order of a tile #2 ($B_3$_0) of the base layer of the frame #0, a tile #3 ($E_3$_0) of the enhancement layer of the frame #0, a tile #3 ($B_3$_1) of the base layer of the frame #1, a tile #3 ($E_3$_1) of the enhancement layer of the frame #1, a tile #3 ($B_3$_2) of the base layer of the frame #2, and a tile #3 ($E_3$_2) of the enhancement layer of the frame #2.

The designation of an area (a tile, a slice, or the like) of the base layer in the control information may be performed based on a position (for example, an offset value from the head) of data of each area included in encoded data (bitstream) or may be performed based on an identification number allocated to each area of the base layer.

Figure 12:
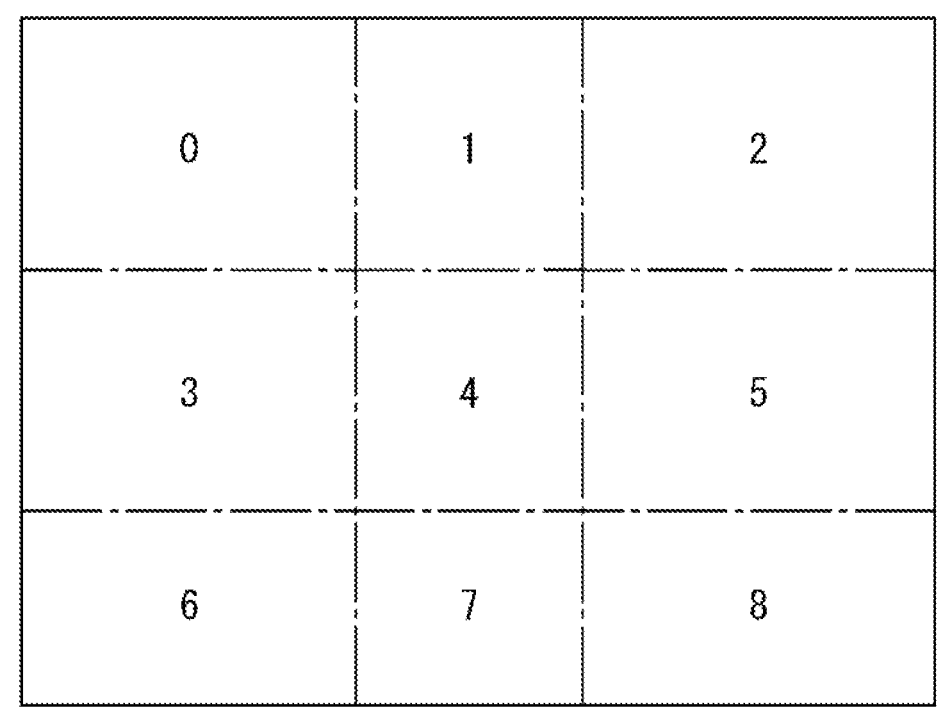

For example, as illustrated in FIG. 12, an identification number may be allocated to each area in the raster scan order, and an area in which reference to encoding-related information is permitted or prohibited may be designated using the identification number. Of course, a method of allocating the identification number is arbitrary, and the raster scan order is an example.

The above example has been described in connection with the case of encoding but is similarly applied to the case of decoding.

<Transmission of Control Information>

The control information used to control reference to the encoding-related information may be transmitted from an encoding side to a decoding side. As the control information is transmitted to the decoding side, the control information can be used in decoding. In other words, similarly to the case of encoding, decoding workload can be reduced. In this case, the control information may be specified, for example, a picture parameter set (PPS) or a slice header. Of course, the control information can be transmitted by an arbitrary method. For example, the control information may be specified in a sequence parameter set, a video parameter set, or the like. Further, the control information may be transmitted as data separate from encoded data of image data.

FIGS. 13 and 14 illustrate an example of syntax of the picture parameter set of the enhancement layer when the control information is transmitted through the picture parameter set.

In the case of this example, as illustrated in FIG. 13, tile_setting_from_ref_layer_flag is transmitted as information indicating whether or not area division of a current layer (that is, the enhancement layer) serving as the processing target is similar to area division of another layer (that is, the base layer). When a value thereof is 1, it indicates that a method of the area division (for example, the tile division) in the enhancement layer is similar to that of the base layer.

For example, when the area division of the enhancement layer is similar to the area division of the base layer, it is possible to detect the area division of the enhancement layer with reference to the area division of the base layer information in the decoding of the enhancement layer, and thus it is unnecessary to transmit information (for example, num_tile_columns_minus1, num_tile_rows_minus1, uniform_spacing_flag, and the like in FIG. 13) related to the area division of the enhancement layer. Therefore, it is possible to suppress a decrease in encoding efficiency.

Further, as illustrated in FIG. 14, inter_layer_tile_prediction_restriction_flag is transmitted as information indicating whether or not to control an area in which encoding-related information is referred to. When a value thereof is 1, the control information used to control reference to encoding-related information is transmitted (second to ninth lines from the top in FIG. 14). In the case of the example of FIG. 14, the enhancement layer is encoded in units of areas, and the control information used to control an area of the base layer in which encoding-related information is referred to is transmitted for each area of the enhancement layer.

Since the information indicating whether or not to control an area in which encoding-related information is referred to is transmitted as described above, when an area in which encoding-related information is referred to is not controlled, transmission of the control information can be omitted (the control information can be transmitted only when an area in which encoding-related information is referred to is controlled). Therefore, it is possible to suppress a decrease in encoding efficiency.

In the case of the example of FIG. 14, a current area serving as the processing target of the enhancement layer is designated by a position (i,j) in a horizontal direction and a vertical direction in the area array. Further, the number (num_ref_tiles_minus1) of areas of the base layer serving as the reference destination and the area thereof are designated for each area. Furthermore, the area of the base layer serving as the reference destination is designated by an identification number (ref_tile[k]). The identification number is allocated to each area of the base layer in the raster scan order as in the example of FIG. 12.

The current area of the enhancement layer and the area of the base layer serving as the reference destination can be designated by an arbitrary method other than the above-mentioned methods. For example, the current area of the enhancement layer may be designated using an identification number. For example, the area of the base layer serving as the reference destination may be designated by a position (i,j) in the horizontal direction and the vertical direction in the area array or may be designated by information (for example, an offset value from the top) indicating a position of area data in encoded data.

FIGS. 15 to 17 illustrate an example of syntax of the slice header of the enhancement layer when the control information is transmitted through the slice header. As illustrated in FIGS. 15 to 17, in the case of the slice header, the control information is transmitted by a method similar to that in the case of the picture parameter set described with reference to FIGS. 13 and 14.

In the example of FIGS. 13 to 17, an example in which a tile is used as an area has been described, but what have been described above can be similarly applied to a slice used as an area.

Further, as described above, the encoding-related information includes texture information such as a decoded image or syntax information such as the motion information or intra prediction mode information, for example. In other words, for example, as inter-layer prediction in which prediction is performed with reference to information of another layer, there are inter-layer texture prediction in which texture information such as decoded image information of the base layer is used for prediction and inter-layer syntax prediction in which syntax information such as the motion information and the intra prediction mode information of the base layer is used for prediction. In the present technology, control of the reference destination of the encoding-related information may be independently performed in each prediction process. In other words, for example, a reference destination area of the texture information and a reference destination area of a syntax area may be independently designated.

2. First Embodiment

<Image Encoding Device>

Figure 18:
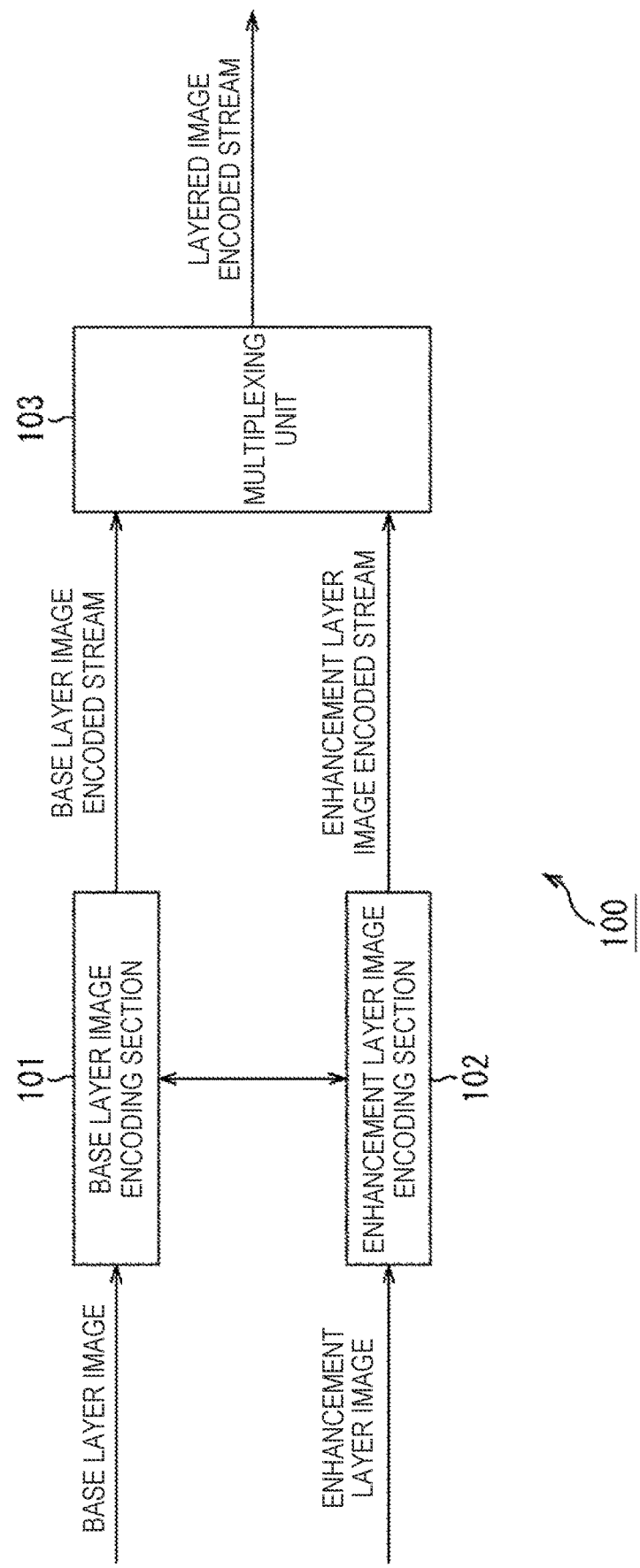
FIG. 18 is a block diagram illustrating an example of a main configuration of an image encoding device.

Next, a device implementing the present technology and a method thereof will be described. FIG. 18 is a diagram illustrating an image encoding device as an example of an image processing device to which the present technology is applied. An image encoding device 100 illustrated in FIG. 18 is a device that performs layered image encoding. As illustrated in FIG. 18, the image encoding device 100 includes a base layer image encoding section 101, an enhancement layer image encoding section 102, and a multiplexing unit 103.

The base layer image encoding section 101 encodes a base layer image, and generates a base layer image encoded stream. The enhancement layer image encoding section 102 encodes an enhancement layer image, and generates an enhancement layer image encoded stream. The multiplexing unit 103 multiplexes the base layer image encoded stream generated in the base layer image encoding section 101 and the enhancement layer image encoded stream generated in the enhancement layer image encoding section 102, and generates a layered image encoded stream. The multiplexing unit 103 transmits the generated layered image encoded stream to the decoding side.

In encoding of the base layer image, the base layer image encoding section 101 performs the area division such as the tile division or the slice division on the current picture, and performs the encoding for each area (a tile, a slice, or the like). The base layer image encoding section 101 supplies the encoding-related information of the base layer obtained in the encoding to the enhancement layer image encoding section 102.

In encoding of the enhancement layer image, the enhancement layer image encoding section 102 performs the area division such as the tile division or the slice division on the current picture, and performs the encoding for each area (a tile, a slice, or the like). In this event, the enhancement layer image encoding section 102 controls an area serving as the reference destination of the encoding-related information of the base layer. More specifically, the enhancement layer image encoding section 102 associates the areas of the enhancement layer with the areas of the base layer serving as the reference destination of the encoding-related information, and generates the control information indicating the correspondence relation thereof.

The enhancement layer image encoding section 102 appropriately refers to the encoding-related information of the base layer according to the control of the control information, and encodes the enhancement layer image. The enhancement layer image encoding section 102 transmits the control information to the decoding side (as the layered image encoded stream) through the multiplexing unit 103.

<Base Layer Image Encoding Section>

Figure 19:
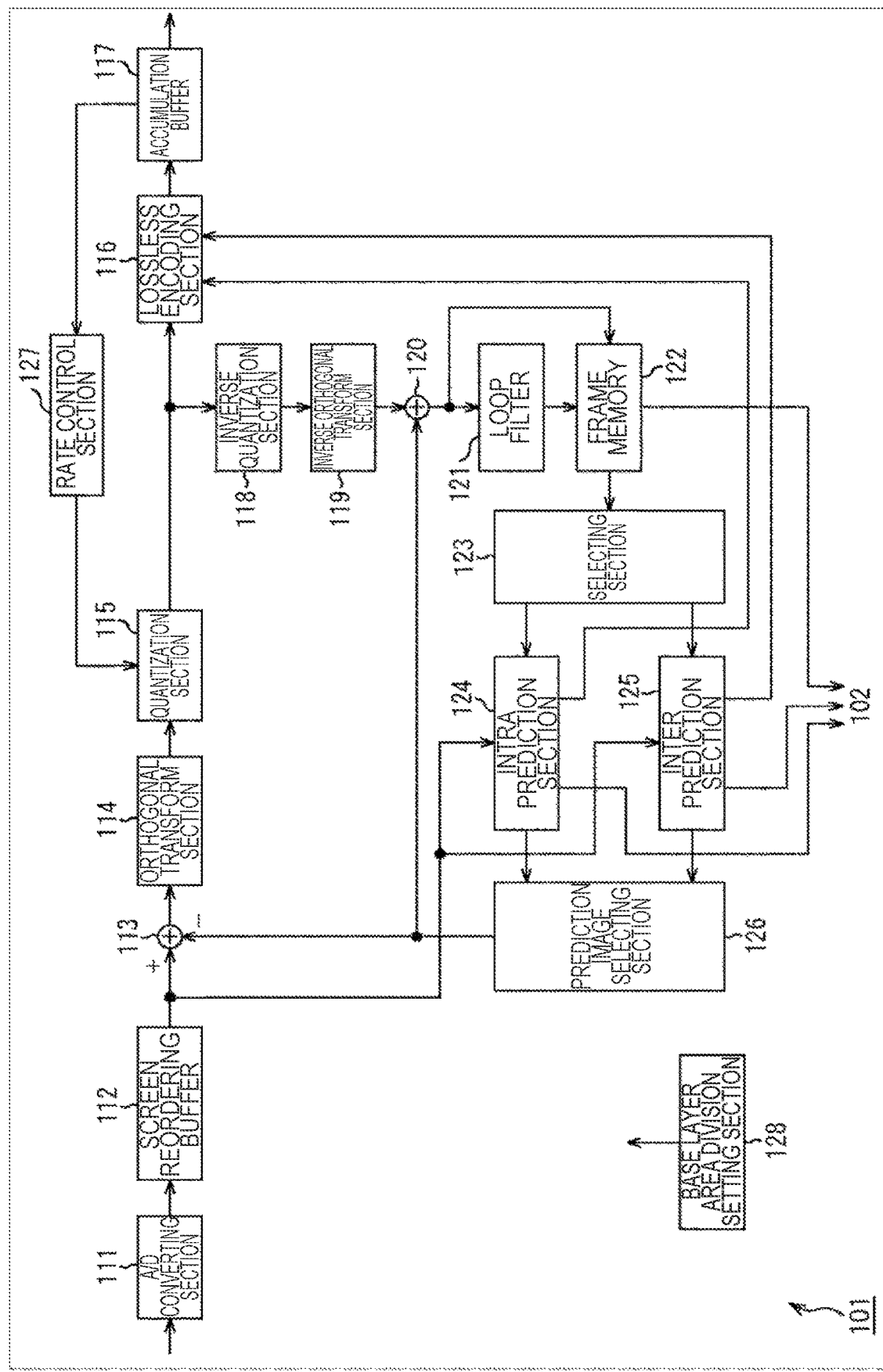
FIG. 19 is a block diagram illustrating an example of a main configuration of a base layer image encoding section.

FIG. 19 is a block diagram illustrating an example of a main configuration of the base layer image encoding section 101 of FIG. 18. As illustrated in FIG. 19, the base layer image encoding section 101 has an A/D converting section 111, a screen reordering buffer 112, an operation section 113, an orthogonal transform section 114, a quantization section 115, a lossless encoding section 116, an accumulation buffer 117, an inverse quantization section 118, and an inverse orthogonal transform section 119. In addition, the base layer image encoding section 103 has an operation section 120, a loop filter 121, a frame memory 122, a selecting section 123, an intra prediction section 124, an inter prediction section 125, a predictive image selecting section 126, and a rate control section 127. Further, the base layer image encoding section 101 has a base layer area division setting section.

The A/D converting section 111 performs A/D conversion on input image data (the base layer image information), and supplies the converted image data (digital data) to be stored in the screen reordering buffer 112. The screen reordering buffer 112 reorders images of frames stored in a display order in a frame order for encoding according to a Group Of Pictures (GOP), and supplies the images in which the frame order is reordered to the operation section 113. The screen reordering buffer 112 also supplies the images in which the frame order is reordered to the intra prediction section 124 and the inter prediction section 125.

The operation section 113 subtracts a predictive image supplied from the intra prediction section 124 or the inter prediction section 125 via the predictive image selecting section 126 from an image read from the screen reordering buffer 112, and outputs differential information thereof to the orthogonal transform section 114. For example, in the case of an image that has been subjected to intra coding, the operation section 113 subtracts the predictive image supplied from the intra prediction section 124 from the image read from the screen reordering buffer 112. Further, for example, in the case of an image that has been subjected to inter coding, the operation section 113 subtracts the predictive image supplied from the inter prediction section 125 from the image read from the screen reordering buffer 112.

The orthogonal transform section 114 performs an orthogonal transform such as a discrete cosine transform or a Karhunen-Loève Transform on the differential information supplied from the operation section 113. The orthogonal transform section 114 supplies transform coefficients to the quantization section 115.

The quantization section 115 quantizes the transform coefficients supplied from the orthogonal transform section 114. The quantization section 115 sets a quantization parameter based on information related to a target value of a coding amount supplied from the rate control section 127, and performs the quantizing. The quantization section 115 supplies the quantized transform coefficients to the lossless encoding section 116.

The lossless encoding section 116 encodes the transform coefficients quantized in the quantization section 115 according to an arbitrary encoding scheme. Since coefficient data is quantized under control of the rate control section 127, the coding amount becomes a target value (or approaches a target value) set by the rate control section 127.

The lossless encoding section 116 acquires information indicating an intra prediction mode or the like from the intra prediction section 124, and acquires information indicating an inter prediction mode, differential motion vector information, or the like from the inter prediction section 125. Further, the lossless encoding section 116 appropriately generates an NAL unit of the base layer including a sequence parameter set (SPS), a picture parameter set (PPS), and the like.

The lossless encoding section 116 encodes information (which is also referred to as "base layer area division information") related to area (for example, a tile, a slice, or the like) division of the base layer set by the base layer area division setting section.

The lossless encoding section 116 encodes various kinds of information according to an arbitrary encoding scheme, and sets (multiplexes) the encoded information as part of encoded data (also referred to as an "encoded stream"). The lossless encoding section 116 supplies the encoded data obtained by the encoding to be accumulated in the accumulation buffer 117.

Examples of the encoding scheme of the lossless encoding section 116 include variable length coding and arithmetic coding. As the variable length coding, for example, there is Context-Adaptive Variable Length Coding (CAVLC) defined in the H.264/AVC scheme. As the arithmetic coding, for example, there is Context-Adaptive Binary Arithmetic Coding (CABAC).

The accumulation buffer 117 temporarily holds the encoded data (base layer encoded data) supplied from the lossless encoding section 116. The accumulation buffer 117 outputs the held base layer encoded data to a recording device (recording medium), a transmission path, or the like (not illustrated) at a subsequent stage under certain timing. In other words, the accumulation buffer 117 serves as a transmitting section that transmits the encoded data as well.

The transform coefficients quantized by the quantization section 115 are also supplied to the inverse quantization section 118. The inverse quantization section 118 inversely quantizes the quantized transform coefficients according to a method corresponding to the quantization performed by the quantization section 115. The inverse quantization section 118 supplies the obtained transform coefficients to the inverse orthogonal transform section 119.

The inverse orthogonal transform section 119 performs an inverse orthogonal transform on the transform coefficients supplied from the inverse quantization section 118 according to a method corresponding to the orthogonal transform process performed by the orthogonal transform section 114. An output (restored differential information) that has been subjected to the inverse orthogonal transform is supplied to the operation section 120.

The operation section 120 obtains a locally decoded image (a decoded image) by adding the predictive image supplied from the intra prediction section 124 or the inter prediction section 125 via the predictive image selecting section 126 to the restored differential information serving as an inverse orthogonal transform result supplied from the inverse orthogonal transform section 119. The decoded image is supplied to the loop filter 121 or the frame memory 122.

The loop filter 121 includes a deblock filter, an adaptive loop filter, or the like, and appropriately performs a filter process on the reconstructed image supplied from the operation section 120. For example, the loop filter 121 performs the deblock filter process on the reconstructed image, and removes block distortion of the reconstructed image. Further, for example, the loop filter 121 improves the image quality by performing the loop filter process on the deblock filter process result (the reconstructed image from which the block distortion has been removed) using a Wiener filter. The loop filter 121 supplies the filter process result (hereinafter referred to as a "decoded image") to the frame memory 122.

The loop filter 121 may further perform any other arbitrary filter process on the reconstructed image. The loop filter 121 may supply information used in the filter process such as a filter coefficient to the lossless encoding section 116 as necessary so that the information can be encoded.

The frame memory 122 stores the supplied decoded image, and supplies the stored decoded image to the selecting section 123 as a reference image under certain timing.

More specifically, the frame memory 122 stores the reconstructed image supplied from the operation section 120 and the decoded image supplied from the loop filter 121. The frame memory 122 supplies the stored reconstructed image to the intra prediction section 124 via the selecting section 123 under certain timing or based on an external request, for example, from the intra prediction section 124. Further, the frame memory 122 supplies the stored decoded image to the inter prediction section 125 via the selecting section 123 under certain timing or based on an external request, for example, from the inter prediction section 125.

The selecting section 123 selects a supply destination of the reference image supplied from the frame memory 122. For example, in the case of the intra prediction, the selecting section 123 supplies the reference image (a pixel value of a current picture) supplied from the frame memory 122 to the intra prediction section 124. Further, for example, in the case of the inter prediction, the selecting section 123 supplies the reference image supplied from the frame memory 122 to the inter prediction section 125.

The intra prediction section 124 performs the prediction process on the current picture that is an image of a processing target frame, and generates a prediction image. The intra prediction section 124 performs the prediction process in units of certain blocks (using a block as a processing unit). In other words, the intra prediction section 124 generates a prediction image of a current block serving as the processing target in the current picture. In this event, the intra prediction section 124 performs the prediction process (intra-screen prediction (which is also referred to as "intra prediction")) using a reconstructed image supplied as the reference image from the frame memory 122 via the selecting section 123. In other words, the intra prediction section 124 generates the prediction image using pixel values neighboring the current block which are included in the reconstructed image. The neighboring pixel value used for the intra prediction is a pixel value of a pixel which has been previously processed in the current picture. As the intra prediction (that is, a method of generating the prediction image), a plurality of methods (which are also referred to as "intra prediction modes") is prepared as candidates in advance. The intra prediction section 124 performs the intra prediction in the plurality of intra prediction modes prepared in advance.

The intra prediction section 124 generates predictive images in all the intra prediction modes serving as the candidates, evaluates cost function values of the predictive images using the input image supplied from the screen reordering buffer 112, and selects an optimal mode. When the optimal intra prediction mode is selected, the intra prediction section 124 supplies the predictive image generated in the optimal mode to the predictive image selecting section 126.

As described above, the intra prediction section 124 appropriately supplies, for example, the intra prediction mode information indicating the employed intra prediction mode to the lossless encoding section 116 so that the information is encoded.

The inter prediction section 125 performs the prediction process on the current picture, and generates a prediction image. The inter prediction section 125 performs the prediction process in units of certain blocks (using a block as a processing unit). In other words, the inter prediction section 125 generates a prediction image of a current block serving as the processing target in the current picture. In this event, the inter prediction section 125 performs the prediction process using image data of the input image supplied from the screen reordering buffer 112 and image data of a decoded image supplied as the reference image from the frame memory 122. The decoded image is an image (another picture that is not the current picture) of a frame which has been processed before the current picture. In other words, the inter prediction section 125 performs the prediction process (inter-screen prediction (which is also referred to as "inter prediction") of generating the prediction image using an image of another picture.

The inter prediction includes motion prediction and motion compensation. More specifically, the inter prediction section 125 performs the motion prediction on the current block using the input image and the reference image, and detects a motion vector. Then, the inter prediction section 125 performs motion compensation process using the reference image according to the detected motion vector, and generates the prediction image (inter prediction image information) of the current block. As the inter prediction (that is, a method of generating the prediction image), a plurality of methods (which are also referred to as "inter prediction modes") is prepared as candidates in advance. The inter prediction section 125 performs the inter prediction in the plurality of inter prediction modes prepared in advance.

The inter prediction section 125 generates predictive images in all the inter prediction modes serving as a candidate. The inter prediction section 125 evaluates cost function values of the predictive images using the input image supplied from the screen reordering buffer 112, information of the generated differential motion vector, and the like, and selects an optimal mode. When the optimal inter prediction mode is selected, the inter prediction section 125 supplies the predictive image generated in the optimal mode to the predictive image selecting section 126.

The inter prediction section 125 supplies information indicating the employed inter prediction mode, information necessary for performing processing in the inter prediction mode in decoding of the encoded data, and the like to the lossless encoding section 116 so that the information is encoded. For example, as the necessary information, there is information of a generated differential motion vector, and as prediction motion vector information, there is a flag indicating an index of a prediction motion vector.

The predictive image selecting section 126 selects a supply source of the prediction image to be supplied to the operation section 113 and the operation section 120. For example, in the case of the intra coding, the predictive image selecting section 126 selects the intra prediction section 124 as the supply source of the predictive image, and supplies the predictive image supplied from the intra prediction section 124 to the operation section 113 and the operation section 120. For example, in the case of the inter coding, the predictive image selecting section 126 selects the inter prediction section 125 as the supply source of the predictive image, and supplies the predictive image supplied from the inter prediction section 125 to the operation section 113 and the operation section 120.

The rate control section 127 controls a rate of a quantization operation of the quantization section 115 based on the coding amount of the encoded data accumulated in the accumulation buffer 117 such that no overflow or underflow occurs.

The base layer area division setting section 128 sets the area division (for example, a tile, a slice, or the like) to the picture of the base layer. The base layer area division setting section 128 supplies this setting to the respective sections of the base layer image encoding section 101 as the base layer area division information. The respective sections of the base layer image encoding section 101 execute processing for each area indicated by the base layer area division information. Encoding of each area is independently processed. Therefore, for example, it is possible to process encoding of the areas in parallel using a plurality of CPUs.

The base layer image encoding section 101 performs encoding without referring to another layer. In other words, the intra prediction section 124 and the inter prediction section 125 do not refer to the encoding-related information of the other layers.

The frame memory 122 supplies the image data of the decoded image of the base layer stored therein to the enhancement layer image encoding section 102 as the encoding-related information of the base layer.

Similarly, the intra prediction section 124 supplies the intra prediction mode information and the like to the enhancement layer image encoding section 102 as the encoding-related information of the base layer.

Similarly, the inter prediction section 125 supplies the motion information and the like to the enhancement layer image encoding section 102 as the encoding-related information of the base layer.

Further, the base layer area division setting section 128 supplies the base layer area division information to the enhancement layer image encoding section 102 as well.

<Enhancement Layer Image Encoding Section>

Figure 20:
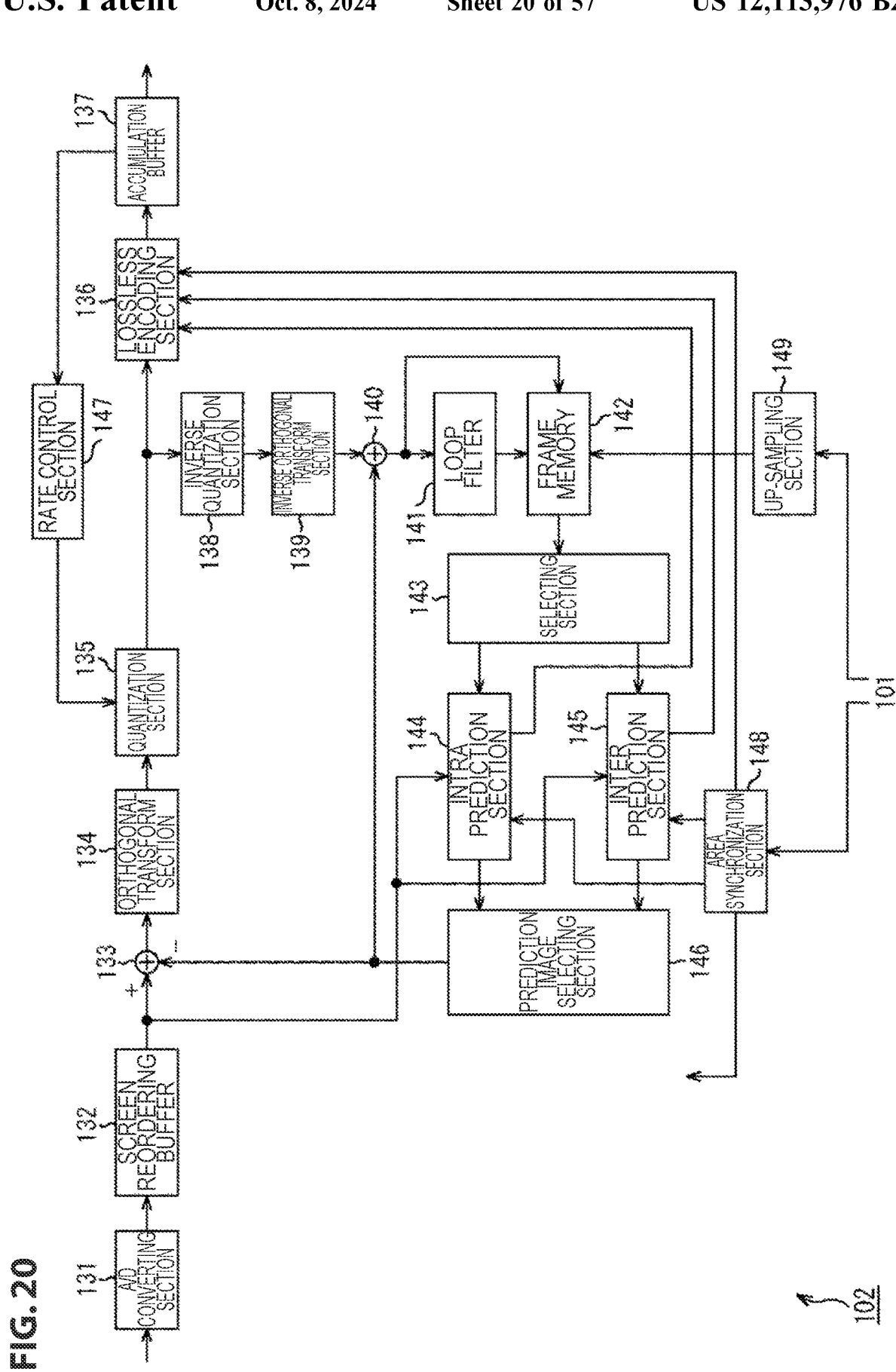
FIG. 20 is a block diagram illustrating an example of a main configuration of an enhancement layer image encoding section.

FIG. 20 is a block diagram illustrating an example of a main configuration of the enhancement layer image encoding section 102 of FIG. 18. As illustrated in FIG. 20, the enhancement layer image encoding section 102 has basically a configuration similar to that of the base layer image encoding section 101 of FIG. 19.

In other words, the enhancement layer image encoding section 102 includes an A/D converting section 131, a screen reordering buffer 132, an operation section 133, an orthogonal transform section 134, a quantization section 135, a lossless encoding section 136, an accumulation buffer 137, an inverse quantization section 138, and an inverse orthogonal transform section 139 as illustrated in FIG. 20. The enhancement layer image encoding section 102 further includes an operation section 140, a loop filter 141, a frame memory 142, a selecting section 143, an intra prediction section 144, an inter prediction section 145, a prediction image selecting section 146, and a rate control section 147.

The A/D converting section 131 to the rate control section 147 correspond to the A/D converting section 111 to the rate control section 127 of FIG. 19, and perform processing similar to that performed by the corresponding processing sections. However, the respective sections of the enhancement layer image encoding section 102 perform the process of encoding the enhancement layer image information rather than the base layer. Therefore, the description of the A/D converting section 111 to the rate control section 127 of FIG. 19 can be applied as a description of processing of the A/D converting section 131 to the rate control section 147, but in this case, it is necessary to set data of the enhancement layer as data to be processed instead of data of the base layer. Further, it is necessary to appropriately interpret the processing sections of data input source and data output destination as the corresponding processing sections of the A/D converting section 131 to the rate control section 147.

Further, the enhancement layer image encoding section 102 does not include the base layer area division setting section 128 but includes an area synchronization section 148 and an up-sampling section 149.

The area synchronization section 148 sets the area division (for example, a tile, a slice, or the like) to the picture of the enhancement layer. The area synchronization section 148 supplies this setting to the respective sections of the enhancement layer image encoding section 102 as the enhancement layer area division information.

Further, the area synchronization section 148 controls an area in which the encoding-related information of the base layer is referred to, regarding the encoding of the enhancement layer. For example, the area synchronization section 148 generates the control information used to control an area in which the encoding-related information of the base layer is referred to, and control the intra prediction section 144 or the inter prediction section 145 according to the control information. In other words, the area synchronization section 148 controls the area of the base layer in which the encoding-related information is referred to when the intra prediction section 144 or the inter prediction section 145 performs the inter-layer prediction.

Further, the area synchronization section 148 supplies the control information to the lossless encoding section 136 so that the control information is encoded and transmitted to the decoding side.

The enhancement layer image encoding section 102 performs encoding with reference to the encoding-related information of another layer (for example, the base layer).

The area synchronization section 148 acquires the base layer area division information supplied from the base layer image encoding section 101. The area synchronization section 148 generates the control information using the base layer area division information.

The up-sampling section 149 acquires the encoding-related information of the base layer supplied from the base layer image encoding section 101. For example, the up-sampling section 149 acquires the texture information such as the decoded image (which is also referred to as a "decoded base layer image") of the base layer as the encoding-related information. For example, when the inter layer syntax prediction process (the inter layer prediction) is performed, the up-sampling section 149 also acquires the syntax information such as the motion information and the intra prediction mode information of the base layer as the encoding-related information.

The up-sampling section 149 performs the up-sampling process on the acquired encoding-related information of the base layer. In the scalable coding, layers differ in a value of a certain parameter (for example, a resolution or the like) with a scalability function. For this reason, the up-sampling section 149 performs the up-sampling process (performs the scalable parameter conversion process) on the encoding-related information of the base layer so that the value of the parameter is converted based on the enhancement layer. As the up-sampling process is performed as described above, the encoding-related information of the base layer can be used in encoding of the enhancement layer.

The up-sampling section 149 supplies the encoding-related information of the base layer that has undergone the up-sampling process to be stored in the frame memory 142. For example, the encoding-related information of the base layer is supplied to the intra prediction section 144 or the inter prediction section 145 as the reference image. The syntax information is similarly supplied to the intra prediction section 144 or the inter prediction section 145.

<Area Synchronization Section>

Figure 21:
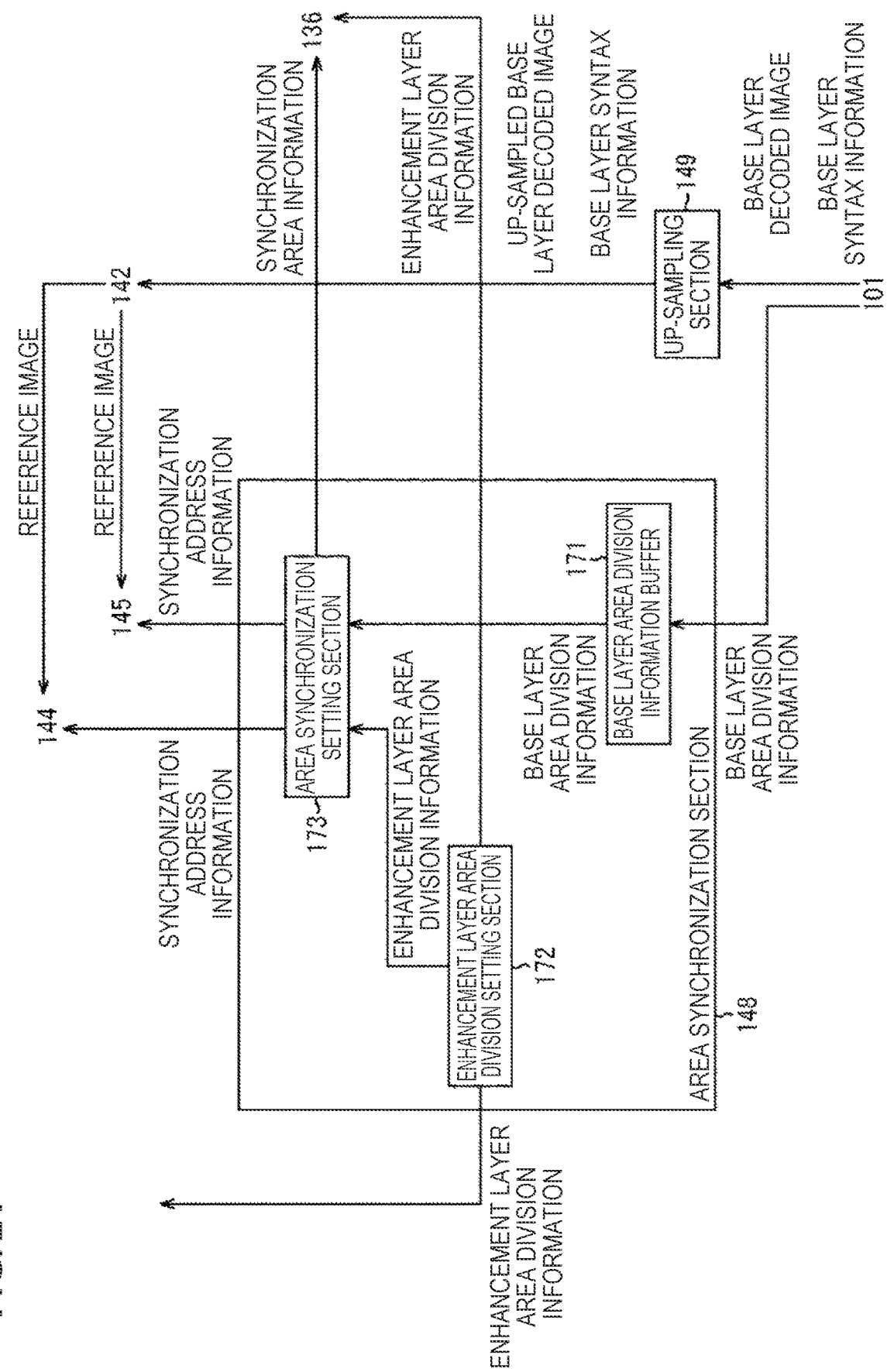
FIG. 21 is a block diagram illustrating an example of a main configuration of an area synchronization section.

FIG. 21 is a block diagram illustrating an example of a main configuration of the area synchronization section 148 of FIG. 20.

As illustrated in FIG. 21, the area synchronization section 148 includes a base layer area division information buffer 171, an enhancement layer area division setting section 172, and an area synchronization setting section 173.

The base layer area division information buffer 171 acquires and holds the base layer area division information supplied from the base layer image encoding section 101. The base layer area division information buffer 171 supplies the base layer area division information being held therein to the area synchronization setting section 173 under certain timing or according to an external request from the area synchronization setting section 173 or the like.

The enhancement layer area division setting section 172 sets the area division (for example, a tile, a slice, or the like) of the picture of the enhancement layer. An area division setting method is arbitrary. For example, the area division may be set by the user, the application, or the like or may be decided in advance. The area division of the enhancement layer may be similar to or different from the area division of the base layer.

The enhancement layer area division setting section 172 supplies this setting to the respective sections of the enhancement layer image encoding section 102 as the enhancement layer area division information. The respective sections of the enhancement layer image encoding section 102 execute processing for each area indicated by the enhancement layer area division information. Encoding of each area is independently processed. Therefore, for example, it is possible to process encoding of the areas in parallel using a plurality of CPUs.

The enhancement layer area division setting section 172 supplies the generated enhancement layer area division information to the area synchronization setting section 173 as well.

Further, the enhancement layer area division setting section 172 supplies the generated enhancement layer area division information to the lossless encoding section 136 so that the enhancement layer area division information is encoded and transmitted to the decoding side. As a result, since the decoding side can perform decoding with reference to this information, it is possible to reduce decoding workload.

The area synchronization setting section 173 performs area association between layers using the supplied base layer area division information and the enhancement layer division information. In other words, the area synchronization setting section 173 sets an area in which the encoding-related information of the base layer is referred to in the event of encoding to each area of the enhancement layer.

The area synchronization setting section 173 generates synchronization area information indicating this setting. Information of any specification can be used as the synchronization area information as long as the information is used to control of the area of the base layer serving as the reference destination of the encoding-related information. For example, information used to associate the area of the base layer serving the reference destination of the encoding-related information with each area of the enhancement layer may be used. For example, information of the syntax described in <1. Main description of present technology> may be used.

The setting method is arbitrary. In other words, an area that is referred to in the intra prediction section 144 or the inter prediction section 145 is decided by an arbitrary method. For example, the area may be set by the user, the application, or the like or may be decided in advance.

The area synchronization setting section 173 specifies the area of the base layer that is used as the reference destination of the encoding-related information in the current area serving as the processing target using the generated synchronization area information, generates synchronization address information indicating a position (address) of data of the area in data of the encoding-related information (for example, the texture information such as the reference image or the syntax information such as the motion information or the intra prediction mode information) that has undergone the up-sampling process and is stored in the frame memory 142, and supplies the synchronization address information to the intra prediction section 144 or the inter prediction section 145.

The intra prediction section 144 or the inter prediction section 145 performs the inter-layer prediction according to the synchronization address information, and thus it is possible to set only some areas of the picture of the base layer as the reference destination, and it is possible to suppress an increase in the number of accesses to the frame memory 142. In other words, as the area synchronization setting section 173 performs this process, it is possible to suppress an increase in the encoding workload.

Further, the area synchronization setting section 173 supplies the generated synchronization area information to the lossless encoding section 136 so that the synchronization area information is encoded and transmitted to the decoding side. As a result, the decoding side can perform decoding with reference to the synchronization area information, and thus, regarding decoding, it is similarly possible to suppress an increase in the number of accesses to the memory, and it is possible to reduce the decoding workload.

<Flow of Image Encoding Process>

Next, the flow of each process performed by the image encoding device 100 will be described. First, an example of the flow of an image encoding process will be described with reference to a flowchart of FIG. 22.

When the image encoding process starts, in step S101, the base layer image encoding section 101 of the image encoding device 100 encodes image data of the base layer.

In step S102, the enhancement layer image encoding section 102 encodes image data of the enhancement layer.

In step S103, the multiplexing unit 103 multiplexes a base layer image encoded stream generated in the process of step S101 and an enhancement layer image encoded stream generated in the process of step S102 (that is, the bitstreams of the respective layers), and generates a layered image encoded stream of one system.

When the process of step S103 ends, the image encoding device 100 ends the image encoding process. One picture is processed through the image encoding process. Therefore, the image encoding device 100 repeatedly performs the image encoding process on pictures of hierarchized moving image data.

<Flow of Base Layer Encoding Process>

Next, an example of the flow of the base layer encoding process executed by the base layer image encoding section 101 in step S101 of FIG. 22 will be described with reference to FIG. 23.

When the base layer encoding process starts, in step S121, the base layer area division setting section 128 of the base layer image encoding section 101 decides the area division of the base layer by a certain method, and generates the base layer area division information. Further, the base layer area division setting section 128 supplies the base layer area division information to the respective sections of the base layer image encoding section 101.

In step S122, the base layer area division setting section 128 supplies the base layer area division information generated in step S121 to the lossless encoding section 116 so that the base layer area division information is transmitted.

The subsequent processes are executed for each of the areas set in step S121. In other words, each process is executed using the area or a certain unit smaller than the area as a processing unit.

In step S123, the A/D converting section 111 performs A/D conversion on an image of each frame (picture) of an input moving image.

In step S124, the screen reordering buffer 112 stores the image that has undergone the A/D conversion in step S123, and performs reordering from a display order to an encoding order on each picture.

In step S125, the intra prediction section 124 performs the intra prediction process of the intra prediction mode.

In step S126, the inter prediction section 125 performs the inter prediction process in which the motion prediction, the motion compensation, and the like are performed in the inter prediction mode.

In step S127, the prediction image selecting section 126 selects a prediction image based on a cost function value or the like. In other words, the prediction image selecting section 126 selects any one of the prediction image generated by the intra prediction of step S125 and the prediction image generated by the inter prediction of step S126.

In step S128, the operation section 113 calculates a difference between the input image in which the frame order is reordered in the process of step S124 and the prediction image selected in the process of step S127. In other words, the operation section 113 generates image data of a differential image between the input image and the prediction image. An amount of the obtained image data of the differential image is reduced to be smaller than the original image data. Therefore, an amount of data can be compressed to be smaller than when an image is encoded without change.

In step S129, the orthogonal transform section 114 performs the orthogonal transform on the image data of the differential image generated in the process of step S128.

In step S130, the quantization section 115 quantizes the orthogonal transform coefficient obtained in the process of step S129 using the quantization parameter calculated by the rate control section 127.

In step S131, the inverse quantization section 118 inversely quantizes the quantized coefficient (which is also referred to as a "quantization coefficient") generated in the process of step S130 according to characteristics corresponding to characteristics of the quantization section 115.

In step S132, the inverse orthogonal transform section 119 performs the inverse orthogonal transform on the orthogonal transform coefficient obtained in the process of step S131.

In step S133, the operation section 120 generates image data of a reconstructed image by adding the prediction image selected in the process of step S127 to the differential image restored in the process of step S132.

In step S134, the loop filter 121 performs the loop filter process on the image data of the reconstructed image generated in the process of step S133. As a result, for example, block distortion of the reconstructed image is removed.

In step S135, the frame memory 122 stores data such as the decoded image obtained in the process of step S134, the reconstructed image obtained in the process of step S133, and the like.

In step S136, the lossless encoding section 116 encodes the quantized coefficients obtained in the process of step S130. In other words, lossless coding such as variable length coding or arithmetic coding is performed on data corresponding to the differential image.

At this time, the lossless encoding section 116 encodes information related to the prediction mode of the predictive image selected in the process of step S127, and adds the encoded information to the encoded data obtained by encoding the differential image. In other words, the lossless encoding section 116 also encodes, for example, information according to the optimal intra prediction mode information supplied from the intra prediction section 124 or the optimal inter prediction mode supplied from the inter prediction section 125, and adds the encoded information to the encoded data.

Further, the lossless encoding section 116 sets and encodes syntax elements such as various null units, and adds the encoded syntax elements to the encoded data.

In step S137, the accumulation buffer 117 accumulates the encoded data obtained in the process of step S136. The encoded data accumulated in the accumulation buffer 117 is appropriately read and transmitted to the decoding side via a transmission path or a recording medium.

In step S138, the rate control section 127 controls the quantization operation of the quantization section 115 based on the coding amount (the generated coding amount) of the encoded data accumulated in the accumulation buffer 117 in the process of step S137 so that no overflow or underflow occurs. Further, the rate control section 127 supplies information related to the quantization parameter to the quantization section 115.

In step S139, the frame memory 122, the intra prediction section 124, the inter prediction section 125, and the base layer area division setting section 128 supply the encoding-related information of the base layer obtained in the above base layer encoding process for the encoding process of the enhancement layer.

Figure 22:
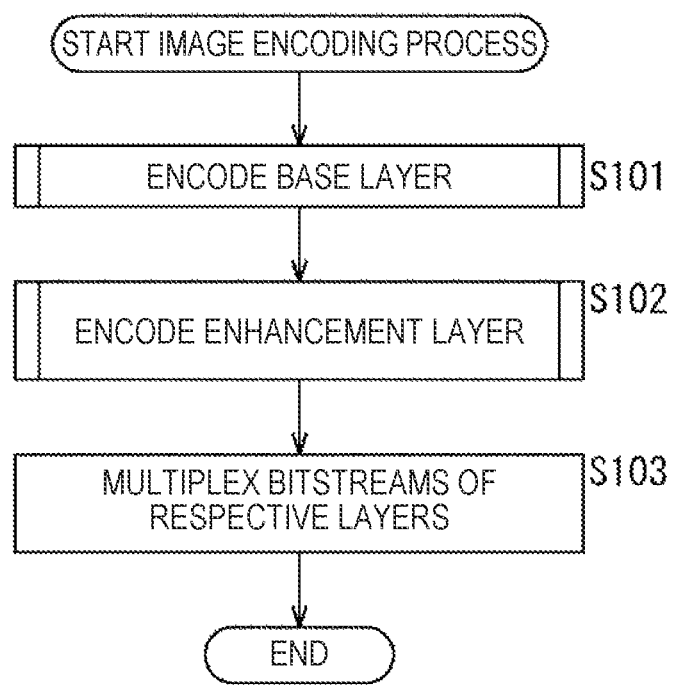
FIG. 22 is a flowchart for describing an example of the flow of an image encoding process.

When the process of step S139 ends, the base layer encoding process ends, and the process returns to FIG. 22.

<Flow of Enhancement Layer Encoding Process>

Figure 24:
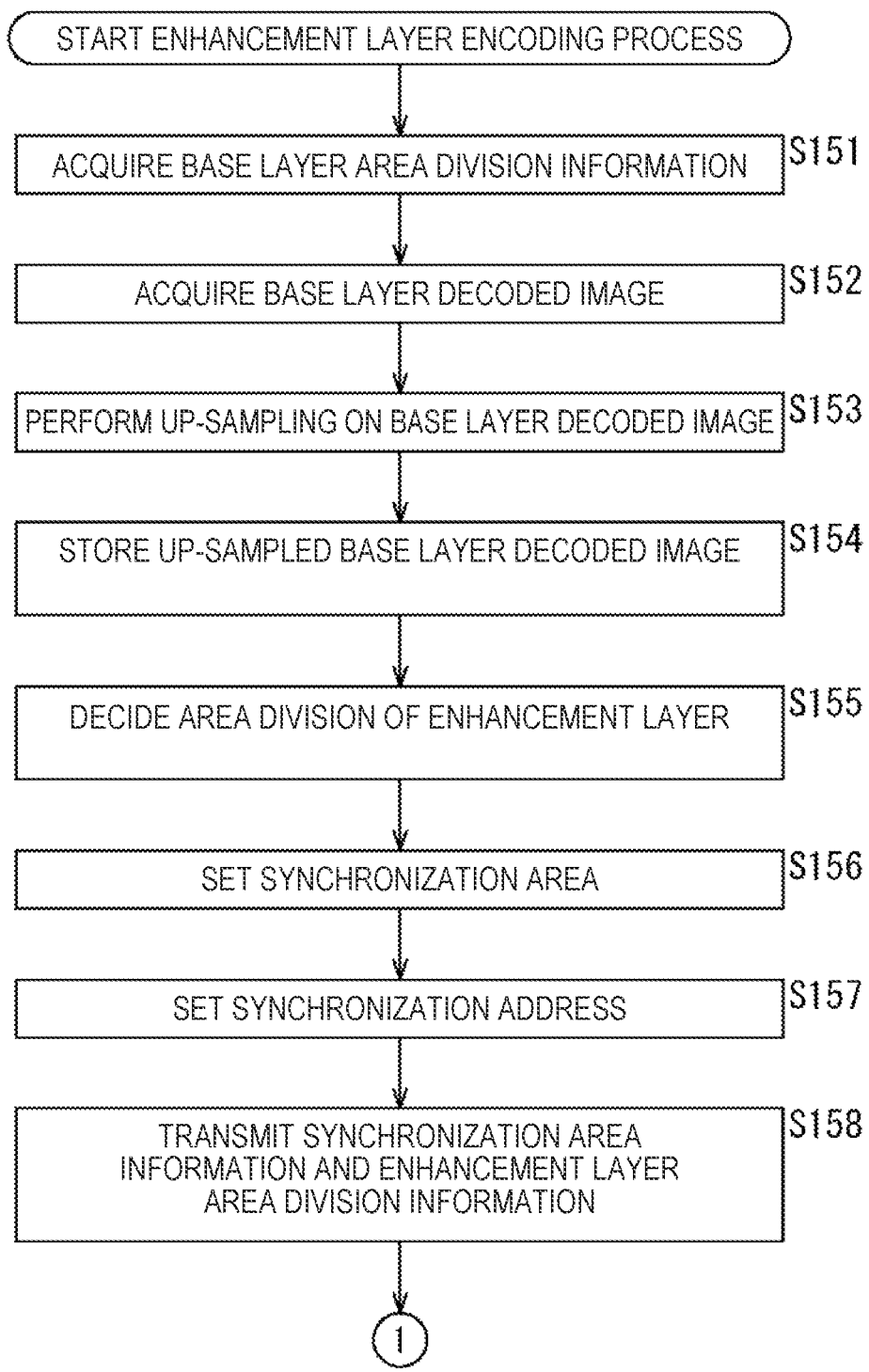
FIG. 24 is a flowchart for describing an example of the flow of an enhancement layer encoding process.

Next, an example of the flow of the enhancement layer encoding process executed by the enhancement layer image encoding section 102 in step S102 of FIG. 22 will be described with reference to flowcharts of FIGS. 24 and 25.

When the enhancement layer encoding process starts, in step S151, the base layer area division information buffer 171 of the enhancement layer image encoding section 102 acquires the base layer area division information that is generated in the base layer encoding process and supplied.

In step S152, the up-sampling section 149 acquires the decoded base layer image (that is, the texture information) that is generated in the base layer encoding process and supplied as the encoding-related information. When the inter-layer syntax prediction is performed, the up-sampling section 149 also acquires the syntax information that is generated in the base layer encoding process and supplied as the encoding-related information.

In step S153, the up-sampling section 149 performs the up-sampling process on the encoding-related information (for example, the decoded base layer image) of the base layer acquired in step S152.

In step S154, the frame memory 142 stores the encoding-related information (for example, the decoded base layer image) of the base layer that has undergone the up-sampling process through the process of step S153.

In step S155, the enhancement layer area division setting section 172 decides the area division of the enhancement layer by a certain method, and generates the enhancement layer area division information. Further, the enhancement layer area division setting section 172 supplies the enhancement layer area division information to the respective sections of the enhancement layer image encoding section 102.

In step S156, the area synchronization setting section 173 generates the synchronization area information by a certain method using the base layer area division information acquired in step S151 and the enhancement layer area division information generated in step S155. In other words, the area synchronization setting section 173 sets the area of the base layer serving as the reference destination of the encoding-related information to each area of the enhancement layer.

In step S157, the area synchronization setting section 173 generates the synchronization address information indicating data of the area of the base layer serving as the reference destination of the encoding-related information using the synchronization area information generated in the process of step S156.

In step S158, the area synchronization setting section 173 supplies the synchronization area information generated in the process of step S156 to the lossless encoding section 136 so that the synchronization area information is transmitted. Further, the enhancement layer area division setting section 172 supplies the enhancement layer area division information generated in the process of step S155 to the lossless encoding section 136 so that the enhancement layer area division information is transmitted.

Figure 25:
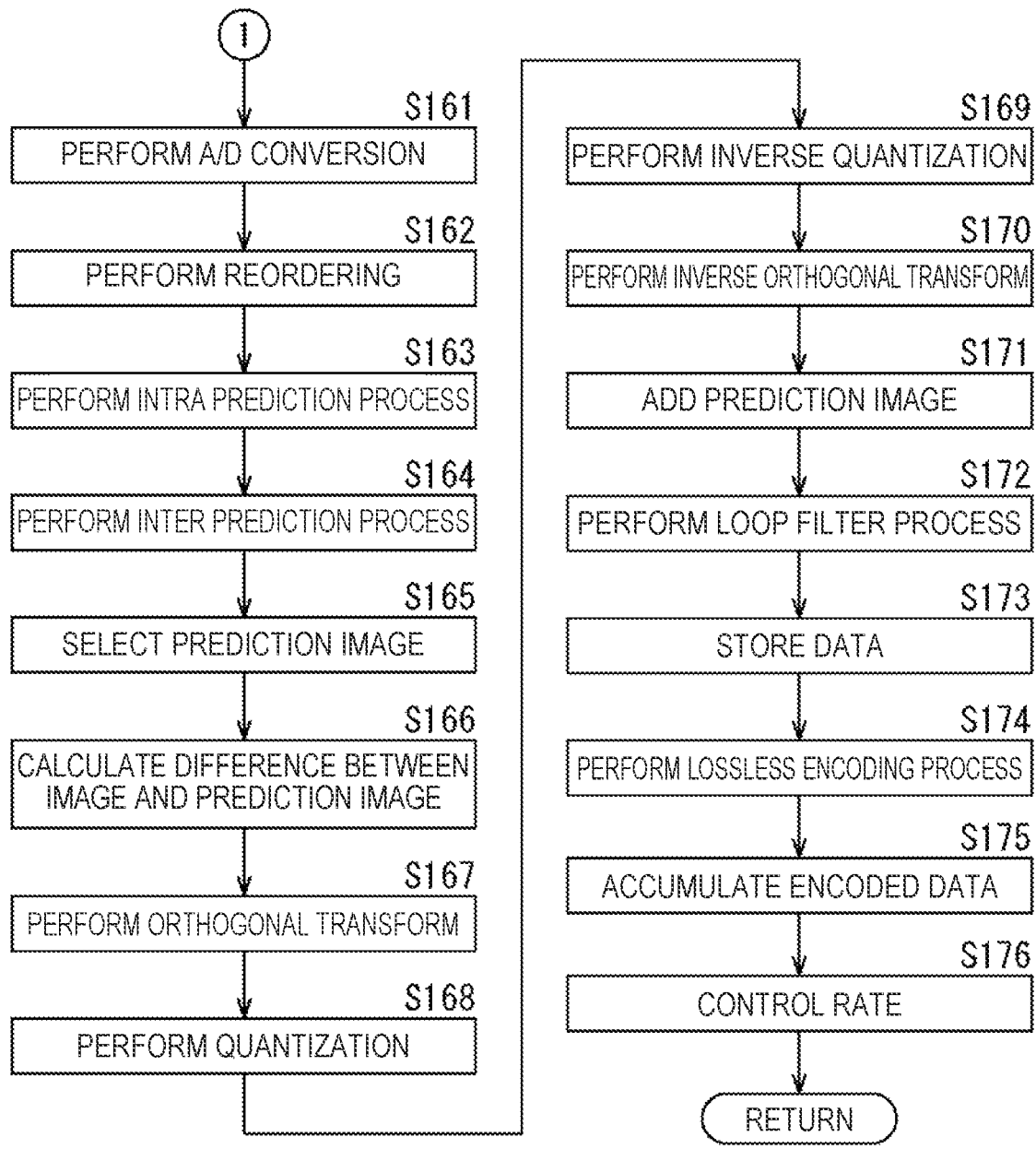
FIG. 25 is a flowchart for describing an example of the flow of an enhancement layer encoding process, continuing from FIG. 24.

When the process of step S158 ends, the process proceeds to step S161 of FIG. 25.

The subsequent processes are executed for each of the areas set in step S155. In other words, each process is executed using the area or a certain unit smaller than the area as a processing unit.

Figure 23:
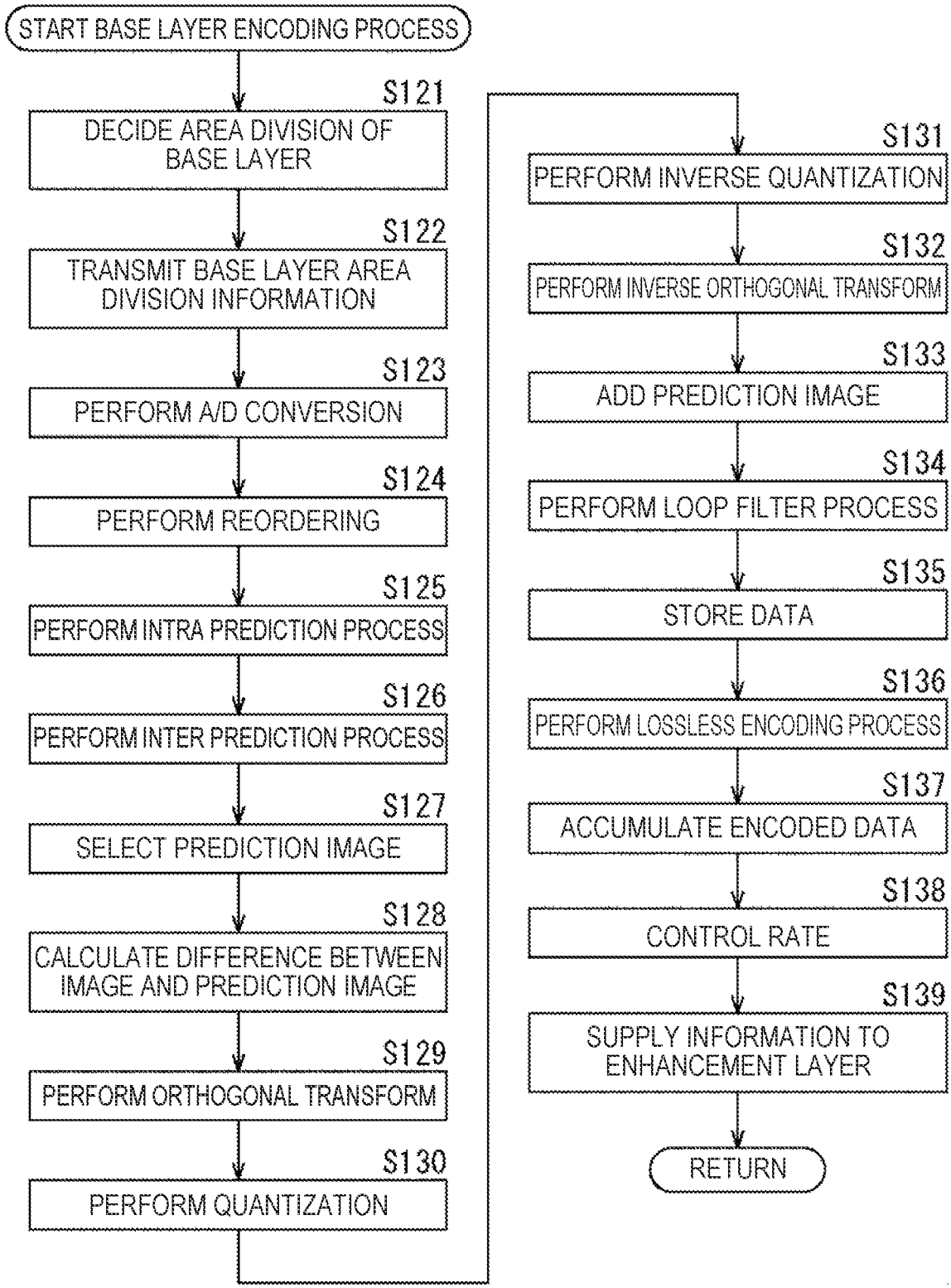
FIG. 23 is a flowchart for describing an example of the flow of a base layer encoding process.

The process of step S161 to step S176 of FIG. 25 corresponds and is executed similarly to the process of step S123 to step S138 of FIG. 23.

When the process of step S176 ends, the enhancement layer encoding process ends, and the process returns to FIG. 22.

By executing the respective processes as described above, the image encoding device 100 can reduce the number of memory accesses for referring to the encoding-related information of another layer in the inter-layer prediction and thus suppress an increase in the encoding and decoding workload.

3. Second Embodiment

<Image Decoding Device>

Figure 26:
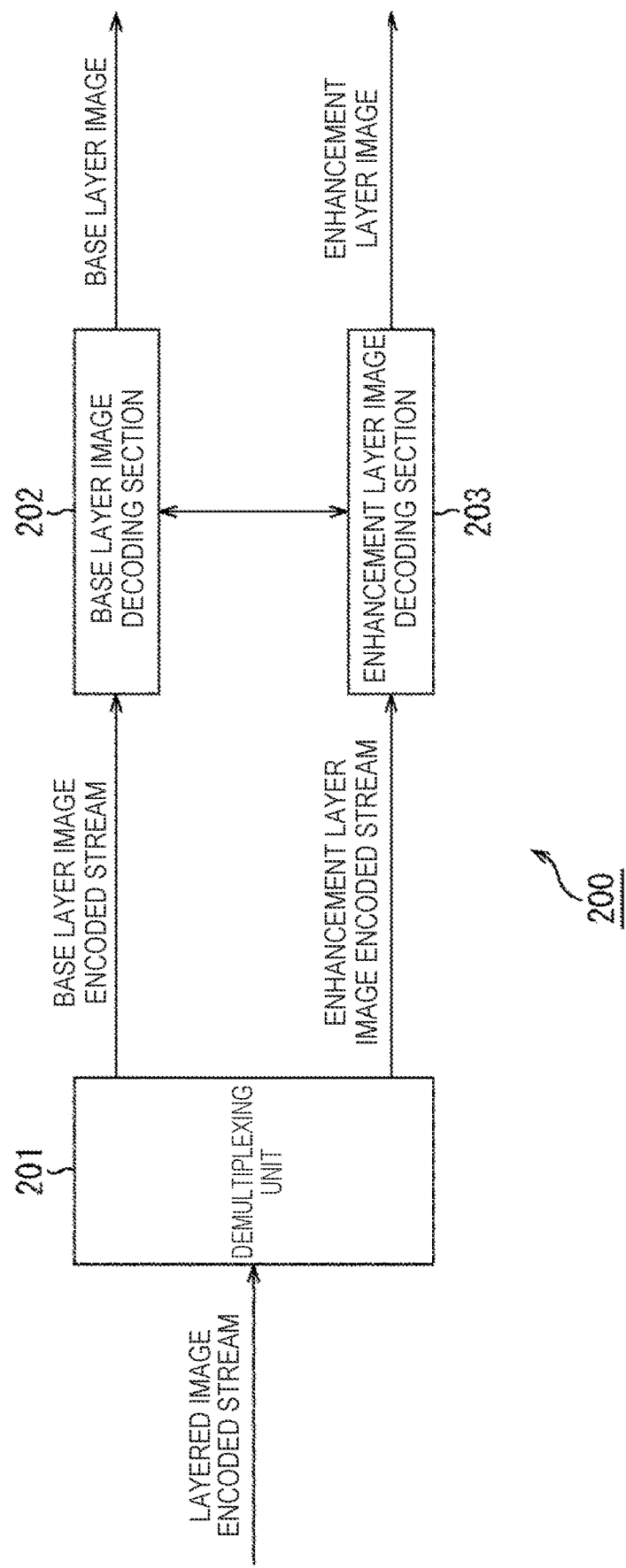
FIG. 26 is a block diagram illustrating an example of a main configuration of an image decoding device.

Next, decoding of encoded data encoded as described above will be described. FIG. 26 is a block diagram illustrating an example of a main configuration of an image decoding device that corresponds to the image encoding device 100 of FIG. 18 as an example of an image processing device to which the present technology is applied.

An image decoding device 200 illustrated in FIG. 26 decodes the encoded data generated by the image encoding device 100 by a decoding method corresponding to an encoding method thereof (that is, performs scalable decoding on the encoded data that has undergone the scalable coding).

As illustrated in FIG. 26, the image decoding device 200 includes a demultiplexing unit 201, a base layer image decoding section 202, and an enhancement layer image decoding section 203.

The demultiplexing unit 201 receives the layered image encoded stream in which the base layer image encoded stream and the enhancement layer image encoded stream are multiplexed, which is transmitted from the encoding side, demultiplexes the scalable image encoded stream, and extracts the base layer image encoded stream and the enhancement layer image encoded stream.

The base layer image decoding section 202 decodes the base layer image encoded stream extracted by the demultiplexing unit 201, and obtains the base layer image. In this event, the base layer image decoding section 202 performs the decoding for each area (a tile, a slice, or the like) set in the encoding side based on the base layer area division information supplied from the encoding side.

The enhancement layer image decoding section 203 decodes the enhancement layer image encoded stream extracted by the demultiplexing unit 201, and obtains the enhancement layer image. In this event, the enhancement layer image decoding section 203 performs the decoding for each area (a tile, a slice, or the like) set in the encoding side based on the enhancement layer area division information supplied from the encoding side.

Further, the enhancement layer image decoding section 203 performs the inter-layer prediction using the synchronization area information serving as the control information that is supplied from the encoding side and used to control the area of the base layer serving as the reference destination of the encoding-related information of each area of the enhancement layer. In other words, when the inter-layer prediction is performed in the decoding of the enhancement layer, the enhancement layer image decoding section 203 refers to the encoding-related information of the area of the base layer designated by the synchronization area information.

<Base Layer Image Decoding Section>

Figure 27:
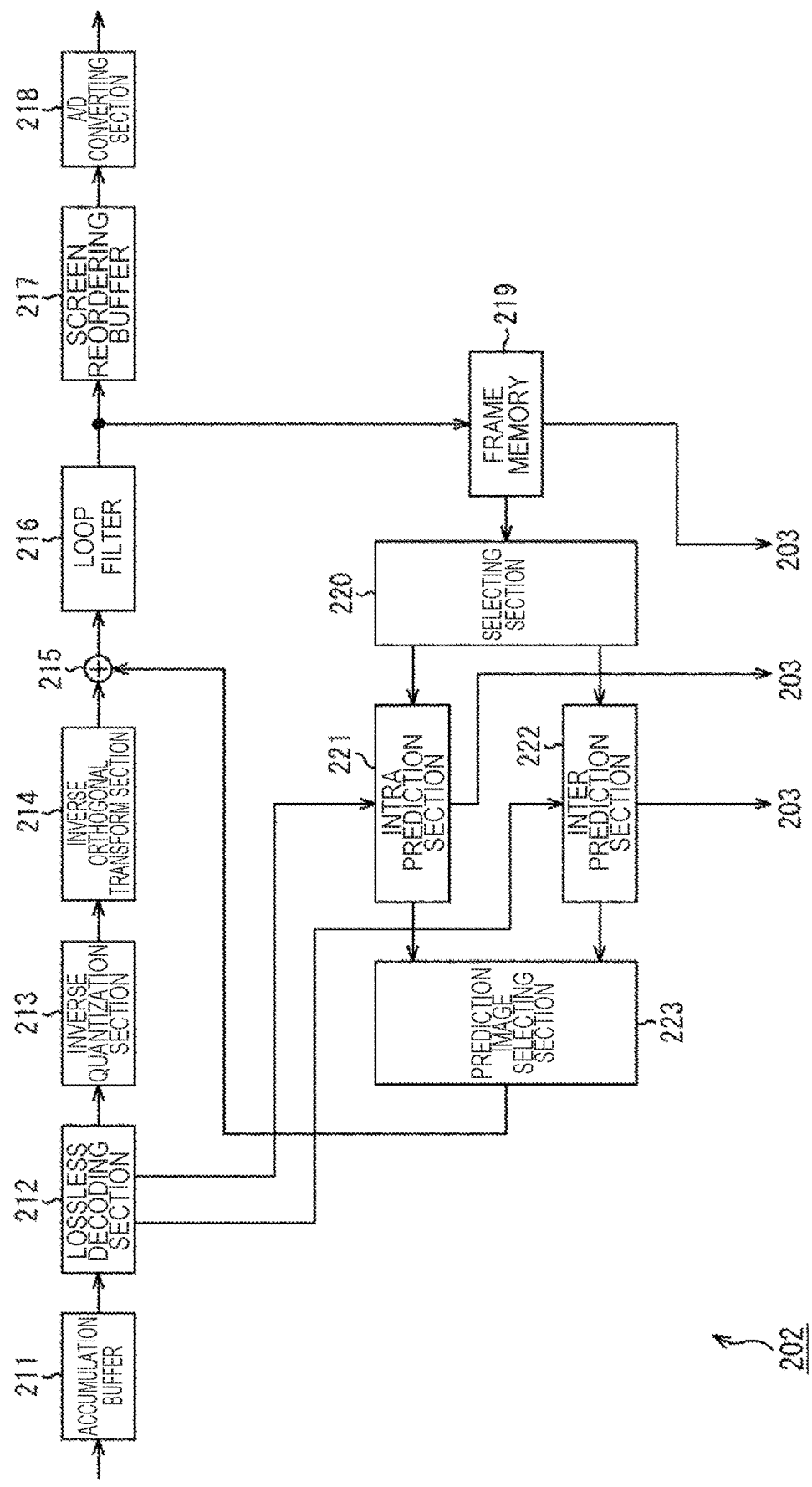
FIG. 27 is a block diagram illustrating an example of a main configuration of a base layer image decoding section.

FIG. 27 is a block diagram illustrating an example of a main configuration of the base layer image decoding section 202 of FIG. 26. As illustrated in FIG. 27, the base layer image decoding section 202 includes an accumulation buffer 211, a lossless decoding section 212, an inverse quantization section 213, an inverse orthogonal transform section 214, an operation section 215, a loop filter 216, a screen reordering buffer 217, and a D/A conversion section 218. The base layer image decoding section 202 further includes a frame memory 219, a selecting section 220, an intra prediction section 221, an inter prediction section 222, and a prediction image selecting section 223.

The accumulation buffer 211 is a reception section that receives the transmitted encoded data. The accumulation buffer 211 receives and accumulates the transmitted encoded data, and supplies the encoded data to the lossless decoding section 212 under certain timing. Information necessary for decoding such as the prediction mode information is added to the encoded data. The lossless decoding section 212 decodes the information that is supplied from the accumulation buffer 211 and encoded by the lossless encoding section 116 according to the decoding scheme corresponding to the encoding scheme. The lossless decoding section 212 supplies quantized coefficient data of a differential image obtained by the decoding to the inverse quantization section 213.

Further, the lossless decoding section 212 determines whether the intra prediction mode or the inter prediction mode is selected as an optimum prediction mode, and supplies information related to the optimum prediction mode to the mode determined to be selected, that is, the intra prediction section 221 or the inter prediction section 222. In other words, for example, when the intra prediction mode is selected as the optimum prediction mode at the encoding side, the information related to the optimum prediction mode is supplied to the intra prediction section 221. Further, for example, when the inter prediction mode is selected as the optimum prediction mode at the encoding side, the information related to the optimum prediction mode is supplied to the inter prediction section 222.

Further, the lossless decoding section 212, for example, supplies information necessary for inverse quantization such as a quantization matrix or a quantization parameter to the inverse quantization section 213.

Further, the lossless decoding section 212 supplies the base layer area division information supplied from the encoding side to the respective processing sections of the base layer image decoding section 202. The respective sections of the base layer image decoding section 202 perform processing for each area indicated by the base layer area division information. Decoding of each area is independently processed. Therefore, for example, it is possible to perform the decoding of respective areas in parallel using a plurality of CPUs.

The inverse quantization section 213 inversely quantizes the quantized coefficient data obtained through the decoding performed by the lossless decoding section 212 according to a scheme corresponding to the quantization scheme of the quantization section 115. The inverse quantization section 213 is a processing section similar to the inverse quantization section 118. In other words, the description of the inverse quantization section 213 can be applied to the inverse quantization section 118 as well. However, it is necessary to interpret data input source, data output destination and the like as each processing section of the base layer image decoding section 202.

The inverse quantization section 213 supplies the obtained coefficient data to the inverse orthogonal transform section 214.

If necessary, the inverse orthogonal transform section 214 performs the inverse orthogonal transform on the orthogonal transform coefficient supplied from the inverse quantization section 213 according to a scheme corresponding to the orthogonal transform scheme of the orthogonal transform section 114. The inverse orthogonal transform section 214 is a processing section similar to the inverse orthogonal transform section 119. In other words, the description of the inverse orthogonal transform section 214 can be applied to the inverse orthogonal transform section 119 as well. However, it is necessary to interpret data input source, data output destination and the like as each processing section of the base layer image decoding section 202.

The image data of the differential image is restored through the inverse orthogonal transform process. The restored image data of the differential image corresponds to the image data of the differential image before the orthogonal transform is performed in the image encoding device. Hereinafter, the restored image data of the differential image obtained by the inverse orthogonal transform process of the inverse orthogonal transform section 214 is referred to as "decoded residual data." The inverse orthogonal transform section 214 supplies the decoded residual data to the operation section 215. Further, the operation section 215 is supplied with the image data of the prediction image from the intra prediction section 221 or the inter prediction section 222 via the prediction image selecting section 223.

The operation section 215 obtains the image data of the reconstructed image in which the differential image and the prediction image are added using the decoded residual data and the image data of the prediction image. The reconstructed image corresponds to the input image before the prediction image is subtracted by the operation section 113. The operation section 215 supplies the reconstructed image to the loop filter 216.

The loop filter 216 generates a decoded image by appropriately performing a loop filter process including a deblock filter process, an adaptive loop filter process, or the like on the supplied reconstructed image. For example, the loop filter 216 removes block distortion by performing the deblock filter process on the reconstructed image. Further, for example, the loop filter 216 improves the image quality by performing the loop filter process on the deblock filter process result (the reconstructed image from which the block distortion has been removed) using a Wiener Filter.

A type of the filter process performed by the loop filter 216 is arbitrary, and a process other than the above-described filter process may be performed. Further, the loop filter 216 may perform the filter process using the filter coefficient supplied from the image encoding device. Furthermore, the loop filter 216 may omit the filter process and may output input data without performing the filter process.

The loop filter 216 supplies the decoded image (or the reconstructed image) serving as the filter process result to the screen reordering buffer 217 and the frame memory 219.

The screen reordering buffer 217 performs reordering of the frame order on the decoded image. In other words, the screen reordering buffer 217 reorders an image of respective frames reordered in the encoding order by the screen reordering buffer 112 in an original display order. In other words, the screen reordering buffer 217 stores the image data of the decoded image of the respective frames supplied in the encoding order in that order, reads the image data of the decoded image of the respective frames stored in the encoding order in the display order, and supplies it to the D/A conversion section 218. The D/A conversion section 218 performs the D/A conversion on the decoded image (digital data) of the respective frames supplied from the screen reordering buffer 217, and outputs analog data to be displayed on a display (not illustrated).

The frame memory 219 stores the supplied decoded image, and supplies the stored decoded image to the intra prediction section 221 or the inter prediction section 222 as the reference image via the selecting section 220 under certain timing or based on an external request from the intra prediction section 221, the inter prediction section 222, or the like.

The intra prediction mode information and the like are appropriately supplied from the lossless decoding section 212 to the intra prediction section 221. The intra prediction section 221 performs the intra prediction in the intra prediction mode (the optimum intra prediction mode) used in the intra prediction section 124, and generates the prediction image. In this event, the intra prediction section 221 performs the intra prediction using the image data of the reconstructed image supplied from the frame memory 219 via the selecting section 220. In other words, the intra prediction section 221 uses the reconstructed image as the reference image (a neighboring pixel). The intra prediction section 221 supplies the generated prediction image to the prediction image selecting section 223.

The optimum prediction mode information, the motion information, and the like are appropriately supplied from the lossless decoding section 212 to the inter prediction section 222. The inter prediction section 222 performs the inter prediction using the decoded image (the reference image) acquired from the frame memory 219 in the inter prediction mode (the optimum inter prediction mode) indicated by the optimum prediction mode information acquired from the lossless decoding section 212, and generates the prediction image.

The prediction image selecting section 223 supplies the prediction image supplied from the intra prediction section 221 or the prediction image supplied from the inter prediction section 222 to the operation section 215. Then, the operation section 215 obtains the reconstructed image in which the prediction image is added to the decoded residual data (the differential image information) from the inverse orthogonal transform section 214.

Further, the base layer image decoding section 202 performs the decoding without referring to another layer. In other words, the intra prediction section 221 and the inter prediction section 222 do not refer to the encoding-related information of another layer.

Further, the frame memory 219 supplies the stored image data of the decoded image of the base layer to the enhancement layer image decoding section 203 as the encoding-related information of the base layer.

Similarly, the intra prediction section 221 supplies the intra prediction mode information and the like to the enhancement layer image decoding section 203 as the encoding-related information of the base layer.

Similarly, the inter prediction section 222 supplies the motion information and the like to the enhancement layer image decoding section 203 as the encoding-related information of the base layer.

Further, the intra prediction section 221 or the inter prediction section 222 (an arbitrary processing section of the base layer image decoding section 202 such as the lossless decoding section 212) supplies the base layer area division information to the enhancement layer image decoding section 203.

<Enhancement Layer Image Decoding Section>

Figure 28:
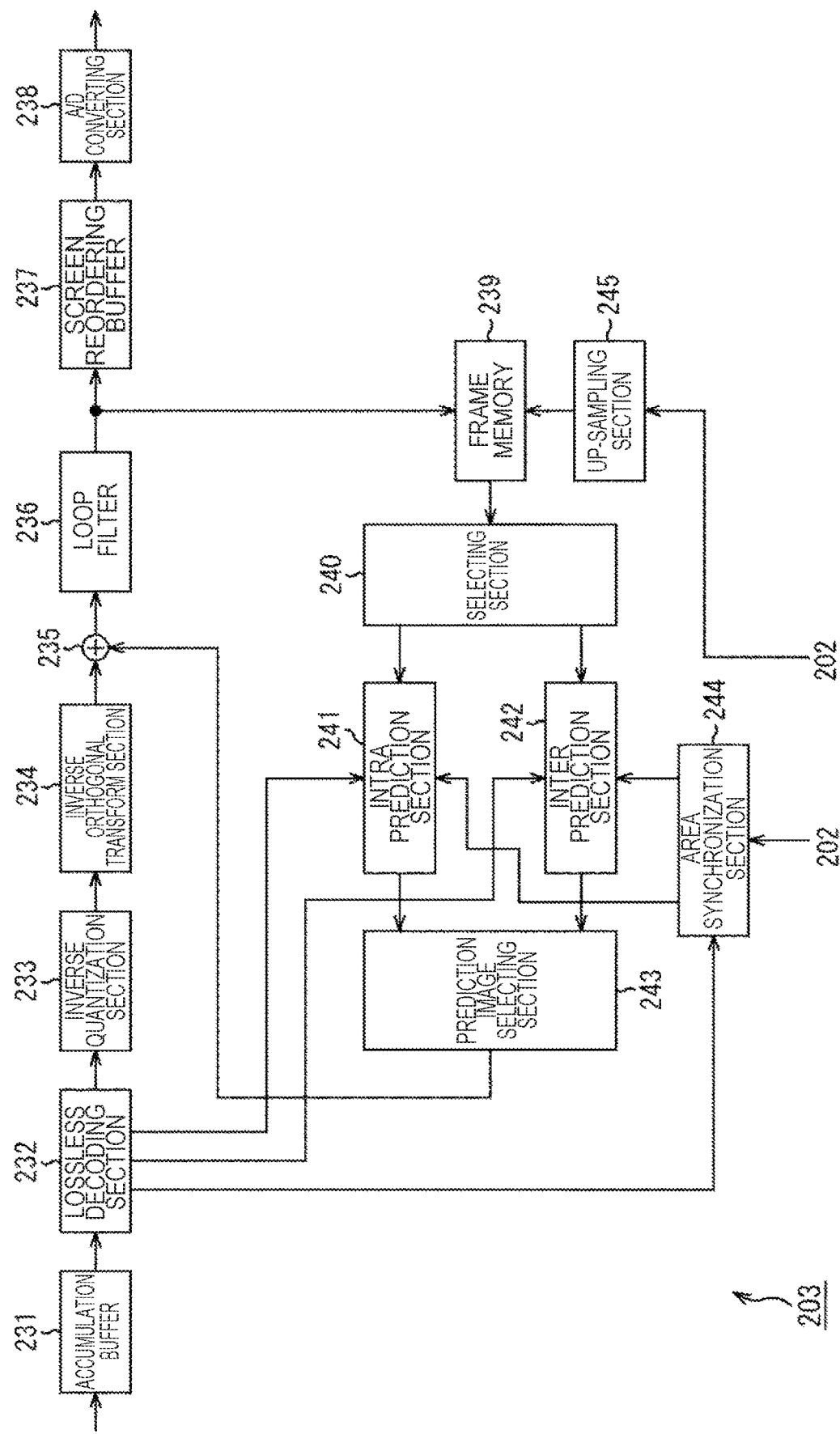
FIG. 28 is a block diagram illustrating an example of a main configuration of an enhancement layer image decoding section.

FIG. 28 is a block diagram illustrating an example of a main configuration of the enhancement layer image decoding section 203 of FIG. 26. As illustrated in FIG. 28, the enhancement layer image decoding section 203 has basically a configuration similar to that of the base layer image decoding section 202 of FIG. 27.

In other words, the enhancement layer image decoding section 203 includes an accumulation buffer 231, a lossless decoding section 232, an inverse quantization section 233, an inverse orthogonal transform section 234, an operation section 235, a loop filter 236, a screen reordering buffer 237, and a D/A conversion section 238 as illustrated in FIG. 28. The enhancement layer image decoding section 203 further includes a frame memory 239, a selecting section 240, an intra prediction section 241, an inter prediction section 242, and a prediction image selecting section 243.

The accumulation buffer 231 to the prediction image selecting section 243 correspond to the accumulation buffer 211 to the prediction image selecting section 223 of FIG. 27, and perform processes similar to those performed by the corresponding processing sections. However, the respective sections of the enhancement layer image decoding section 203 perform processing of encoding the enhancement layer image information rather than that of the base layer. Therefore, the description of the accumulation buffer 211 to the prediction image selecting section 223 of FIG. 27 can be applied as a description of processes of the accumulation buffer 231 to the prediction image selecting section 243, but, in this case, data to be processed needs to be data of the enhancement layer rather than data of the base layer. Further, it is necessary to interpret a processing section of data input source and data output destination as a corresponding processing section of the enhancement layer image decoding section 203 appropriately.

The enhancement layer image decoding section 203 further includes an area synchronization section 244 and an up-sampling section 245.

The area synchronization section 244 acquires the enhancement layer area division information and the synchronization area information supplied from the lossless decoding section 232. The information is generated at the decoding side and transmitted from the decoding side. Further, the area synchronization section 244 acquires the base layer area division information supplied from the base layer image decoding section 202.

The area synchronization section 244 controls an area in which the encoding-related information of the base layer is referred to in the decoding of the enhancement layer using the information. For example, the area synchronization section 244 controls an area of the base layer in which the encoding-related information is referred to when the intra prediction section 241 or the inter prediction section 242 performs the inter-layer prediction using the information. As a result, similarly to the time of encoding, the area synchronization section 244 can control an area in which the encoding-related information of the base layer is referred to in the decoding of the enhancement layer. Therefore, the area synchronization section 244 can reduce the number of memory accesses and suppress an increase in the decoding workload.

The enhancement layer image decoding section 203 performs encoding with reference to the encoding-related information of another layer (for example, the base layer).

The up-sampling section 245 acquires the encoding-related information of the base layer supplied from the base layer image decoding section 202. For example, the up-sampling section 245 acquires the texture information such as the decoded image (also referred to as a "decoded base layer image") of the base layer as the encoding-related information. Further, for example, when the inter layer syntax prediction process (the inter layer prediction) is performed, the up-sampling section 245 acquires the syntax information such as the motion information and the intra prediction mode information of the base layer as the encoding-related information as well.

The up-sampling section 245 performs the up-sampling process on the acquired encoding-related information of the base layer. In the scalable coding, different layers differ in a value of a certain parameter (for example, a resolution or the like) having a scalability function. Thus, the up-sampling section 245 performs the up-sampling process (performs the scalable parameter conversion process) on the encoding-related information of the base layer so that the value of the parameter is converted on the basis of the enhancement layer. As the up-sampling process is performed as described above, the encoding-related information of the base layer can be used in the decoding of the enhancement layer.

The up-sampling section 149 supplies the encoding-related information of the base layer that has undergone the up-sampling process to be stored in the frame memory 239. For example, the encoding-related information of the base layer is supplied to the intra prediction section 241 or the inter prediction section 242 as the reference image. Similarly, the syntax information is supplied to the intra prediction section 241 or the inter prediction section 242 as well.

<Area Synchronization Section>

Figure 29:
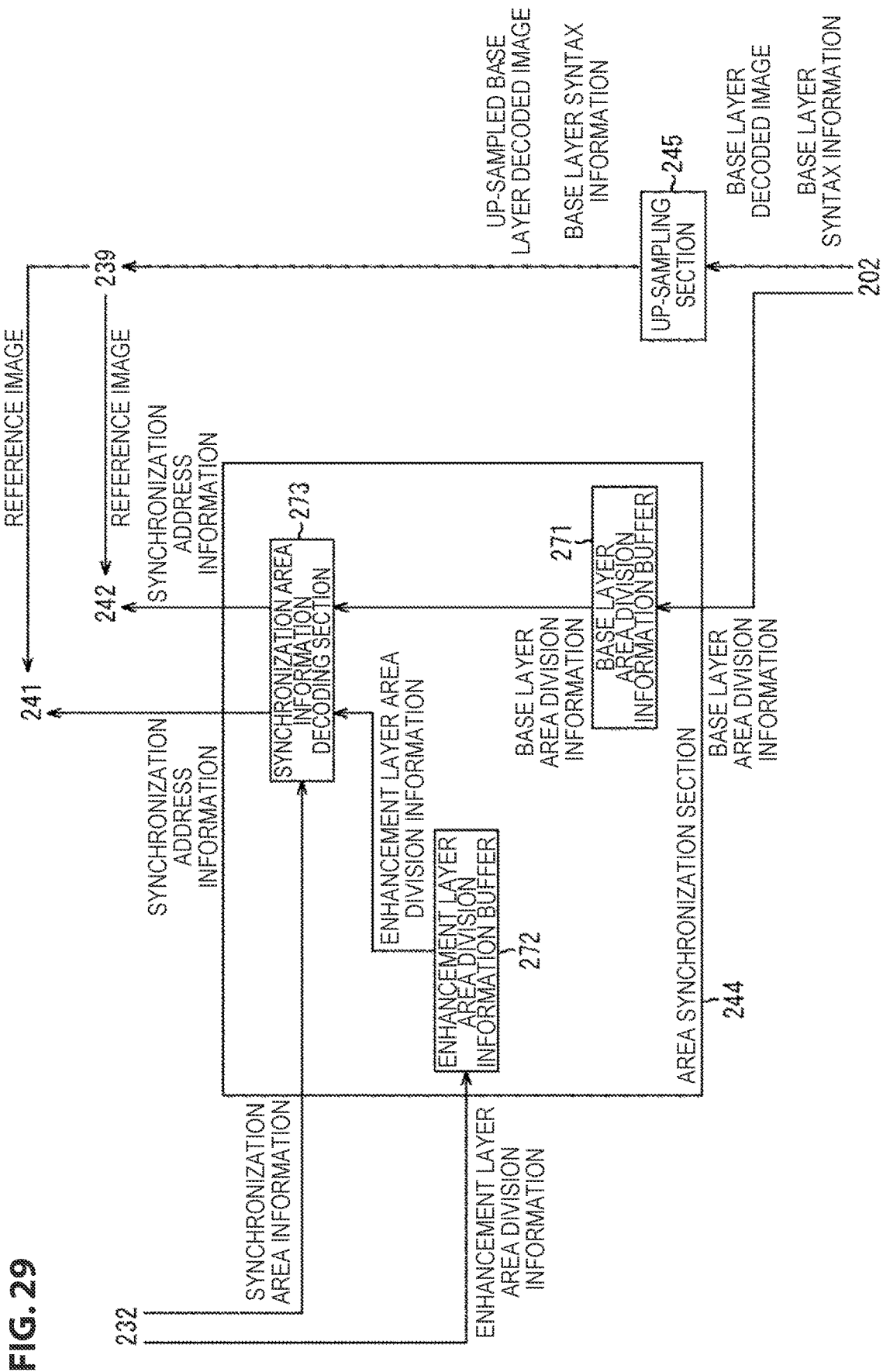
FIG. 29 is a block diagram illustrating an example of a main configuration of an area synchronization section.

FIG. 29 is a block diagram illustrating an example of a main configuration of the area synchronization section 244 of FIG. 28.

The area synchronization section 244 includes a base layer area division information buffer 271, an enhancement layer area division information buffer 272, and a synchronization area information decoding section 273 as illustrated in FIG. 29.

The base layer area division information buffer 271 acquires the base layer area division information supplied from the base layer image decoding section 202, that is, the base layer area division information supplied from the encoding side, and holds the acquired base layer area division information. The base layer area division information buffer 271 supplies the held base layer area division information to the synchronization area information decoding section 273 under certain timing or according to an external request from the synchronization area information decoding section 273 or the like.

The enhancement layer area division information buffer 272 acquires the enhancement layer area division information supplied from the lossless decoding section 232, that is, the enhancement layer area division information supplied from the encoding side, and holds the acquired enhancement layer area division information. The enhancement layer area division information buffer 272 supplies the held enhancement layer area division information to the synchronization area information decoding section 273 under certain timing or according to an external request from the synchronization area information decoding section 273 or the like.

The synchronization area information decoding section 273 acquires the base layer area division information from the base layer area division information buffer 271, and acquires the enhancement layer area division information from the enhancement layer area division information buffer 272. Further, the synchronization area information decoding section 273 acquires the synchronization area information supplied from the lossless decoding section 232, that is, acquires the synchronization area information supplied from the encoding side, and holds the acquired synchronization area information.

The synchronization area information is information used to control the area of the base layer serving as the reference destination of the encoding-related information of each area of the enhancement layer. The synchronization area information decoding section 273 decodes the synchronization area information using the base layer area division information and the enhancement layer area division information. In other words, the synchronization area information decoding section 273 detects a positional relation between the areas of the layers using the base layer area division information and the enhancement layer area division information, and analyzes the correspondence relation between the areas of the layers indicated by the synchronization area information according to the positional relation.

More specifically, the synchronization area information decoding section 273 specifies a position of data of the area of the base layer serving as the reference destination of the encoding-related information for the current area serving as the processing target of the enhancement layer in data of the encoding-related information such as the reference image supplied from the frame memory 239. The synchronization area information decoding section 273 generates the synchronization address information serving as information indicated by the position of the data, and supplies the synchronization address information to the intra prediction section 241 or the inter prediction section 242.

As a result, since all information used by the synchronization area information decoding section 273 is information supplied from the encoding side, the synchronization area information decoding section 273 can generate synchronization address information similar to that generated by the area synchronization setting section 173. In other words, the synchronization area information decoding section 273 can perform control similar to that performed by the area synchronization setting section 173.

Since the intra prediction section 241 or the inter prediction section 242 performs the inter-layer prediction according to the synchronization address information, only some areas of the picture of the base layer can be set as the reference destination, and an increase in the number of accesses to the frame memory 239 can be suppressed. In other words, the synchronization area information decoding section 273 can reduce the number of memory accesses and suppress an increase in the decoding workload by performing the above-described process.

<Flow of Image Decoding Process>

Next, the flow of each process performed by the image decoding device 200 will be described. First, an example of the flow of the image decoding process will be described with reference to a flowchart of FIG. 30.

When the image decoding process starts, in step S201, the demultiplexing unit 201 of the image decoding device 200 performs demultiplexing on the layered image encoded stream transmitted from the encoding side for each layer.

In step S202, the base layer image decoding section 202 decodes the base layer image encoded stream extracted in the process of step S201. The base layer image decoding section 202 outputs data of the base layer image generated by the decoding.

In step S203, the enhancement layer image decoding section 203 decodes the enhancement layer image encoded stream extracted in the process of step S201. The enhancement layer image decoding section 203 outputs data of the enhancement layer image generated by the decoding.

When the process of step S203 ends, the image decoding device 200 ends the image decoding process. One picture is processed in this image decoding process. Therefore, the image decoding device 200 repeatedly performs the image decoding process on each picture of the hierarchized moving image data.

<Flow of Base Layer Decoding Process>

Next, an example of the flow of the base layer decoding process performed by the base layer image decoding section 202 in step S202 of FIG. 30 will be described with reference to a flowchart of FIG. 31.

When the base layer decoding process starts, in step S221, the lossless decoding section 212 of the base layer image decoding section 202 decodes the encoded data acquired through the accumulation buffer 211, and acquires the base layer area division information supplied from the encoding side. Further, the lossless decoding section 212 supplies the base layer area division information to the respective sections of the base layer image decoding section 202.

The subsequent processes are executed for each of the areas set in step S221. In other words, each process is executed using the area or a certain unit smaller than the area as a processing unit.

In step S222, the accumulation buffer 211 accumulates the transmitted bitstream (encoded data). In step S223, the lossless decoding section 212 decodes the bitstream (encoded data) supplied from the accumulation buffer 211. In other words, image data such as an I picture, a P picture, and a B picture encoded by the lossless encoding section 116 is decoded. At this time, various kinds of information are decoded in addition to the image data included in the bitstream such as the header information.

In step S224, the inverse quantization section 213 inversely quantizes the quantized coefficients obtained in the process of step S223.

In step S225, the inverse orthogonal transform section 214 performs the inverse orthogonal transform on the coefficients inversely quantized in step S224.

In step S226, the intra prediction section 221 or the inter prediction section 222 performs the prediction process, and generates the predictive image. In other words, the prediction process is performed in the prediction mode that is determined to have been applied in the event of encoding in the lossless decoding section 212. More specifically, for example, when the intra prediction is applied in the event of encoding, the intra prediction section 221 generates the predictive image in the intra prediction mode recognized to be optimal in the event of encoding. Further, for example, when the inter prediction is applied in the event of encoding, the inter prediction section 222 generates the predictive image in the inter prediction mode recognized to be optimal in the event of encoding.

In step S227, the operation section 215 adds the differential image obtained by performing the inverse orthogonal transform in step S225 to the prediction image generated in step S226. As a result, the image data of the reconstructed image is obtained.

In step S228, the loop filter 216 appropriately performs the loop filter process including the deblock filter process, the adaptive loop filter process, or the like on the image data of the reconstructed image obtained in the process of step S227.

In step S229, the screen reordering buffer 217 reorders the respective frames of the reconstructed image that has undergone the filter process in step S228. In other words, the order of the frames reordered in the event of encoding is changed to the original display order.

In step S230, the D/A conversion section 218 performs the D/A conversion on the image in which the order of the frames is reordered in step S229. The image is output to a display (not illustrated), and the image is displayed.

In step S231, the frame memory 219 stores data such as the decoded image obtained in the process of step S228, the reconstructed image obtained in the process of step S227, and the like.

In step S232, the frame memory 219, the intra prediction section 221, and the inter prediction section 222 supplies the encoding-related information of the base layer supplied from the encoding side for the decoding process of the enhancement layer.

Figure 30:
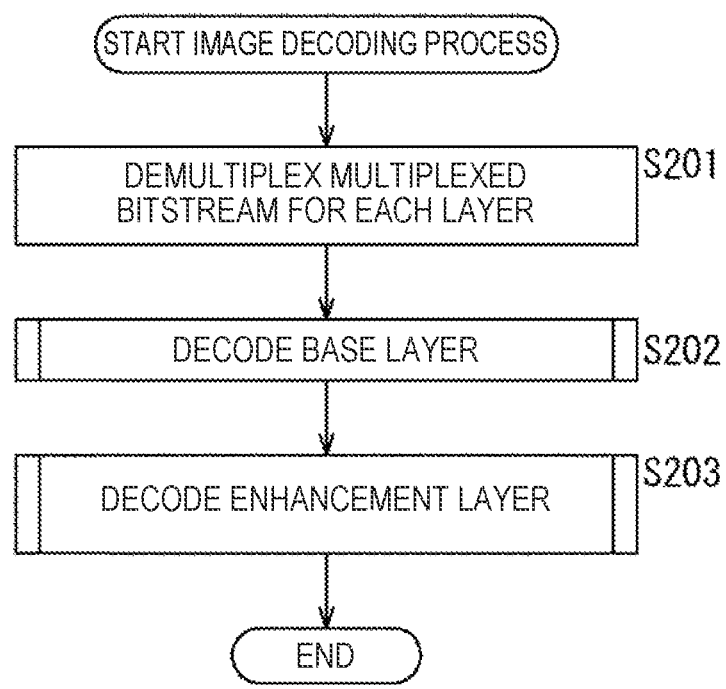
FIG. 30 is a flowchart for describing an example of the flow of an image decoding process.

When the process of step S232 ends, the base layer decoding process ends, and the process returns to FIG. 30.

<Flow of Enhancement Layer Decoding Process>

Next, an example of the flow of the enhancement layer decoding process performed by the enhancement layer image decoding section 203 in step S203 of FIG. 30 will be described with reference to flowcharts of FIGS. 32 and 33.

When the enhancement layer decoding process starts, in step S251, the base layer area division information buffer 271 of the enhancement layer image decoding section 203 acquires the base layer area division information supplied from the base layer image decoding section 202 in the base layer decoding process. The base layer area division information is information supplied from the encoding side.

In step S252, the up-sampling section 245 acquires the decoded base layer image (that is, texture information) supplied from the base layer image decoding section 202 in the base layer decoding process as the encoding-related information. Further, when the inter-layer syntax prediction is performed, the up-sampling section 245 acquires the syntax information supplied from the base layer image decoding section 202 in the base layer decoding process as the encoding-related information as well. The encoding-related information is information supplied from the encoding side or information restored based on information supplied from the encoding side.

In step S253, the up-sampling section 245 performs the up-sampling process on the encoding-related information of the base layer (for example, the decoded base layer image) acquired in step S252. The frame memory 239 stores the encoding-related information of the base layer (for example, the decoded base layer image) that has undergone the up-sampling process through the process of step S253.

In step S254, the enhancement layer area division information buffer 272 acquires the enhancement layer area division information supplied from the lossless decoding section 232. The enhancement layer area division information is information supplied from the encoding side.

In step S255, the synchronization area information decoding section 273 acquires the synchronization area information supplied from the lossless decoding section 232. The synchronization area information is information supplied from the encoding side.

In step S256, the synchronization area information decoding section 273 analyzes the synchronization area information acquired in step S255 using the base layer area division information acquired in step S251 and the enhancement layer area division information acquired in step S254, sets a position (a synchronization address) of data of the area of the base layer serving as the reference destination, and generates the synchronization address information indicating the synchronization address. The synchronization area information decoding section 273 supplies the generated synchronization address information to the intra prediction section 241 or the inter prediction section 242. The intra prediction section 241 or the inter prediction section 242 to which the synchronization address information has been supplied performs the inter-layer prediction using the synchronization address information.

Figure 33:
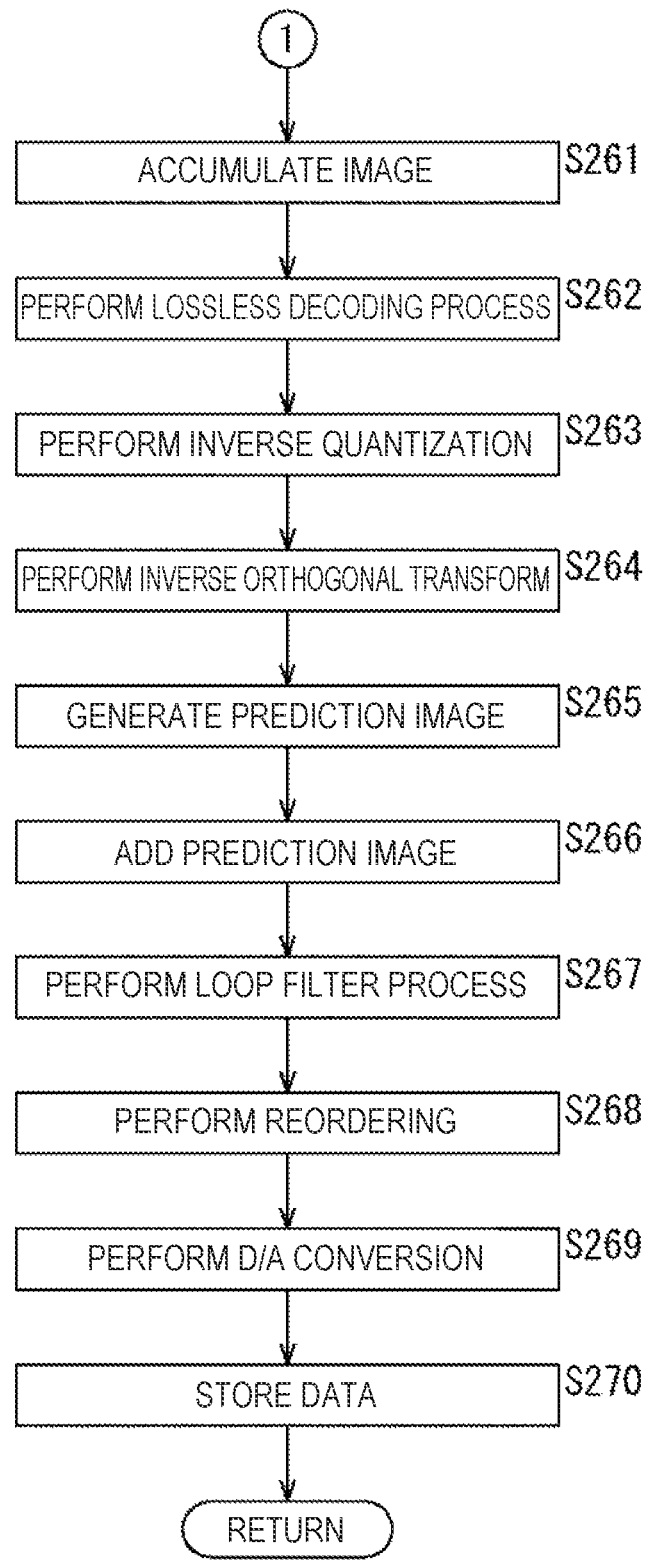
FIG. 33 is a flowchart for describing an example of the flow of an enhancement layer decoding process, continuing from FIG. 32.

When the process of step S256 ends, the process proceeds to step S21 of FIG. 33.

The subsequent processes are executed for each of the areas indicated by the enhancement layer area division information. In other words, each process is executed using the area or a certain unit smaller than the area as a processing unit.

Figure 31:
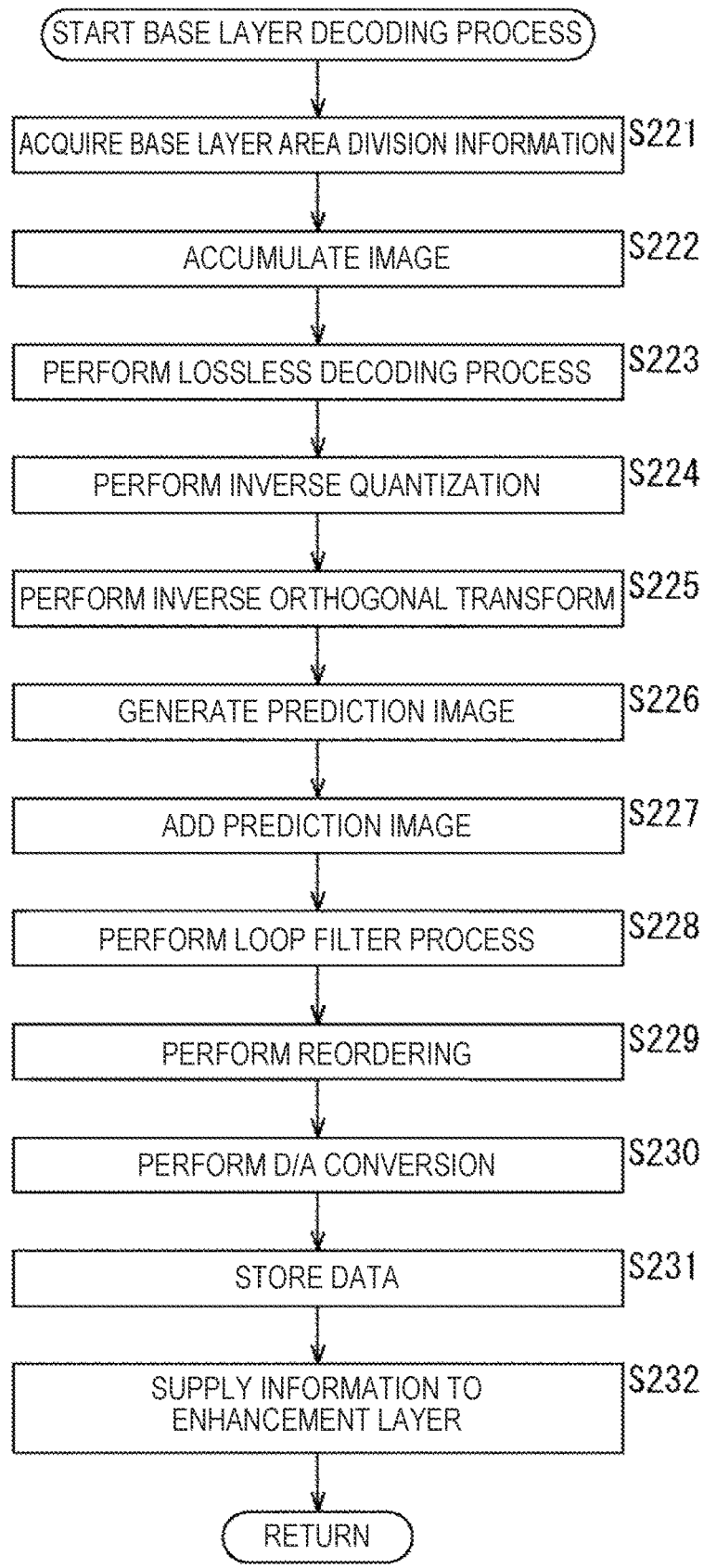
FIG. 31 is a flowchart for describing an example of the flow of a base layer decoding process.

The process of step S261 to step S270 of FIG. 33 corresponds and is performed similarly to the process of step S222 to step S231 of FIG. 31.

Figure 32:
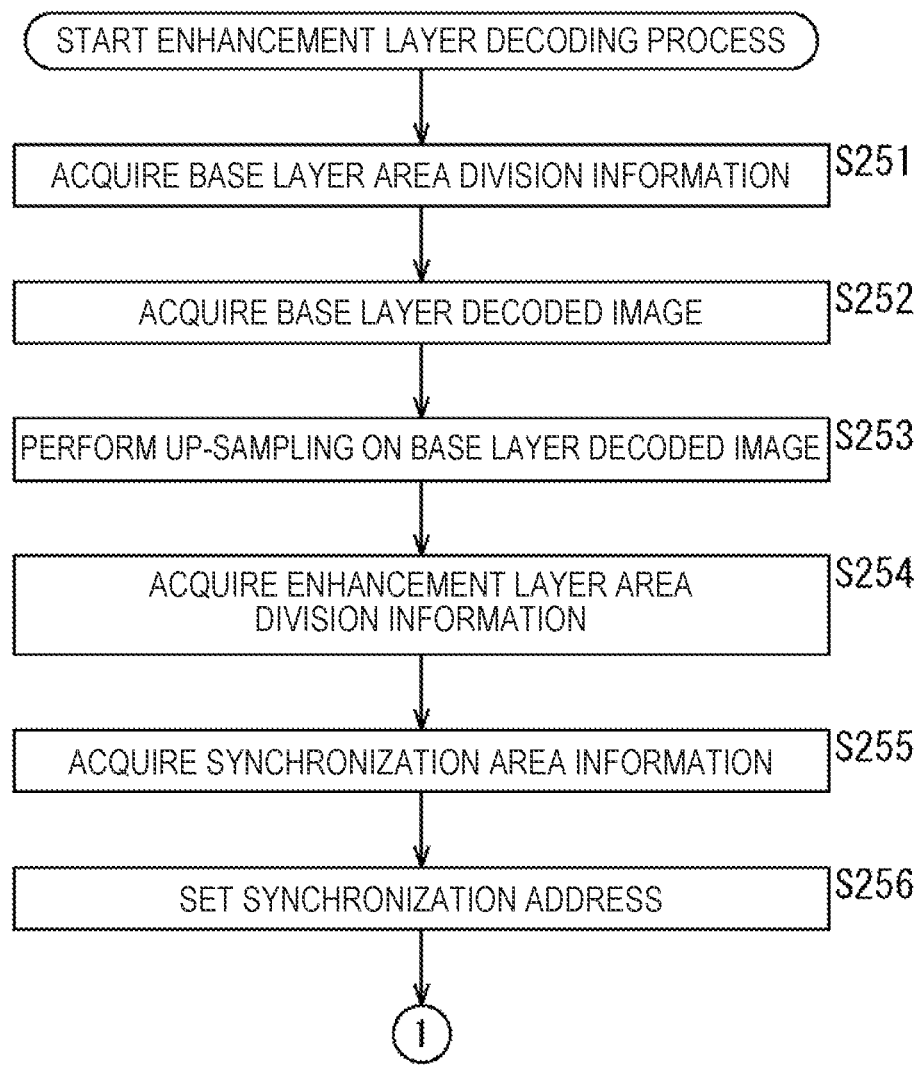
FIG. 32 is a flowchart for describing an example of the flow of an enhancement layer decoding process.

However, when the inter-layer prediction is performed, in step S265, the intra prediction section 241 or the inter prediction section 242 performs the process according to the synchronization address information generated in step S256 of FIG. 32. In other words, the intra prediction section 241 or the inter prediction section 242 performs the inter-layer prediction with reference to only the encoding-related information of the areas of the base layer designated by the synchronization address information.

When the process of step S270 ends, the enhancement layer decoding process ends, and the process returns to FIG. 30.

As the process is performed as described above, the image decoding device 200 can decrease the number of memory accesses for referring to the encoding-related information of another layer in the inter-layer prediction and suppress an increase in the decoding workload.

In the above example, the image data is hierarchized and divided into a plurality of layers through the scalable coding, but the number of layers is arbitrary. Further, in the above example, regarding encoding and decoding, the enhancement layer is processed with reference to the base layer, but the present disclosure is not limited to this example, and the enhancement layer may be processed with reference to another enhancement layer that has been processed.

For example, in the case of the image encoding device 100 of FIG. 18, the frame memory 142, the intra prediction section 144, and the inter prediction section 145 (FIG. 20) of the enhancement layer image encoding section 102 of the enhancement layer in which the encoding-related information is referred to may supply the encoding-related information of the enhancement layer to the enhancement layer image encoding section 102 of another enhancement layer in which the encoding-related information is referred to, similarly to the frame memory 122, the intra prediction section 124, and the inter prediction section 125 (FIG. 19).

Further, for example, in the case of the image decoding device 200 of FIG. 26, the frame memory 239, the intra prediction section 241, and the inter prediction section 242 (FIG. 28) of the enhancement layer image decoding section 203 of the enhancement layer in which the encoding-related information is referred to may supply the encoding-related information of the enhancement layer to the enhancement layer image decoding section 203 of another enhancement layer in which the encoding-related information of the enhancement layer is referred to, similarly to the frame memory 219, the intra prediction section 221, and the inter prediction section 222 (FIG. 27).

The present technology can be applied to a so-called image encoding device and an image decoding device based on a scalable coding/decoding scheme.

For example, the present technology can be applied to an image encoding device and an image decoding device used when image information (bitstream) compressed by an orthogonal transform such as a discrete cosine transform and motion compensation as in MPEG and H.26x is received via a network medium such as satellite broadcasting, cable television, the Internet, or a mobile telephone. Further, the present technology can be applied to an image encoding device and an image decoding device used when processing is performed on a storage medium such as an optical disc, a magnetic disk, or a flash memory.

4. Third Embodiment

<Application to Multi-View Image Coding/Multi-View Image Decoding>

Figure 34:
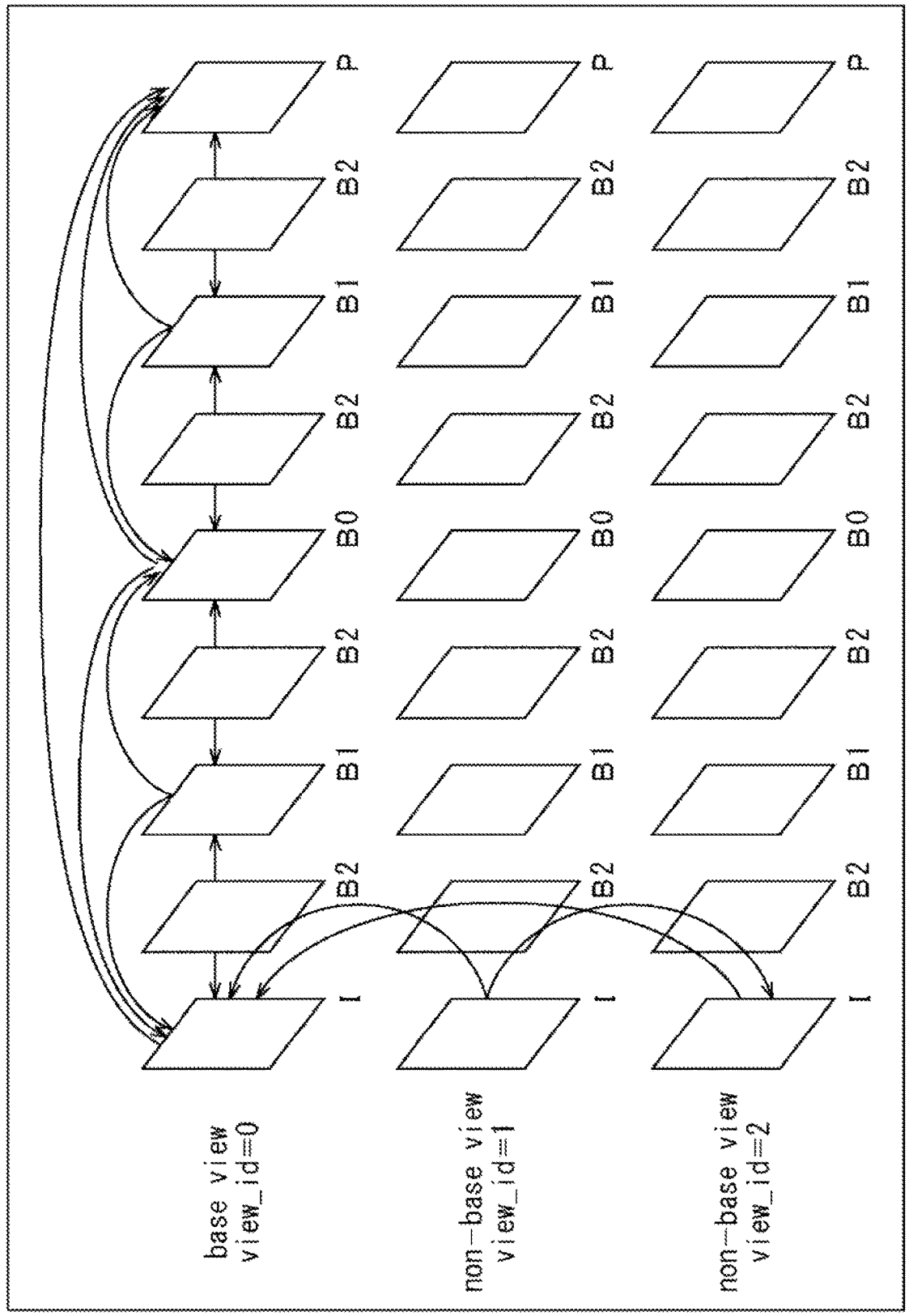
FIG. 34 is a diagram illustrating an example of a multi-view image encoding scheme.

The series of processes described above can be applied to multi-view image coding and multi-view image decoding. FIG. 34 illustrates an exemplary multi-view image coding scheme.

As illustrated in FIG. 34, a multi-view image includes images of a plurality of views. A plurality of views of the multi-view image includes a base view in which encoding and decoding are performed using only an image of its own view without using information of another view and a non-base view in which encoding and decoding are performed using information of another view. Encoding and decoding of the non-base view may be performed using information of the base view or using information of another non-base view.

In other words, a reference relation between views in the multi-view image coding and decoding is similar to the reference relation between layers in the scalable image encoding and decoding. Therefore, the above-described method may be applied to the encoding and decoding of a multi-view image illustrated in FIG. 34. In other words, in the encoding and decoding of the non-base view, an area of the base view (or another non-base view) in which the encoding-related information is referred to may be controlled. As a result, even in the case of the multi-view image, similarly, it is possible to suppress an increase in the encoding or decoding workload.

<Multi-View Image Encoding Device>

Figure 35:
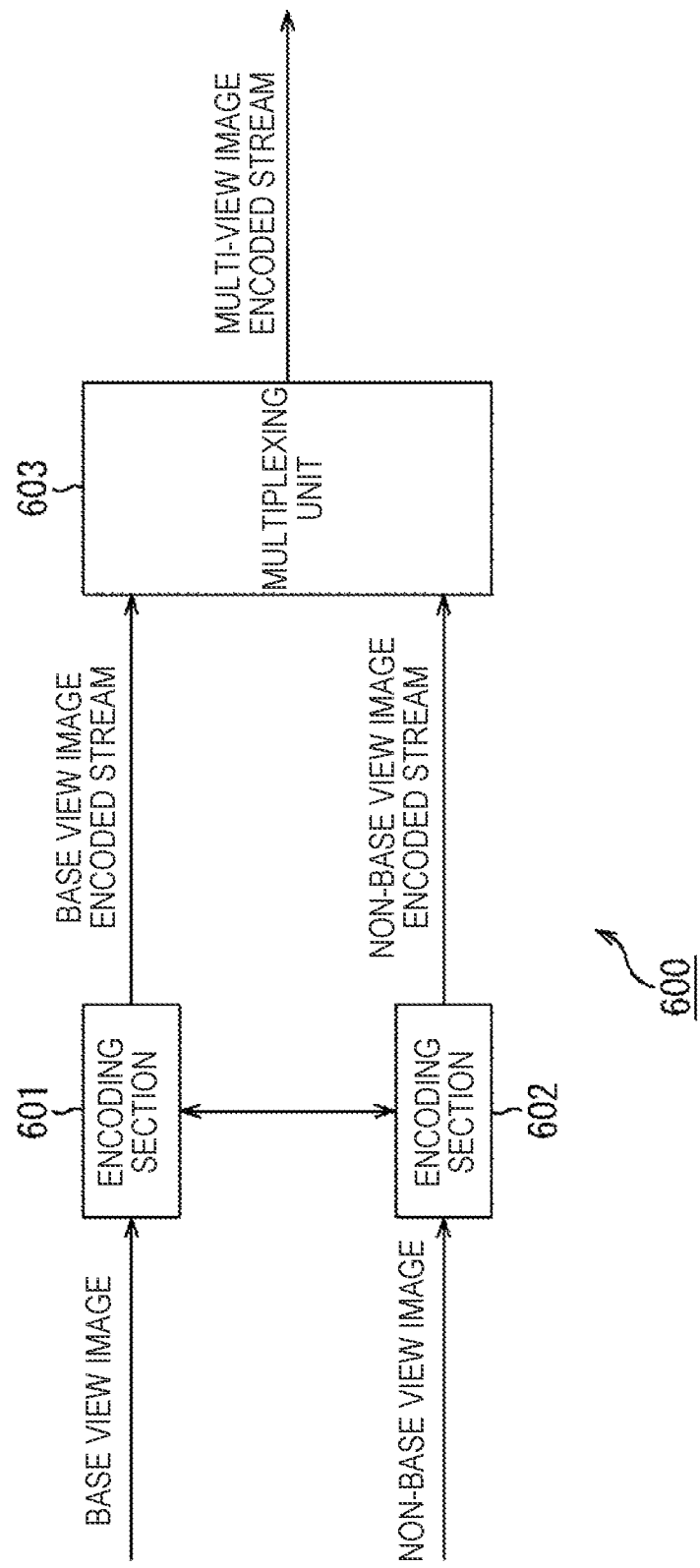
FIG. 35 is a diagram illustrating an example of a main configuration of a multi-view image encoding device to which the present disclosure is applied.

FIG. 35 is a diagram illustrating a multi-view image coding device that performs the multi-view image encoding. As illustrated in FIG. 35, a multi-view image encoding device 60) includes an encoding section 601, an encoding section 602, and a multiplexing unit 603.

The encoding section 601 encodes a base view image and generates a base view image encoded stream. The encoding section 602 encodes a non-base view image and generates a non-base view image encoded stream. The multiplexing section 603 multiplexes the base view image encoded stream generated in the encoding section 601 and the non-base view image encoded stream generated in the encoding section 602, and generates a multi-view image encoded stream.

The base layer image encoding section 101 (FIG. 19) may be applied as the encoding section 601 of the multi-view image encoding device 600, and the enhancement layer image encoding section 102 (FIG. 20) may be applied as the encoding section 602. In other words, in the encoding of the non-base view, an area of the base view (or another non-base view) in which the encoding-related information is referred to may be controlled. As a result, even in the case of the multi-view image, similarly, it is possible to suppress an increase in the encoding workload. Further, even in the case of the multi-view image encoding, it is possible to suppress an increase in the decoding workload by transmitting the control information used to control the area in which encoding-related information is referred to to the decoding side.

<Multi-View Image Decoding Device>

Figure 36:
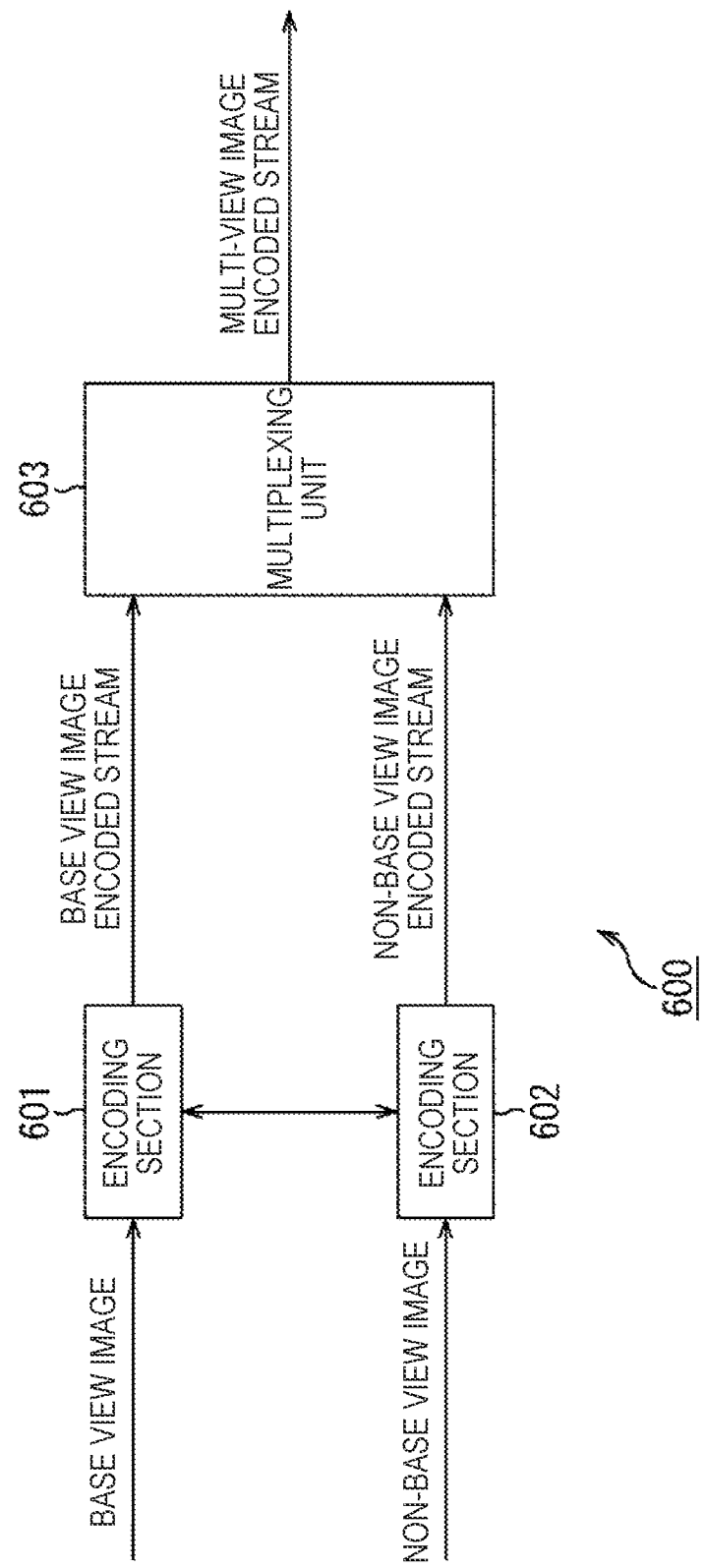
FIG. 36 is a diagram illustrating an example of a main configuration of a multi-view image decoding device to which the present disclosure is applied.

FIG. 36 is a diagram illustrating a multi-view image decoding device that performs the multi-view image decoding. As illustrated in FIG. 36, a multi-view image decoding device 610 includes a demultiplexing unit 611, a decoding section 612, and a decoding section 613.

The inverse multiplexing section 611 inversely multiplexes a multi-view image encoded stream in which a base view image encoded stream and a non-base view image encoded stream are multiplexed, and extracts the base view image encoded stream and the non-base view image encoded stream. The decoding section 612 decodes the base view image encoded stream extracted by the inverse multiplexing section 611 and obtains a base view image. The decoding section 613 decodes the non-base view image encoded stream extracted by the inverse multiplexing section 611 and obtains a non-base view image.

The base layer image decoding section (FIG. 27) may be applied as the decoding section 612 of the multi-view image decoding device 610, and the enhancement layer image decoding section 203 (FIG. 28) may be applied as the decoding section 613. In other words, in the decoding of the non-base view, an area of the base view (or another non-base view) in which the encoding-related information is referred to may be controlled. As a result, even in the case of the multi-view image, similarly, it is possible to suppress an increase in the decoding workload.

4. Fourth Embodiment

<Computer>

The above described series of processes can be executed by hardware or can be executed by software. When the series of processes are to be performed by software, the programs forming the software are installed into a computer. Here, a computer includes a computer which is incorporated in dedicated hardware or a general-purpose personal computer (PC) which can execute various functions by installing various programs into the computer, for example.

Figure 37:
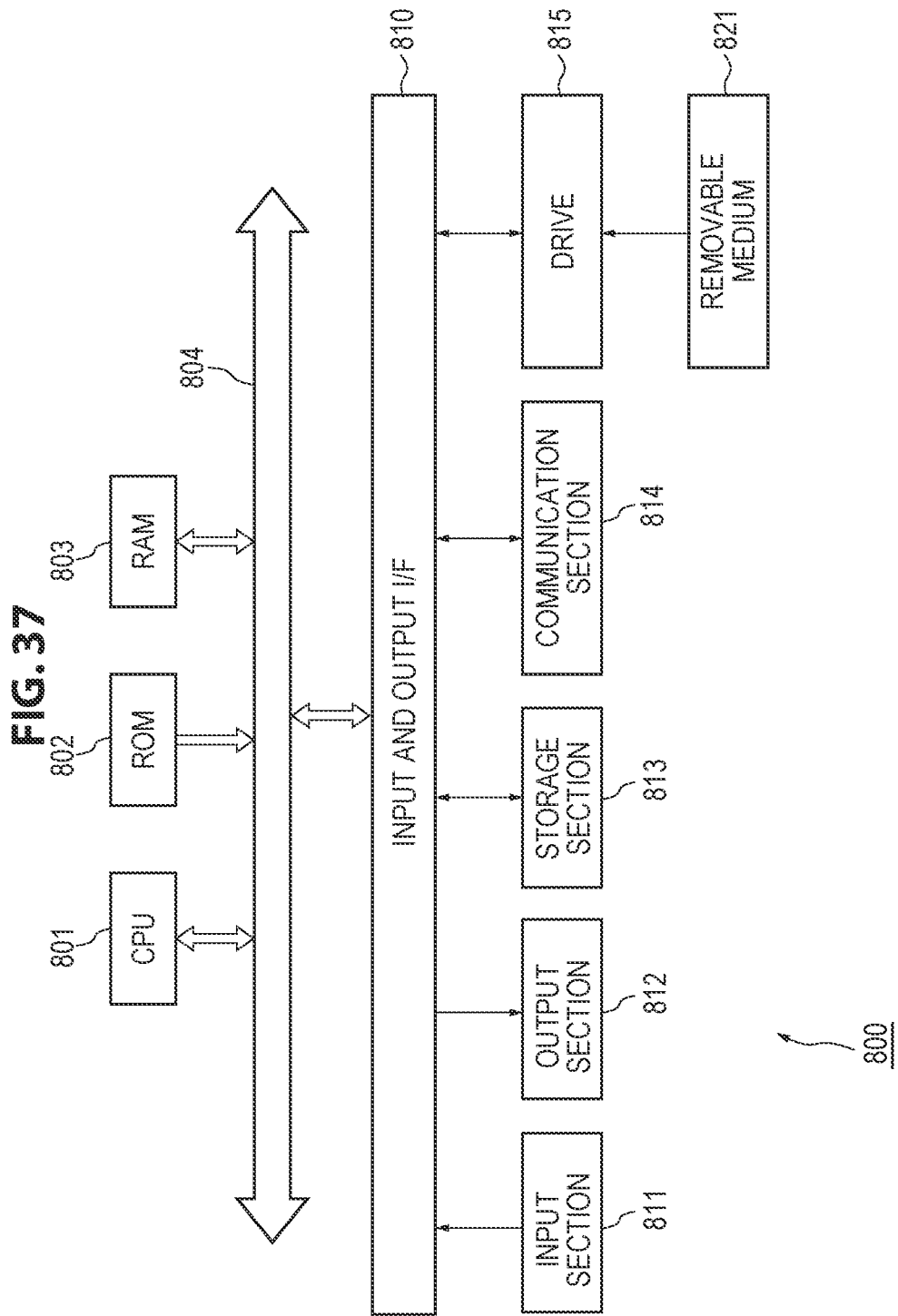
FIG. 37 is a block diagram illustrating an example of a main configuration of a computer.

FIG. 37 is a block diagram illustrating a configuration example of hardware of a computer for executing the above-described series of processes through a program.

In a computer 800 shown in FIG. 37, a central processing unit (CPU) 801, a read only memory (ROM) 802, and a random access memory (RAM) 803 are connected to one another by a bus 804.

An input and output interface 810 is further connected to the bus 804. An input section 811, an output section 812, a storage section 813, a communication section 814, and a drive 815 are connected to the input and output interface 810.

The input section 811 is formed with a keyboard, a mouse, a microphone, a touch panel, an input terminal, and the like. The output section 812 is formed with a display, a speaker, an output terminal, and the like. The storage section 813 is formed with a hard disk, a RAM disk, a nonvolatile memory, or the like. The communication section 814 is formed with a network interface or the like. The drive 815 drives a removable medium 821 such as a magnetic disk, an optical disk, a magneto-optical disk, or a semiconductor memory.

In the computer configured as described above, the CPU 801 loads the programs stored in the storage section 813 into the RAM 803 via the input and output interface 810 and the bus 804, and executes the programs, so that the above described series of processes are performed. The RAM 803 also stores data necessary for the CPU 801 to execute the various processes.

The program executed by the computer (the CPU 801) may be provided by being recorded on the removable medium 821 as a packaged medium or the like. In this case, by loading the removable medium 821 into the drive 815, the program can be installed into the storage section 813 via the input and output interface 810.

Further, the program may be provided through a wired or wireless transmission medium such as a local area network, the Internet, or digital broadcasting. In this case, it is also possible to receive the program from a wired or wireless transfer medium using the communication section 814 and install the program into the storage section 813.

Furthermore, the program can also be installed in advance into the ROM 802 or the storage section 813.

It should be noted that the program executed by a computer may be a program that is processed in time sequence according to the described sequence or a program that is processed in parallel or under necessary timing such as upon calling.

In the present disclosure, steps of describing the program to be recorded on the recording medium may include processing performed in time sequence according to the description order and processing not processed in time sequence but performed in parallel or individually.

In addition, in this disclosure, a system means a set of a plurality of constituent elements (devices, modules (parts), or the like) regardless of whether or not all constituent elements are arranged in the same housing. Thus, both a plurality of devices that is accommodated in separate housings and connected via a network and a single device in which a plurality of modules is accommodated in a single housing are systems.

Further, a constituent element described as a single device (or processing unit) above may be divided and configured as a plurality of devices (or processing units). On the contrary, constituent elements described as a plurality of devices (or processing units) above may be configured collectively as a single device (or processing unit). Further, a constituent element other than those described above may be added to each device (or processing unit). Furthermore, a part of a constituent element of a given device (or processing unit) may be included in a constituent element of another device (or another processing unit) as long as the configuration or operation of the system as a whole is substantially the same.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

The image encoding device and the image decoding device according to the embodiment may be applied to various electronic devices such as transmitters and receivers for satellite broadcasting, cable broadcasting such as cable TV, distribution on the Internet, distribution to terminals via cellular communication and the like, recording devices that record images in a medium such as optical discs, magnetic disks and flash memory, and reproduction devices that reproduce images from such storage medium. Four applications will be described below.

6. Applications

<First Application: Television Receiver>

Figure 38:
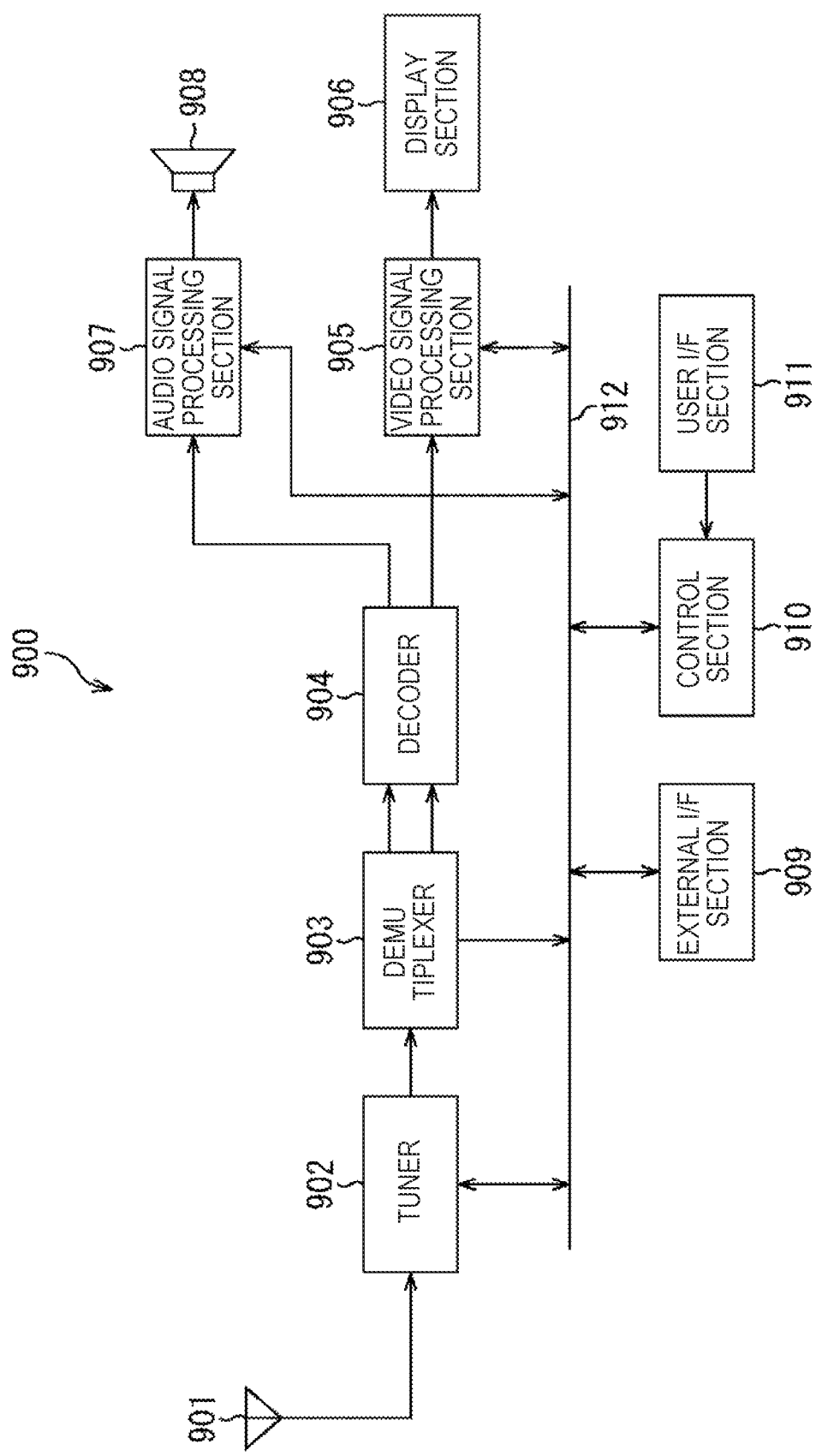
FIG. 38 is a block diagram illustrating an example of a schematic configuration of a television device.

FIG. 38 illustrates an example of a schematic configuration of a television device to which the embodiment is applied. A television device 900 includes an antenna 901, a tuner 902, a demultiplexer 903, a decoder 904, an video signal processing section 905, a display section 906, an audio signal processing section 907, a speaker 908, an external interface (I/F) section 909, a control section 910, a user interface (I/F) 911, and a bus 912.

The tuner 902 extracts a signal of a desired channel from broadcast signals received via the antenna 901, and demodulates the extracted signal. The tuner 902 then outputs an encoded bitstream obtained through the demodulation to the demultiplexer 903. That is, the tuner 902 serves as a transmission unit of the television device 900 for receiving an encoded stream in which an image is encoded.

The demultiplexer 903 demultiplexes the encoded bitstream to obtain a video stream and an audio stream of a program to be viewed, and outputs each stream obtained through the demultiplexing to the decoder 904. The demultiplexer 903 also extracts auxiliary data such as electronic program guides (EPGs) from the encoded bitstream, and supplies the extracted data to the control section 910. Additionally, the demultiplexer 903 may perform descrambling when the encoded bitstream is scrambled.

The decoder 904 decodes the video stream and the audio stream input from the demultiplexer 903. The decoder 904 then outputs video data generated in the decoding process to the video signal processing section 905. The decoder 904 also outputs the audio data generated in the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data in accordance with the setting. Furthermore, the video signal processing section 905 may generate an image of a graphical user interface (GUI) such as a menu, a button and a cursor, and superimpose the generated image on an output image.

The display section 906 is driven by a drive signal supplied from the video signal processing section 905, and displays video or an image on a video screen of a display device (e.g. liquid crystal display, plasma display, organic electroluminescence display (OLED), etc.).

The audio signal processing section 907 performs a reproduction process such as D/A conversion and amplification on the audio data input from the decoder 904, and outputs sound from the speaker 908. The audio signal processing section 907 may also perform an additional process such as noise removal on the audio data.

The external interface section 909 is an interface for connecting the television device 900 to an external device or a network. For example, a video stream or an audio stream received via the external interface section 909 may be decoded by the decoder 904. That is, the external interface section 909 also serves as a transmission unit of the television device 900 for receiving an encoded stream in which an image is encoded.

The control section 910 includes a processor such as a central processing unit (CPU), and a memory such as random access memory (RAM) and read only memory (ROM). The memory stores a program to be executed by the CPU, program data, EPG data, data acquired via a network, and the like. The program stored in the memory is read out and executed by the CPU at the time of activation of the television device 900, for example. The CPU controls the operation of the television device 900, for example, in accordance with an operation signal input from the user interface section 911 by executing the program.

The user interface section 911 is connected to the control section 910. The user interface section 911 includes, for example, a button and a switch used for a user to operate the television device 900, and a receiving section for a remote control signal. The user interface section 911 detects an operation of a user via these constituent elements, generates an operation signal, and outputs the generated operation signal to the control section 910.

The bus 912 connects the tuner 902, the demultiplexer 903, the decoder 904, the video signal processing section 905, the audio signal processing section 907, the external interface section 909, and the control section 910 to each other.

The decoder 904 has a function of the image decoding device 200 according to the embodiment in the television device 900 configured in this manner. Accordingly, it is possible to suppress an increase in the decoding workload when an image is decoded in the television device 900.

<Second Application: Mobile Phone>

Figure 39:
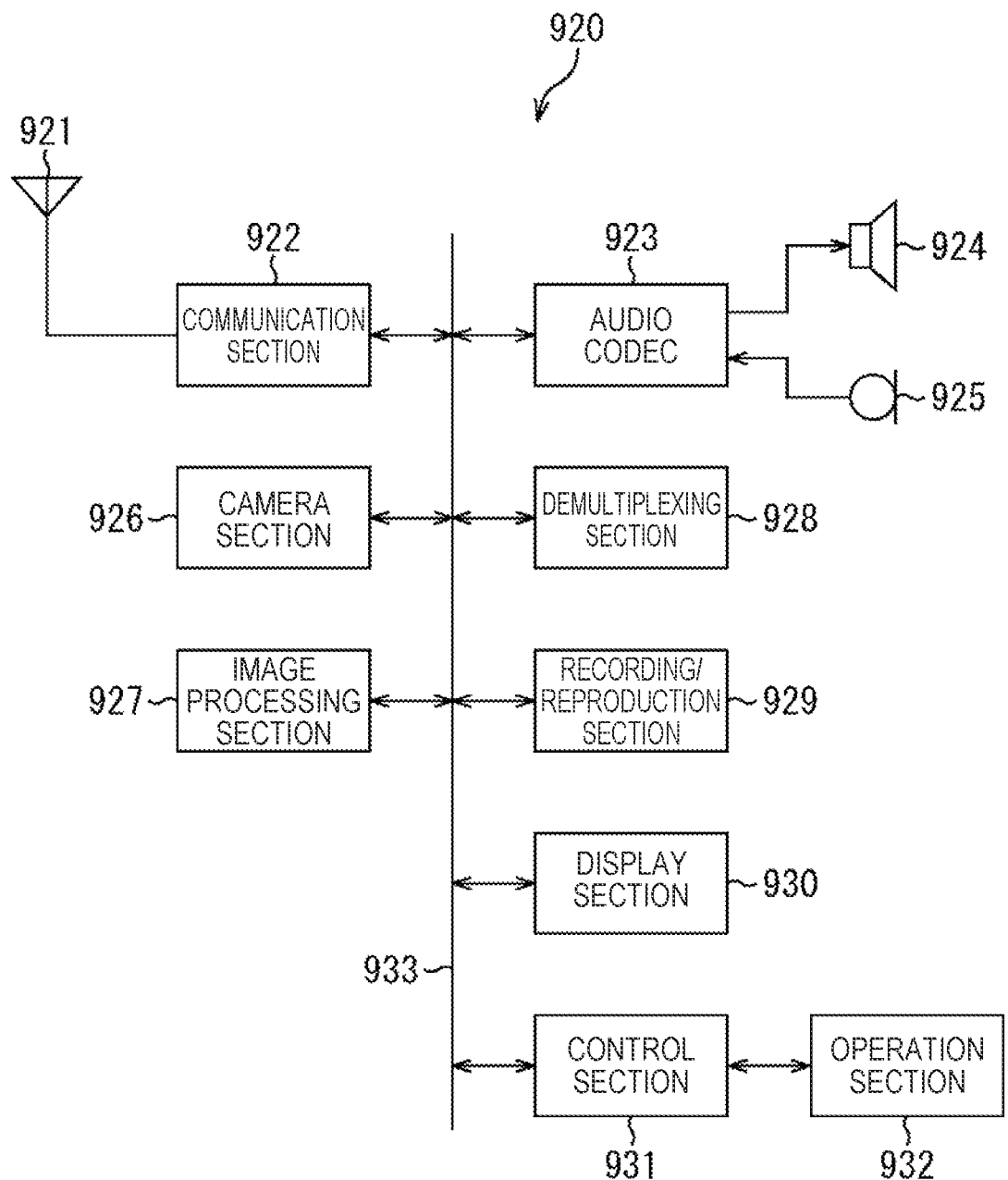
FIG. 39 is a block diagram illustrating an example of a schematic configuration of a mobile phone.

FIG. 39 illustrates an example of a schematic configuration of a mobile phone to which the embodiment is applied. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs an operation such as transmission and reception of an audio signal, transmission and reception of email or image data, image capturing, and recording of data in various operation modes including an audio call mode, a data communication mode, an image capturing mode, and a videophone mode.

An analogue audio signal generated by the microphone 925 is supplied to the audio codec 923 in the audio call mode. The audio codec 923 converts the analogue audio signal into audio data, has the converted audio data subjected to the A/D conversion, and compresses the converted data. The audio codec 923 then outputs the compressed audio data to the communication section 922. The communication section 922 encodes and modulates the audio data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal, generates audio data, and outputs the generated audio data to the audio codec 923. The audio codec 923 extends the audio data, has the audio data subjected to the D/A conversion, and generates an analogue audio signal. The audio codec 923 then supplies the generated audio signal to the speaker 924 to output sound.

The control section 931 also generates text data constituting email in accordance with an operation made by a user via the operation section 932, for example. Moreover, the control section 931 causes the display section 930 to display the text. Furthermore, the control section 931 generates email data in accordance with a transmission instruction from a user via the operation section 932, and outputs the generated email data to the communication section 922. The communication section 922 encodes and modulates the email data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal to restore the email data, and outputs the restored email data to the control section 931. The control section 931 causes the display section 930 to display the content of the email, and also causes the storage medium of the recording/reproduction section 929 to store the email data.

The recording/reproduction section 929 includes a readable and writable storage medium. For example, the storage medium may be a built-in storage medium such as RAM and flash memory, or an externally mounted storage medium such as hard disks, magnetic disks, magneto-optical disks, optical discs, universal serial bus (USB) memory, and memory cards.

Furthermore, the camera section 926, for example, captures an image of a subject to generate image data, and outputs the generated image data to the image processing section 927 in the image capturing mode. The image processing section 927 encodes the image data input from the camera section 926, and causes the storage medium of the recording/reproduction section 929 to store the encoded stream.

Furthermore, the demultiplexing section 928, for example, multiplexes a video stream encoded by the image processing section 927 and an audio stream input from the audio codec 923, and outputs the multiplexed stream to the communication section 922 in the videophone mode. The communication section 922 encodes and modulates the stream, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. These transmission signal and received signal may include an encoded bitstream. The communication section 922 then demodulates and decodes the received signal to restore the stream, and outputs the restored stream to the demultiplexing section 928. The demultiplexing section 928 demultiplexes the input stream to obtain a video stream and an audio stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends the audio stream, has the audio stream subjected to the D/A conversion, and generates an analogue audio signal. The audio codec 923 then supplies the generated audio signal to the speaker 924, and causes sound to be output.

In the mobile telephone 920 having the above configuration, the image processing section 927 has the functions of the image encoding device 100 (FIG. 18) and the image decoding device 200 (FIG. 26) according to the above embodiment. Thus, when the mobile telephone 920 encodes and decodes an image, it is possible to suppress an increase in workload.

<Third Application: Recording/Reproduction Device>

Figure 40:
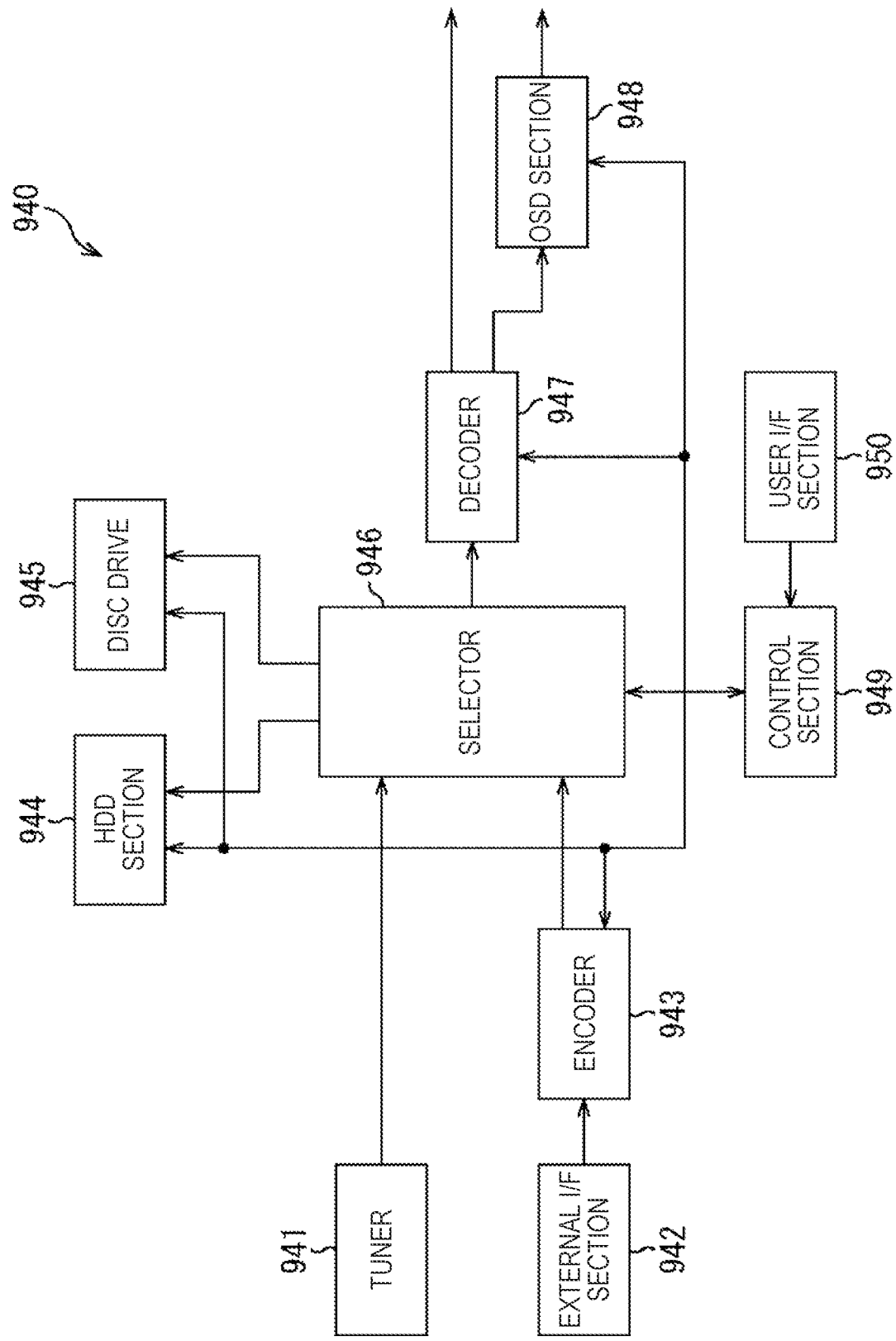
FIG. 40 is a block diagram illustrating an example of a schematic configuration of a recording/reproduction device.

FIG. 40 illustrates an example of a schematic configuration of a recording/reproduction device to which the embodiment is applied. A recording/reproduction device 940, for example, encodes audio data and video data of a received broadcast program and records the encoded audio data and the encoded video data in a recording medium. For example, the recording/reproduction device 940 may also encode audio data and video data acquired from another device and record the encoded audio data and the encoded video data in a recording medium. Furthermore, the recording/reproduction device 940, for example, uses a monitor or a speaker to reproduce the data recorded in the recording medium in accordance with an instruction of a user. At this time, the recording/reproduction device 940 decodes the audio data and the video data.

The recording/reproduction device 940 includes a tuner 941, an external interface (I/F) section 942, an encoder 943, a hard disk drive (HDD) 944, a disc drive 945, a selector 946, a decoder 947, an on-screen display (OSD) 948, a control section 949, and a user interface (I/F) section 950.

The tuner 941 extracts a signal of a desired channel from broadcast signals received via an antenna (not shown), and demodulates the extracted signal. The tuner 941 then outputs an encoded bitstream obtained through the demodulation to the selector 946. That is, the tuner 941 serves as a transmission unit of the recording/reproduction device 940.

The external interface section 942 is an interface for connecting the recording/reproduction device 940 to an external device or a network. For example, the external interface section 942 may be an IEEE 1394 interface, a network interface, an USB interface, a flash memory interface, or the like. For example, video data and audio data received via the external interface section 942 are input to the encoder 943. That is, the external interface section 942 serves as a transmission unit of the recording/reproduction device 940.

When the video data and the audio data input from the external interface section 942 have not been encoded, the encoder 943 encodes the video data and the audio data. The encoder 943 then outputs an encoded bitstream to the selector 946.

The HDD 944 records, in an internal hard disk, the encoded bitstream in which content data of video and sound is compressed, various programs, and other data. The HDD 944 also reads out the data from the hard disk at the time of reproducing video or sound.

The disc drive 945 records and reads out data in a recording medium that is mounted. The recording medium that is mounted on the disc drive 945 may be, for example, a DVD disc (DVD-Video, DVD-RAM, DVD-R, DVD-RW, a DVD+R, DVD+RW, etc.), a Blu-ray (registered trademark) disc, or the like.

The selector 946 selects, at the time of recording video or sound, an encoded bitstream input from the tuner 941 or the encoder 943, and outputs the selected encoded bitstream to the HDD 944 or the disc drive 945. The selector 946 also outputs, at the time of reproducing video or sound, an encoded bitstream input from the HDD 944 or the disc drive 945 to the decoder 947.

The decoder 947 decodes the encoded bitstream, and generates video data and audio data. The decoder 947 then outputs the generated video data to the OSD 948. The decoder 947 also outputs the generated audio data to an external speaker.

The OSD 948 reproduces the video data input from the decoder 947, and displays video. The OSD 948 may also superimpose an image of a GUI such as a menu, a button, and a cursor on a displayed video.

The control section 949 includes a processor such as a CPU, and a memory such as RAM and ROM. The memory stores a program to be executed by the CPU, program data, and the like. For example, a program stored in the memory is read out and executed by the CPU at the time of activation of the recording/reproduction device 940. The CPU controls the operation of the recording/reproduction device 940, for example, in accordance with an operation signal input from the user interface section 950 by executing the program.

The user interface section 950 is connected to the control section 949. The user interface section 950 includes, for example, a button and a switch used for a user to operate the recording/reproduction device 940, and a receiving section for a remote control signal. The user interface section 950 detects an operation made by a user via these constituent elements, generates an operation signal, and outputs the generated operation signal to the control section 949.

In the recording/reproducing device 940 having the above configuration, the encoder 943 has the function of the image encoding device 100 (FIG. 18) according to the above embodiment. The decoder 947 has the function of the image decoding device 200 (FIG. 26) according to the above embodiment. Thus, when the recording/reproducing device 940 encodes and decodes an image, it is possible to suppress an increase in workload.

<Fourth Application: Image Capturing Device>

Figure 41:
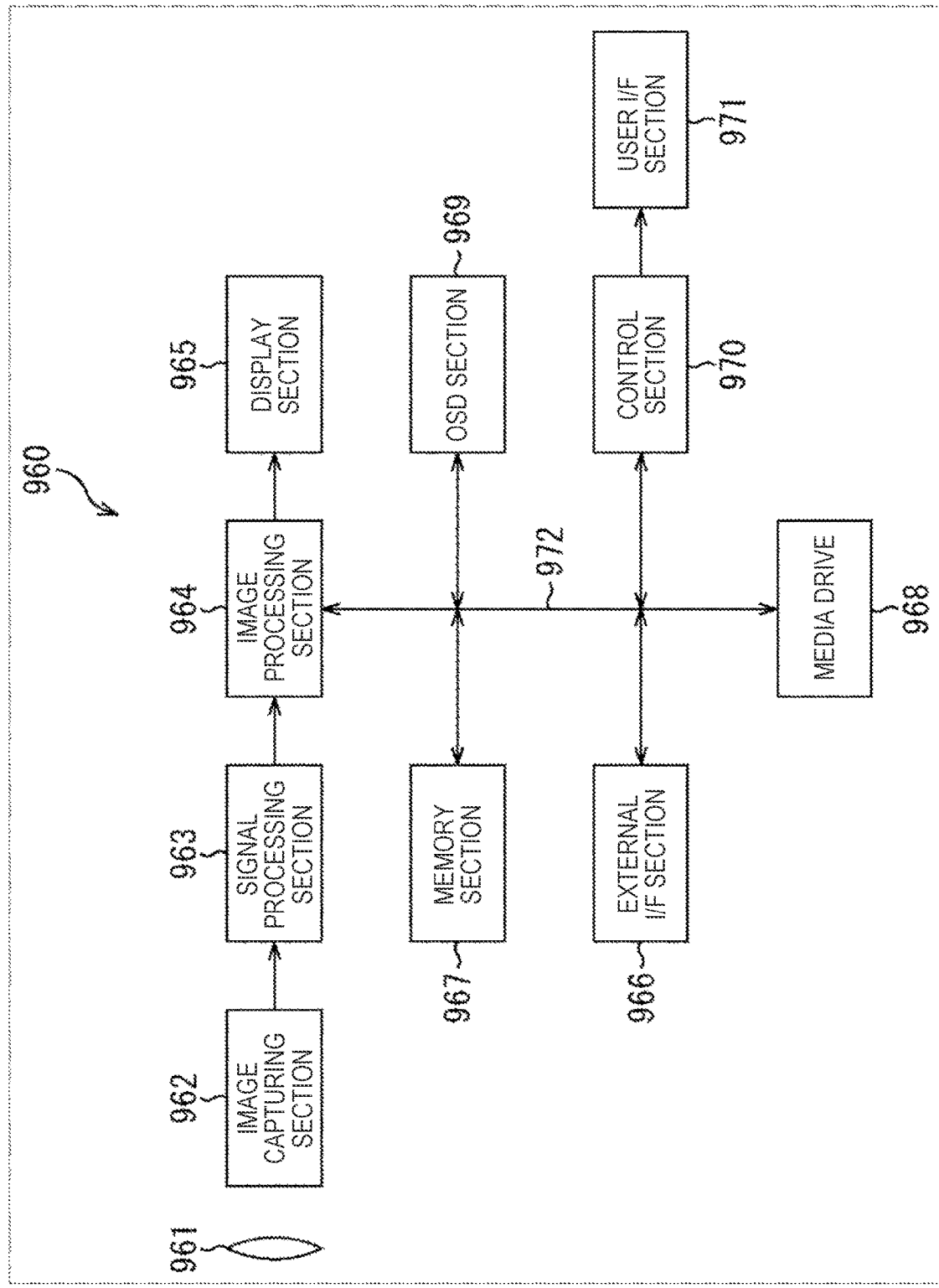
FIG. 41 is a block diagram illustrating an example of a schematic configuration of an image capturing device.

FIG. 41 illustrates an example of a schematic configuration of an image capturing device to which the embodiment is applied. An image capturing device 960 captures an image of a subject to generate an image, encodes the image data, and records the image data in a recording medium.

The image capturing device 960 includes an optical block 961, an image capturing section 962, a signal processing section 963, an image processing section 964, a display section 965, an external interface (I/F) section 966, a memory 967, a media drive 968, an OSD 969, a control section 970, a user interface (I/F) section 971, and a bus 972.

The optical block 961 is connected to the image capturing section 962. The image capturing section 962 is connected to the signal processing section 963. The display section 965 is connected to the image processing section 964. The user interface section 971 is connected to the control section 970. The bus 972 connects the image processing section 964, the external interface section 966, the memory 967, the media drive 968, the OSD 969, and the control section 970 to each other.

The optical block 961 includes a focus lens, an aperture stop mechanism, and the like. The optical block 961 forms an optical image of a subject on an image capturing surface of the image capturing section 962. The image capturing section 962 includes an image sensor such as a charge coupled device (CCD) and a complementary metal oxide semiconductor (CMOS), and converts the optical image formed on the image capturing surface into an image signal which is an electrical signal through photoelectric conversion. The image capturing section 962 then outputs the image signal to the signal processing section 963.

The signal processing section 963 performs various camera signal processes such as knee correction, gamma correction, and color correction on the image signal input from the image capturing section 962. The signal processing section 963 outputs the image data subjected to the camera signal process to the image processing section 964.

The image processing section 964 encodes the image data input from the signal processing section 963, and generates encoded data. The image processing section 964 then outputs the generated encoded data to the external interface section 966 or the media drive 968. The image processing section 964 also decodes encoded data input from the external interface section 966 or the media drive 968, and generates image data. The image processing section 964 then outputs the generated image data to the display section 965. The image processing section 964 may also output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI such as a menu, a button, and a cursor, and outputs the generated image to the image processing section 964.

The external interface section 966 is configured, for example, as an USB input and output terminal. The external interface section 966 connects the image capturing device 960 and a printer, for example, at the time of printing an image. A drive is further connected to the external interface section 966 as needed. A removable medium such as magnetic disks and optical discs is mounted on the drive, and a program read out from the removable medium may be installed in the image capturing device 960. Furthermore, the external interface section 966 may be configured as a network interface to be connected to a network such as a LAN and the Internet. That is, the external interface section 966 serves as a transmission unit of the image capturing device 960.

A recording medium to be mounted on the media drive 968 may be a readable and writable removable medium such as magnetic disks, magneto-optical disks, optical discs, and semiconductor memory. The recording medium may also be fixedly mounted on the media drive 968, configuring a non-transportable storage section such as built-in hard disk drives or solid state drives (SSDs).

The control section 970 includes a processor such as a CPU, and a memory such as a RAM and a ROM. The memory stores a program to be executed by the CPU, program data, and the like. A program stored in the memory is read out and executed by the CPU, for example, at the time of activation of the image capturing device 960. The CPU controls the operation of the image capturing device 960, for example, in accordance with an operation signal input from the user interface section 971 by executing the program.

The user interface section 971 is connected to the control section 970. The user interface section 971 includes, for example, a button, a switch, and the like used for a user to operate the image capturing device 960. The user interface section 971 detects an operation made by a user via these constituent elements, generates an operation signal, and outputs the generated operation signal to the control section 970.

In the imaging device 960 having the above configuration, the image processing section 964 has the functions of the image encoding device 100 (FIG. 18) and the image decoding device 200 (FIG. 26) according to the above embodiment. Thus, when the imaging device 960 encodes and decodes an image, it is possible to suppress an increase in workload.

7. Application Example of Scalable Coding

<First System>

Next, a specific example of using scalable encoded data, in which a scalable coding (image encoding) is performed, will be described. The scalable coding, for example, is used for selection of data to be transmitted as examples illustrated in FIG. 42.

Figure 42:
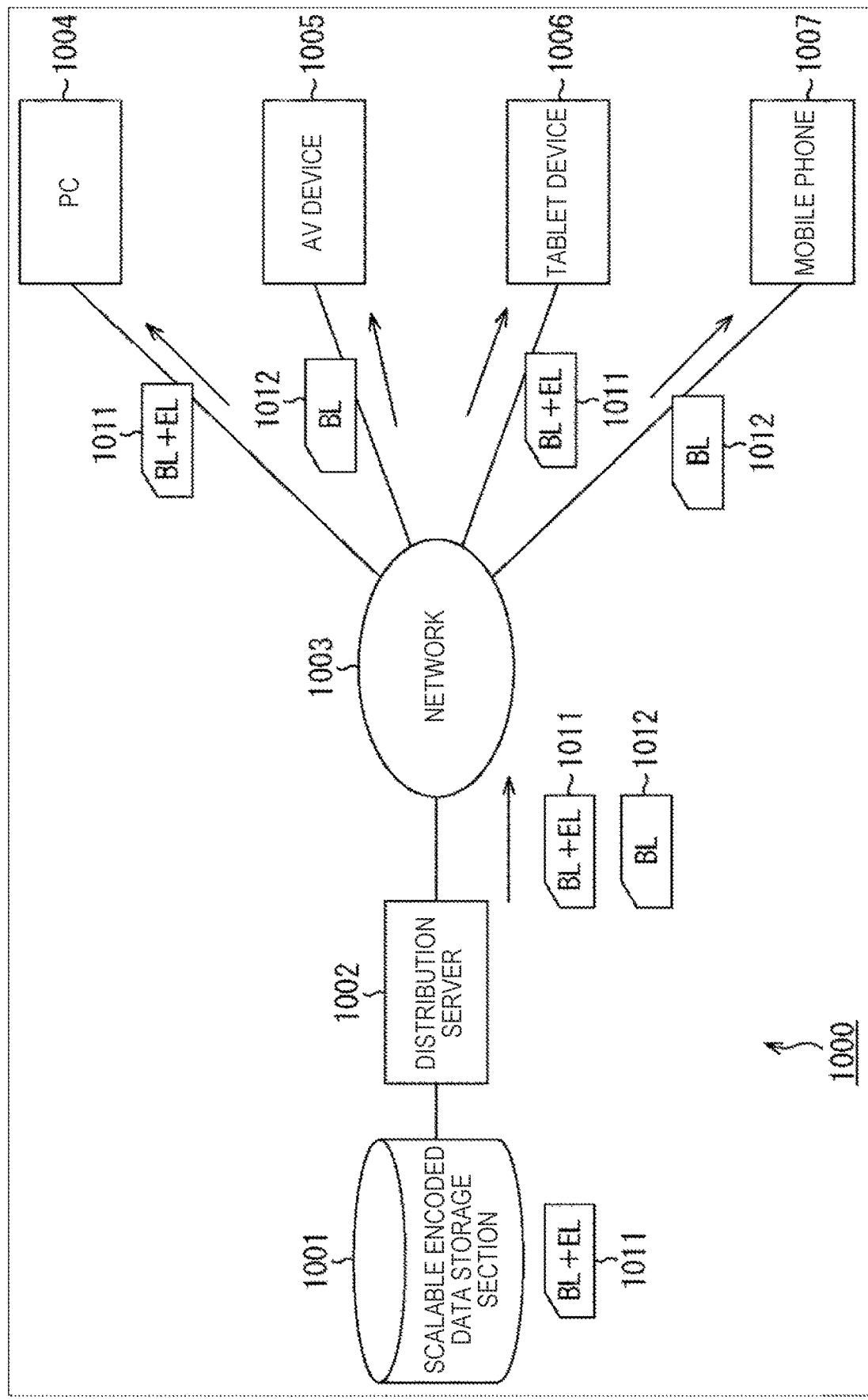
FIG. 42 is a block diagram illustrating an example of using scalable coding.

In a data transmission system 1000 illustrated in FIG. 42, a distribution server 1002 reads scalable encoded data stored in a scalable encoded data storage section 1001, and distributes the scalable encoded data to a terminal device such as a personal computer 1004, an AV device 1005, a tablet device 1006, or a mobile phone 1007 via a network 1003.

In this event, the distribution server 1002 selects and transmits encoded data having proper quality according to capability of the terminal device, communication environment, or the like. Even when the distribution server 1002 transmits unnecessarily high-quality data, a high-quality image is not necessarily obtainable in the terminal device and it may be a cause of occurrence of delay or overflow. In addition, a communication band may be unnecessarily occupied or workload of the terminal device may unnecessarily increase. In contrast, even when the distribution server 1002 transmits unnecessarily low quality data, an image with a sufficient quality may not be obtained. Thus, the distribution server 1002 appropriately reads and transmits the scalable encoded data stored in the scalable encoded data storage section 1001 as the encoded data having a proper quality according to the capability of the terminal device, the communication environment, or the like.

For example, the scalable encoded data storage section 1001 is configured to store scalable encoded data (BL+EL) 1011 in which the scalable coding is performed. The scalable encoded data (BL+EL) 1011 is encoded data including both a base layer and an enhancement layer, and is data from which a base layer image and an enhancement layer image can be obtained by performing decoding.

The distribution server 1002 selects an appropriate layer according to the capability of the terminal device for transmitting data, the communication environment, or the like, and reads the data of the selected layer. For example, with respect to the personal computer 1004 or the tablet device 1006 having high processing capability, the distribution server 1002 reads the scalable encoded data (BL+EL) 1011 from the scalable encoded data storage section 1001, and transmits the scalable encoded data (BL+EL) 1011 without change. On the other hand, for example, with respect to the AV device 1005 or the mobile phone 1007 having low processing capability, the distribution server 1002 extracts the data of the base layer from the scalable encoded data (BL+EL) 1011, and transmits the extracted data of the base layer as low quality scalable encoded data (BL) 1012 that is data having the same content as the scalable encoded data (BL+EL) 1011 but has lower quality than the scalable encoded data (BL+EL) 1011.

Because an amount of data can easily be adjusted by employing the scalable encoded data, the occurrence of delay or overflow can be suppressed or the unnecessary increase in the workload of the terminal device or the communication media can be suppressed. In addition, because a redundancy between the layers is reduced in the scalable encoded data (BL+EL) 1011, it is possible to further reduce the amount of data than when the encoded data of each layer is treated as the individual data. Therefore, it is possible to more efficiently use the storage region of the scalable encoded data storage section 1001.

Because various devices such as the personal computer 1004 to the mobile phone 1007 are applicable as the terminal device, the hardware performance of the terminal devices differs according to the device. In addition, because there are various applications which are executed by the terminal device, the software performance thereof also varies. Further, because all the communication networks including a wired, wireless, or both such as the Internet and the local area network (LAN) are applicable as the network 1003 serving as a communication medium, the data transmission performance thereof varies. Further, the data transmission performance may vary by other communications, or the like.

Therefore, the distribution server 1002 may perform communication with the terminal device which is the data transmission destination before starting the data transmission, and then obtain information related to the terminal device performance such as hardware performance of the terminal device, or the application (software) performance which is executed by the terminal device, and information related to the communication environment such as an available bandwidth of the network 1003. Then, distribution server 1002 may select an appropriate layer based on the obtained information.

Also, the extraction of the layer may be performed in the terminal device. For example, the personal computer 1004 may decode the transmitted scalable encoded data (BL+EL) 1011 and display the image of the base layer or display the image of the enhancement layer. In addition, for example, the personal computer 1004 may be configured to extract the scalable encoded data (BL) 1012 of the base layer from the transmitted scalable encoded data (BL+EL) 1011, store the extracted scalable encoded data (BL) 1012 of the base layer, transmit to another device, or decode and display the image of the base layer.

Of course, the numbers of scalable encoded data storage sections 1001, distribution servers 1002, networks 1003, and terminal devices are arbitrary. In addition, although the example of the distribution server 1002 transmitting the data to the terminal device is described above, the example of use is not limited thereto. The data transmission system 1000 is applicable to any system which selects and transmits an appropriate layer according to the capability of the terminal device, the communication environment, or the like when the scalable encoded data is transmitted to the terminal device.

In addition, by applying the present technology to the data transmission system 1000 such as FIG. 42 described above in a way similar to the application to the layer encoding and layer decoding as explained with reference to FIGS. 1 to 33, an advantageous benefit similar to that described with reference to FIGS. 1 to 33 can be obtained.

<Second System>

Figure 43:
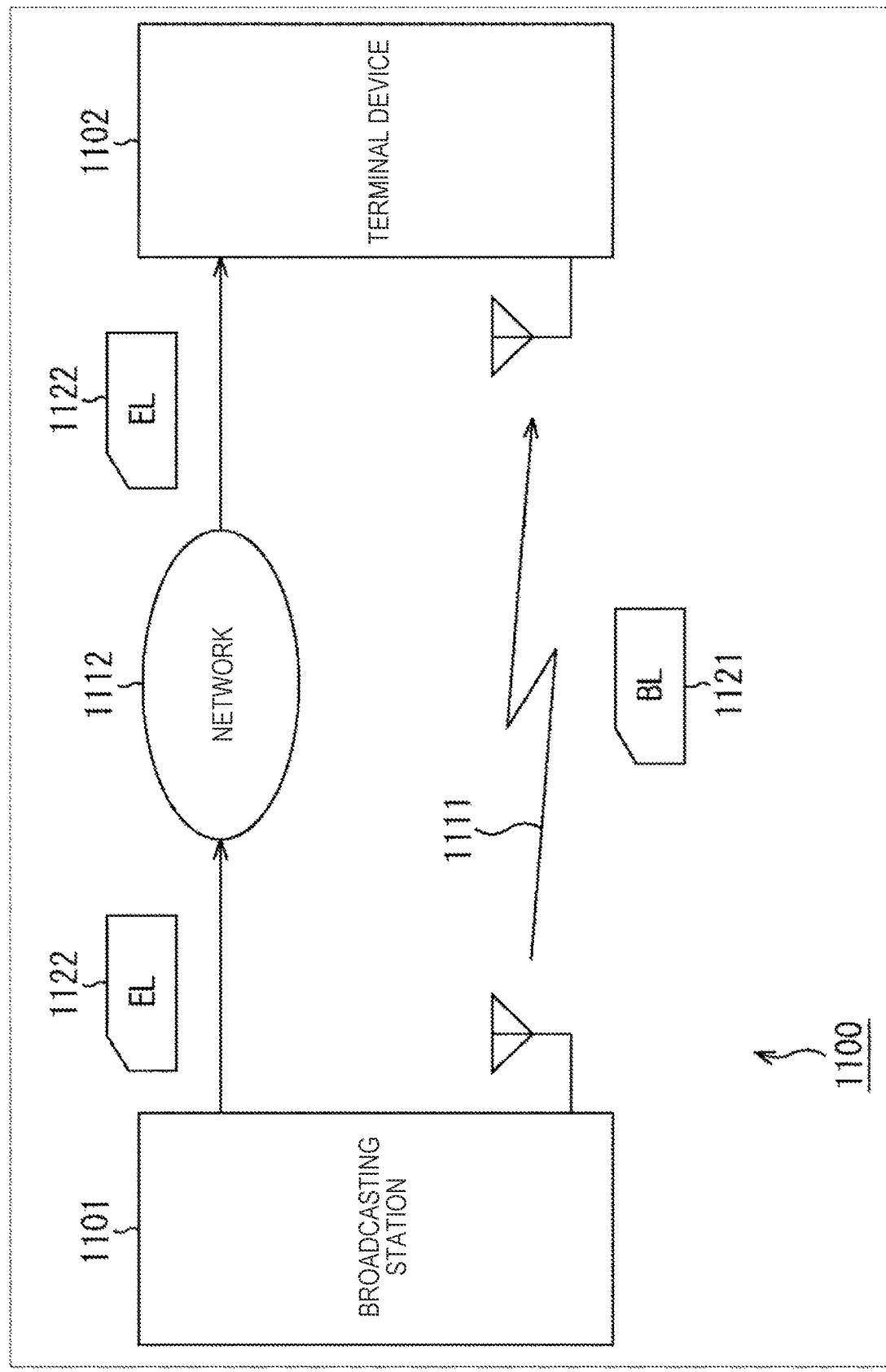
FIG. 43 is a block diagram illustrating another example of using scalable coding.

In addition, the scalable coding, for example, is used for transmission via a plurality of communication media as in an example illustrated in FIG. 43.

In a data transmission system 1100 illustrated in FIG. 43, a broadcasting station 1101 transmits scalable encoded data (BL) 1121 of the base layer by terrestrial broadcasting 1111. In addition, the broadcasting station 1101 transmits scalable encoded data (EL) 1122 of the enhancement layer via any arbitrary network 1112 made of a communication network that is wired, wireless, or both (for example, the data is packetized and transmitted).

A terminal device 1102 has a function of receiving the terrestrial broadcasting 1111 that is broadcast by the broadcasting station 1101 and receives the scalable encoded data (BL) 1121 of the base layer transmitted via the terrestrial broadcasting 1111. In addition, the terminal device 1102 further has a communication function by which the communication is performed via the network 1112, and receives the scalable encoded data (EL) 1122 of the enhancement layer transmitted via the network 1112.

For example, according to a user's instruction or the like, the terminal device 1102 decodes the scalable encoded data (BL) 1121 of the base layer acquired via the terrestrial broadcasting 1111, thereby obtaining or storing the image of the base layer or transmitting the image of the base layer to other devices.

In addition, for example, according to the users instruction, the terminal device 1102 combines the scalable encoded data (BL) 1121 of the base layer acquired via the terrestrial broadcasting 1111 and the scalable encoded data (EL) 1122 of the enhancement layer acquired via the network 1112, thereby obtaining the scalable encoded data (BL+EL), obtaining or storing the image of the enhancement layer by decoding the scalable encoded data (BL+EL), or transmitting the image of the enhancement layer to other devices.

As described above, the scalable encoded data, for example, can be transmitted via the different communication medium for each layer. Therefore, it is possible to disperse the workload and suppress the occurrence of delay or overflow.

In addition, according to the situation, the communication medium used for the transmission for each layer may be configured to be selected. For example, the scalable encoded data (BL) 1121 of the base layer in which the amount of data is comparatively large may be transmitted via the communication medium having a wide bandwidth, and the scalable encoded data (EL) 1122 of the enhancement layer in which the amount of data is comparatively small may be transmitted via the communication media having a narrow bandwidth. In addition, for example, whether the communication medium that transmits the scalable encoded data (EL) 1122 of the enhancement layer is the network 1112 or the terrestrial broadcasting 1111 may be switched according to the available bandwidth of the network 1112. Of course, what have been described above can be similarly applied to data of an arbitrary layer.

By controlling in this way, it is possible to further suppress the increase in workload in the data transmission.

Of course, the number of layers is arbitrary, and the number of communication media used in the transmission is also arbitrary. In addition, the number of terminal devices 1102 which are the destination of the data distribution is also arbitrary. Further, although the example of the broadcasting from the broadcasting station 1101 has been described above, the use example is not limited thereto. The data transmission system 1100 can be applied to any system which divides the scalable encoded data using a layer as a unit and transmits the scalable encoded data via a plurality of links.

In addition, by applying the present technology to the data transmission system 1100 such as FIG. 43 described above in a way similar to the application to the layer encoding and layer decoding as described with reference to FIGS. 1 to 33, an advantageous benefit similar to that described with reference to FIGS. 1 to 33 can be obtained.

<Third System>

Figure 44:
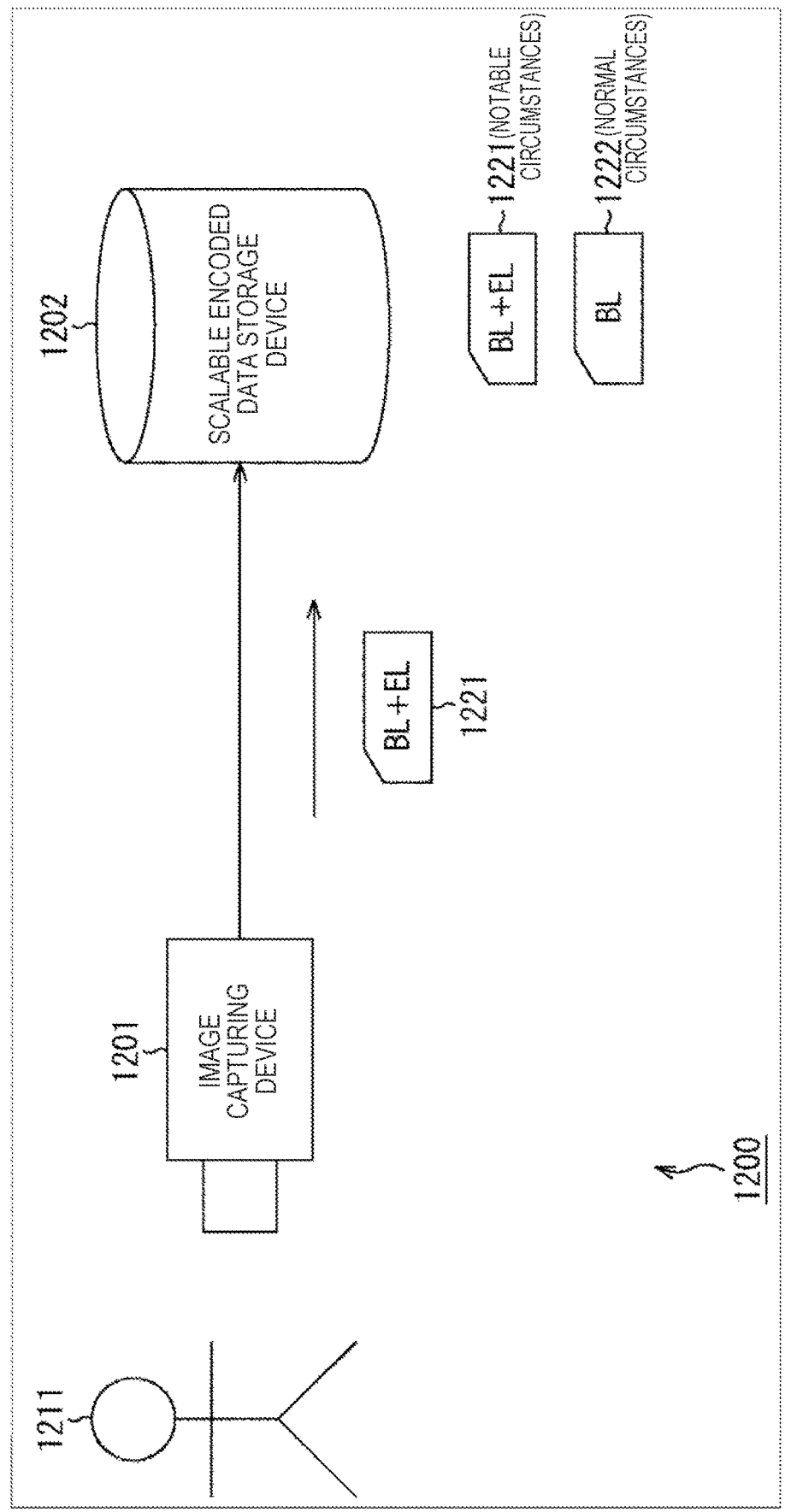
FIG. 44 is a block diagram illustrating another example of using scalable coding.

In addition, the scalable coding is used in the storage of the encoded data as an example illustrated in FIG. 44.

In an image capturing system 1200 illustrated in FIG. 44, an image capturing device 1201 performs scalable coding on image data obtained by capturing an image of a subject 1211, and supplies a scalable coding result as the scalable encoded data (BL+EL) 1221 to a scalable encoded data storage device 1202.

The scalable encoded data storage device 1202 stores the scalable encoded data (BL+EL) 1221 supplied from the image capturing device 1201 with quality according to the situation. For example, in the case of normal circumstances, the scalable encoded data storage device 1202 extracts data of the base layer from the scalable encoded data (BL+EL) 1221, and stores the extracted data as scalable encoded data (BL) 1222 of the base layer having a small amount of data at low quality. On the other hand, for example, in the case of notable circumstances, the scalable encoded data storage device 1202 stores the scalable encoded data (BL+EL) 1221 having a large amount of data at high quality without change.

In this way, because the scalable encoded data storage device 1202 can save the image at high quality only in a necessary case, it is possible to suppress the decrease of the value of the image due to the deterioration of the image quality and suppress the increase of the amount of data, and it is possible to improve the use efficiency of the storage region.

For example, the image capturing device 1201 is assumed to be a motoring camera. Because content of the captured image is unlikely to be important when a monitoring subject (for example, an invader) is not shown in the captured image (in the case of the normal circumstances), the priority is on the reduction of the amount of data, and the image data (scalable encoded data) is stored at low quality. On the other hand, because the content of the captured image is likely to be important when a monitoring target is shown as the subject 1211 in the captured image (in the case of the notable circumstances), the priority is on the image quality, and the image data (scalable encoded data) is stored at high quality.

For example, whether the case is the case of the normal circumstances or the notable circumstances may be determined by the scalable encoded data storage device 1202 by analyzing the image. In addition, the image capturing device 1201 may be configured to make a determination and transmit the determination result to the scalable encoded data storage device 1202.

A determination criterion of whether the case is the case of the normal circumstances or the notable circumstances is arbitrary and the content of the image which is the determination criterion is arbitrary. Of course, a condition other than the content of the image can be designated as the determination criterion. For example, switching may be configured to be performed according to the magnitude or waveform of recorded sound, by a predetermined time interval, or by an external instruction such as the user's instruction.

In addition, although the two states of the normal circumstances and the notable circumstances have been described above, the number of states is arbitrary, and for example, switching may be configured to be performed among three or more states such as normal circumstances, slightly notable circumstances, notable circumstances, and highly notable circumstances. However, the upper limit number of states to be switched depends upon the number of layers of the scalable encoded data.

In addition, the image capturing device 1201 may determine the number of layers of the scalable coding according to the state. For example, in the case of the normal circumstances, the image capturing device 1201 may generate the scalable encoded data (BL) 1222 of the base layer having a small amount of data at low quality and supply the data to the scalable encoded data storage device 1202. In addition, for example, in the case of the notable circumstances, the image capturing device 1201 may generate the scalable encoded data (BL+EL) 1221 of the base layer having a large amount of data at high quality and supply the data to the scalable encoded data storage device 1202.

Although the monitoring camera has been described above as the example, the usage of the image capturing system 1200 is arbitrary and is not limited to the monitoring camera.

In addition, by applying the present technology to the image capturing system 1200 such as FIG. 44 described above in a way similar to the application to the layer encoding and layer decoding as described with reference to FIGS. 1 to 33, an advantageous benefit similar to that described with reference to FIGS. 1 to 33 can be obtained.

8. Fifth Embodiment

Other Embodiments

The above embodiments have been described in connection with the example of the device, the system, and the like to which the present technology is applied, but the present technology is not limited to the above examples and may be implemented as any constituent element mounted in the device or the device configuring the system, for example, a processor serving as a system (large scale integration) LSI or the like, a module using a plurality of processors or the like, a unit using a plurality of modules or the like, a set (that is, some constituent elements of the device) in which any other function is further added to a unit, or the like.

<Video Set>

Figure 45:
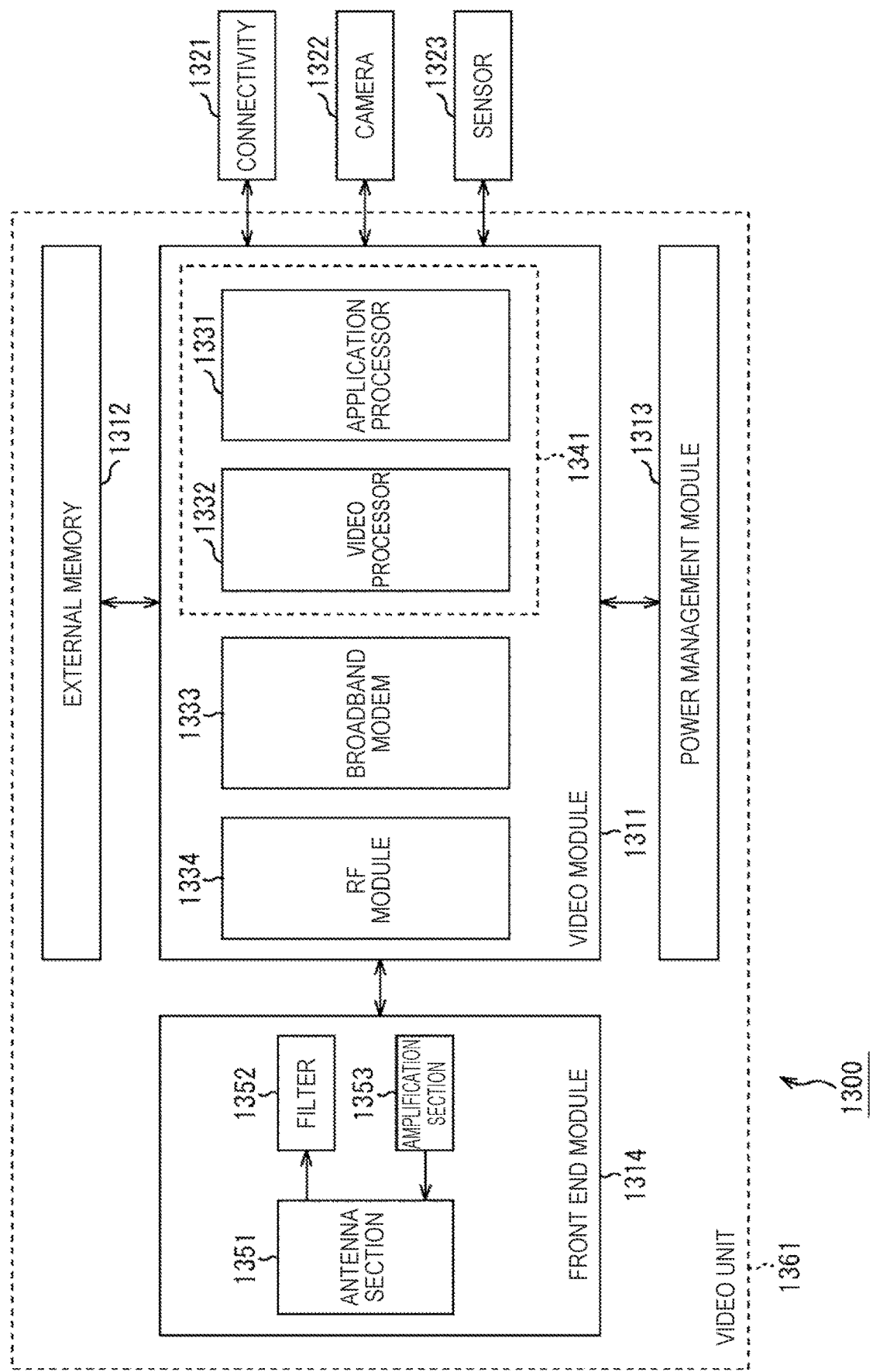
FIG. 45 is a block diagram illustrating an example of a schematic configuration of a video set.

An example in which the present technology is implemented as a set will be described with reference to FIG. 45. FIG. 45 illustrates an example of a schematic configuration of a video set to which the present technology is applied.

In recent years, functions of electronic devices have become diverse, and in development or manufacturing thereof, there are many cases in which a plurality of constituent elements having relevant functions is combined and implemented as a set having a plurality of functions as well as cases in which some constituent elements are implemented by sale, provision, or the like or provided or cases in which it is implemented as a constituent element having a single function.

A video set 1300 illustrated in FIG. 45 is a multi-functionalized configuration in which a device having a function related to image encoding and/or image decoding is combined with a device having any other function related to the function.

The video set 1300 includes a module group such as a video module 1311, an external memory 1312, a power management module 1313, and a front end module 1314 and a device having relevant functions such as connectivity 1321, a camera 1322, and a sensor 1323 as illustrated in FIG. 45.

A module is a part having a set of functions into which several relevant part functions are mutually integrated. A concrete physical configuration is arbitrary, but, for example, it is configured such that a plurality of processes having respective functions, electronic circuit elements such as a resistor and a capacitor, and other devices are arranged and integrated on a wiring substrate. Further, a new module may be obtained by combining another module or a processor with a module.

In the case of the example of FIG. 45, the video module 1311 is a combination of configurations having functions related to image processing, and includes an application processor, a video processor, a broadband modem 1333, and a radio frequency (RF) module 1334.

A processor is one in which a configuration having a certain function is integrated into a semiconductor chip through System On a Chip (SoC), and also refers to, for example, a system LSI or the like. The configuration having the certain function may be a logic circuit (hardware configuration), may be a CPU, a ROM, a RAM, and a program (software configuration) executed using the CPU, the ROM, and the RAM, and may be a combination of a hardware configuration and a software configuration. For example, a processor may include a logic circuit, a CPU, a ROM, a RAM, and the like, some functions may be implemented through the logic circuit (hardware configuration), and other functions may be implemented through a program (software configuration) executed by the CPU.

The application processor 1331 of FIG. 45 is a processor that executes an application related to image processing. An application executed by the application processor 1331 can not only perform a calculation process but can also control constituent elements inside and outside the video module 1311 such as the video processor 1332 as necessary in order to implement a certain function.

The video processor 1332 is a processor having a function related to image encoding and/or image decoding.

The broadband modem 1333 is a processor (or a module) that performs processing related to wired and/or wireless broadband communication that is performed via a broadband line such as the Internet or a public telephone line network. For example, the broadband modem 1333 performs digital modulation on data (a digital signal) to be transmitted and converts the data into an analog signal, or performs demodulation on a received analog signal and converts the analog signal into data (a digital signal). For example, the broadband modem 1333 can perform digital modulation and demodulation on arbitrary information such as image data processed by the video processor 1332, a stream including encoded image data, an application program, or setting data.

The RF module 1334 is a module that performs a frequency transform process, a modulation/demodulation process, an amplification process, a filtering process, and the like on an RF signal transmitted and received through an antenna. For example, the RF module 1334 performs, for example, a frequency transform on a baseband signal generated by the broadband modem 1333, and generates an RF signal. Further, for example, the RF module 1334 performs, for example, a frequency transform on an RF signal received through the front end module 1314, and generates a baseband signal Further, as shown by a dotted line 1341 in FIG. 45, the application processor 1331 and the video processor 1332 may be integrated into a single processor.

The external memory 1312 is a module that is installed outside the video module 1311 and has a storage device used by the video module 1311. The storage device of the external memory 1312 can be implemented by any physical configuration, but is commonly used to store large capacity data such as image data of frame units, and thus it is desirable to implement the storage device of the external memory 1312 using a relative inexpensive large-capacity semiconductor memory such as a dynamic random access memory (DRAM).

The power management module 1313 manages and controls power supply to the video module 1311 (the respective constituent elements in the video module 1311).

The front end module 1314 is a module that provides a front end function (a circuit of a transmitting and receiving end at an antenna side) to the RF module 1334. The front end module 1314 includes, for example, an antenna section 2351, a filter 1352, and an amplification section 1353 as illustrated in FIG. 45.

The antenna section 1351 includes an antenna that transmits and receives a radio signal and a peripheral configuration. The antenna section 1351 transmits a signal provided from the amplification section 1353 as a radio signal, and provides a received radio signal to the filter 1352 as an electrical signal (RF signal). The filter 1352 performs, for example, a filtering process on an RF signal received through the antenna section 1351, and provides a processed RF signal to the RF module 1334. The amplification section 1353 amplifies the RF signal provided from the RF module 1334, and provides the amplified RF signal to the antenna section 1351.

The connectivity 1321 is a module having a function related to connection with the outside. A physical configuration of the connectivity 1321 is arbitrary. For example, the connectivity 1321 includes a configuration having a communication function other than that of a communication standard supported by the broadband modem 1333, an external I/O terminal, or the like.

For example, the connectivity 1321 may include a module having a communication function based on a wireless communication standard such as Bluetooth (a registered trademark), IEEE 802.11 (for example, Wireless Fidelity (Wi-Fi) (a registered trademark)), Near Field Communication (NFC). InfraRed Data Association (IrDA), an antenna that transmits and receives a signal satisfying the standard, or the like. Further, for example, the connectivity 1321 may include a module having a communication function based on a wired communication standard such as Universal Serial Bus (USB), or High-Definition Multimedia Interface (HDMI) (a registered trademark) or a terminal that satisfies the standard. Furthermore, for example, the connectivity 1321 may include any other data (signal) transmission function or the like such as an analog I/O terminal.

Further, the connectivity 1321 may include a device of a transmission destination of data (signal). For example, the connectivity 1321 may include a drive (including a hard disk, a solid state drive (SSD), a Network Attached Storage (NAS), or the like as well as a drive of a removable medium) that reads/writes data from/in a recording medium such as a magnetic disk, an optical disc, a magneto optical disc, or a semiconductor memory. Furthermore, the connectivity 1321 may include an output device (a monitor, a speaker, or the like) that outputs images or sound.

The camera 1322 is a module having a function of photographing a subject and obtaining image data of the subject. For example, image data obtained by image capture from the camera 1322 is provided to and encoded by the video processor 1332.

The sensor 1323 is a module having an arbitrary sensor function such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. For example, data detected by the sensor 1323 is provided to the application processor 1331 and used by an application or the like.

A configuration described above as a module may be implemented as a processor, and a configuration described as a processor may be implemented as a module.

In the video set 1300 having the above configuration, the present technology can be applied to the video processor 1332 as will be described later. Thus, the video set 1300 can be implemented as a set to which the present technology is applied.

<Exemplary Configuration of Video Processor>

Figure 46:
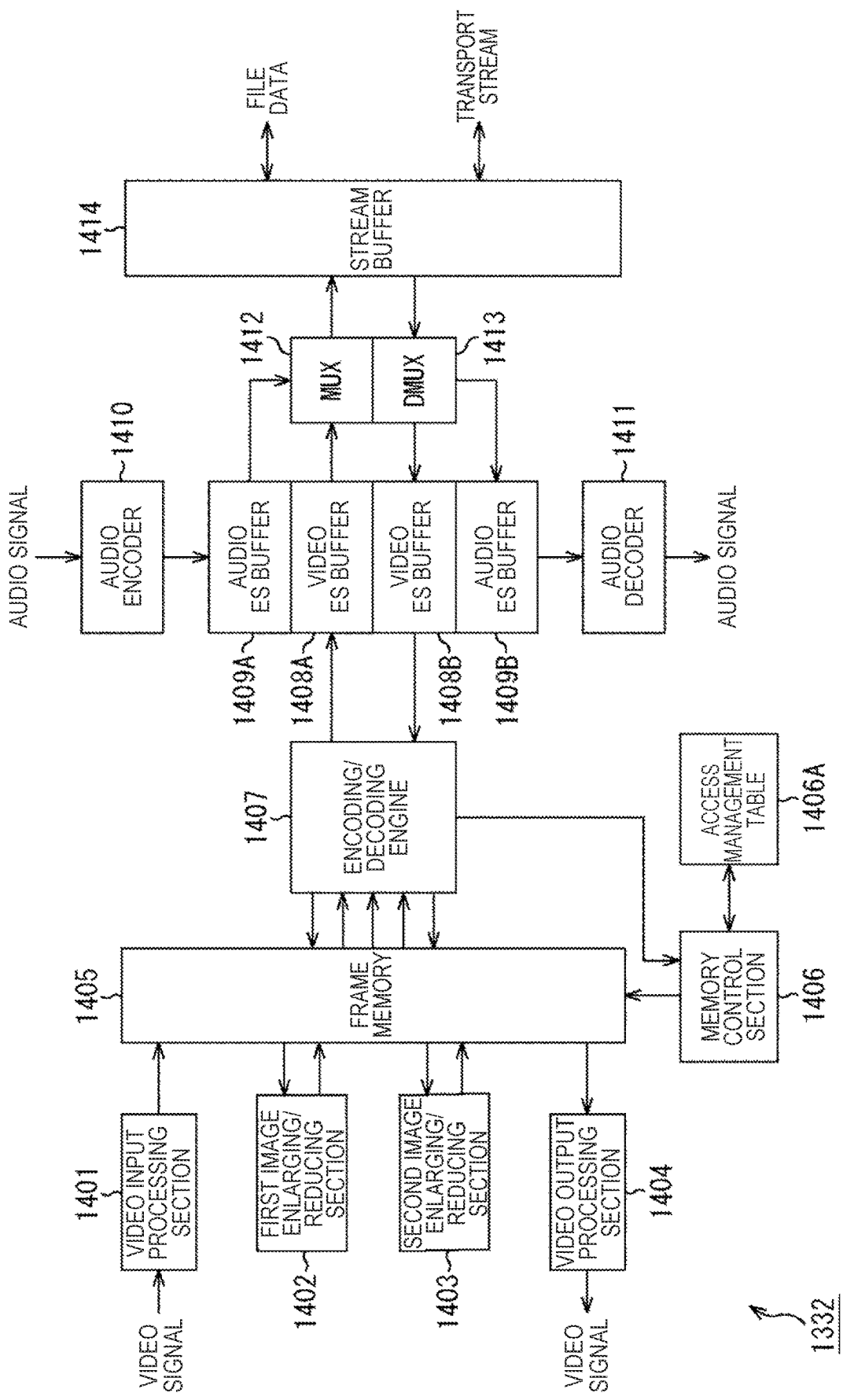
FIG. 46 is a block diagram illustrating an example of a schematic configuration of a video processor.

FIG. 46 illustrates an example of a schematic configuration of the video processor 1332 (FIG. 45) to which the present technology is applied.

In the case of the example of FIG. 46, the video processor 1332 has a function of receiving an input of a video signal and an audio signal and encoding the video signal and the audio signal according to a certain scheme and a function of decoding encoded video data and audio data, and reproducing and outputting a video signal and an audio signal The video processor 1332 includes a video input processing section 1401, a first image enlarging/reducing section 1402, a second image enlarging/reducing section 1403, a video output processing section 1404, a frame memory 1405, and a memory control section 1406 as illustrated in FIG. 46. The video processor 1332 further includes an encoding/decoding engine 1407, video elementary stream (ES) buffers 1408A and 1408B, and audio ES buffers 1409A and 1409B. The video processor 1332 further includes an audio encoder 1410, an audio decoder 1411, a multiplexer (multiplexer (MUX)) 1412, a demultiplexer (demultiplexer (DMUX)) 1413, and a stream buffer 1414.

For example, the video input processing section 1401 acquires a video signal input from the connectivity 1321 (FIG. 45) or the like, and converts the video signal into digital image data. The first image enlarging/reducing section 1402 performs, for example, a format conversion process and an image enlargement/reduction process on the image data. The second image enlarging/reducing section 1403 performs an image enlargement/reduction process on the image data according to a format of a destination to which the image data is output through the video output processing section 1404 or performs the format conversion process and the image enlargement/reduction process which are similar to those of the first image enlarging/reducing section 1402 on the image data. The video output processing section 1404 performs format conversion and conversion into an analog signal on the image data, and outputs a reproduced video signal, for example, to the connectivity 1321 (FIG. 45) or the like.

The frame memory 1405 is an image data memory that is shared by the video input processing section 1401, the first image enlarging/reducing section 1402, the second image enlarging/reducing section 1403, the video output processing section 1404, and the encoding/decoding engine 1407. The frame memory 1405 is implemented as, for example, a semiconductor memory such as a DRAM.

The memory control section 1406 receives a synchronous signal from the encoding/decoding engine 1407, and controls writing/reading access to the frame memory 1405 according to an access schedule for the frame memory 1405 written in an access management table 1406A. The access management table 1406A is updated through the memory control section 1406 according to processing executed by the encoding/decoding engine 1407, the first image enlarging/reducing section 1402, the second image enlarging/reducing section 1403, or the like.

The encoding/decoding engine 1407 performs an encoding process of encoding image data and a decoding process of decoding a video stream that is data obtained by encoding image data. For example, the encoding/decoding engine 1407 encodes image data read from the frame memory 1405, and sequentially writes the encoded image data in the video ES buffer 1408A as a video stream. Further, for example, the encoding/decoding engine 1407 sequentially reads the video stream from the video ES buffer 1408B, sequentially decodes the video stream, and sequentially writes the decoded image data in the frame memory 1405. Regarding the encoding or the decoding, the encoding/decoding engine 1407 uses the frame memory 1405 as a working area. Further, the encoding/decoding engine 1407 outputs the synchronous signal to the memory control section 1406, for example, under timing under which processing of each macroblock starts.

The video ES buffer 1408A buffers the video stream generated by the encoding/decoding engine 1407, and then provides the video stream to the multiplexer (MUX) 1412. The video ES buffer 1408B buffers the video stream provided from the demultiplexer (DMUX) 1413, and then provides the video stream to the encoding/decoding engine 1407.

The audio ES buffer 1409A buffers an audio stream generated by the audio encoder 1410, and then provides the audio stream to the multiplexer (MUX) 1412. The audio ES buffer 1409B buffers an audio stream provided from the demultiplexer (DMUX) 1413, and then provides the audio stream to the audio decoder 1411.

For example, the audio encoder 1410 converts an audio signal input from, for example, the connectivity 1321 (FIG. 45) or the like into a digital signal, and encodes the digital signal according to a certain scheme such as an MPEG audio scheme or an AudioCode number 3 (AC3) scheme. The audio encoder 1410 sequentially writes the audio stream that is data obtained by encoding the audio signal in the audio ES buffer 1409A. The audio decoder 1411 decodes the audio stream provided from the audio ES buffer 1409B, performs, for example, conversion into an analog signal, and provides a reproduced audio signal to, for example, the connectivity 1321 (FIG. 45) or the like.

The multiplexer (MUX) 1412 performs multiplexing of the video stream and the audio stream. A multiplexing method (that is, a format of a bitstream generated by multiplexing) is arbitrary. Further, in the event of multiplexing, the multiplexer (MUX) 1412 may add certain header information or the like to the bitstream. In other words, the multiplexer (MUX) 1412 may convert a stream format by multiplexing. For example, the multiplexer (MUX) 1412 multiplexes the video stream and the audio stream to be converted into a transport stream that is a bitstream of a transfer format. Further, for example, the multiplexer (MUX) 1412 multiplexes the video stream and the audio stream to be converted into data (file data) of a recording file format.

The demultiplexer (DMUX) 1413 demultiplexes the bitstream obtained by multiplexing the video stream and the audio stream by a method corresponding to the multiplexing performed by the multiplexer (MUX) 1412. In other words, the demultiplexer (DMUX) 1413 extracts the video stream and the audio stream (separates the video stream and the audio stream) from the bitstream read from the stream buffer 1414. In other words, the demultiplexer (DMUX) 1413 can perform conversion (inverse conversion of conversion performed by the multiplexer (MUX) 1412) of a format of a stream through the demultiplexing. For example, the demultiplexer (DMUX) 1413 can acquire the transport stream provided from, for example, the connectivity 1321 or the broadband modem 1333 (both FIG. 45) through the stream buffer 1414 and convert the transport stream into a video stream and an audio stream through the demultiplexing. Further, for example, the demultiplexer (DMUX) 1413 can acquire file data read from various kinds of recording media by, for example, the connectivity 1321 (FIG. 45) through the stream buffer 1414 and convert the file data into a video stream and an audio stream by the demultiplexing.

The stream buffer 1414 buffers the bitstream. For example, the stream buffer 1414 buffers the transport stream provided from the multiplexer (MUX) 1412, and provides the transport stream to, for example, the connectivity 1321 or the broadband modem 1333 (both FIG. 45) under certain timing or based on an external request or the like.

Further, for example, the stream buffer 1414 buffers file data provided from the multiplexer (MUX) 1412, provides the file data to, for example, the connectivity 1321 (FIG. 45) or the like under certain timing or based on an external request or the like, and causes the file data to be recorded in various kinds of recording media.

Furthermore, the stream buffer 1414 buffers the transport stream acquired through, for example, the connectivity 1321 or the broadband modem 1333 (both FIG. 45), and provides the transport stream to the demultiplexer (DMUX) 1413 under certain timing or based on an external request or the like.

Further, the stream buffer 1414 buffers file data read from various kinds of recording media in, for example, the connectivity 1321 (FIG. 45) or the like, and provides the file data to the demultiplexer (DMUX) 1413 under certain timing or based on an external request or the like.

Next, an operation of the video processor 1332 having the above configuration will be described. The video signal input to the video processor 1332, for example, from the connectivity 1321 (FIG. 45) or the like is converted into digital image data according to a certain scheme such as a 4:2:2Y/Cb/Cr scheme in the video input processing section 1401 and sequentially written in the frame memory 1405. The digital image data is read out to the first image enlarging/reducing section 1402 or the second image enlarging/reducing section 1403, subjected to a format conversion process of performing a format conversion into a certain scheme such as a 4:2:0Y/Cb/Cr scheme and an enlargement/reduction process, and written in the frame memory 1405 again. The image data is encoded by the encoding/decoding engine 1407, and written in the video ES buffer 1408A as a video stream.

Further, an audio signal input to the video processor 1332 from the connectivity 1321 (FIG. 45) or the like is encoded by the audio encoder 1410, and written in the audio ES buffer 1409A as an audio stream.

The video stream of the video ES buffer 1408A and the audio stream of the audio ES buffer 1409A are read out to and multiplexed by the multiplexer (MUX) 1412, and converted into a transport stream, file data, or the like. The transport stream generated by the multiplexer (MUX) 1412 is buffered in the stream buffer 1414, and then output to an external network through, for example, the connectivity 1321 or the broadband modem 1333 (both FIG. 45). Further, the file data generated by the multiplexer (MUX) 1412 is buffered in the stream buffer 1414, then output to, for example, the connectivity 1321 (FIG. 45) or the like, and recorded in various kinds of recording media.

Further, the transport stream input to the video processor 1332 from an external network through, for example, the connectivity 1321 or the broadband modem 1333 (both FIG. 45) is buffered in the stream buffer 1414 and then demultiplexed by the demultiplexer (DMUX) 1413. Further, the file data that is read from various kinds of recording media in, for example, the connectivity 1321 (FIG. 45) or the like and then input to the video processor 1332 is buffered in the stream buffer 1414 and then demultiplexed by the demultiplexer (DMUX) 1413. In other words, the transport stream or the file data input to the video processor 1332 is demultiplexed into the video stream and the audio stream through the demultiplexer (DMUX) 1413.

The audio stream is provided to the audio decoder 1411 through the audio ES buffer 1409B and decoded, and an audio signal is reproduced. Further, the video stream is written in the video ES buffer 1408B, sequentially read out to and decoded by the encoding/decoding engine 1407, and written in the frame memory 1405. The decoded image data is subjected to the enlargement/reduction process performed by the second image enlarging/reducing section 1403, and written in the frame memory 1405. Then, the decoded image data is read out to the video output processing section 1404, subjected to the format conversion process of performing format conversion to a certain scheme such as a 4:2:2Y/Cb/Cr scheme, and converted into an analog signal, and a video signal is reproduced.

When the present technology is applied to the video processor 1332 having the above configuration, it is preferable that the above embodiments of the present technology be applied to the encoding/decoding engine 1407. In other words, for example, the encoding/decoding engine 1407 preferably has the functions of the image encoding device 100 (FIG. 18) and the image decoding device 200 (FIG. 26) according to the above embodiments. Accordingly, the video processor 1332 can obtain advantageous benefits similar to the advantageous benefits described above with reference to FIGS. 1 to 33.

Further, in the encoding/decoding engine 1407, the present technology (that is, the functions of the image encoding devices or the image decoding devices according to the above embodiment) may be implemented by either or both of hardware such as a logic circuit and software such as an embedded program.

<Other Exemplary Configuration of Video Processor>

Figure 47:
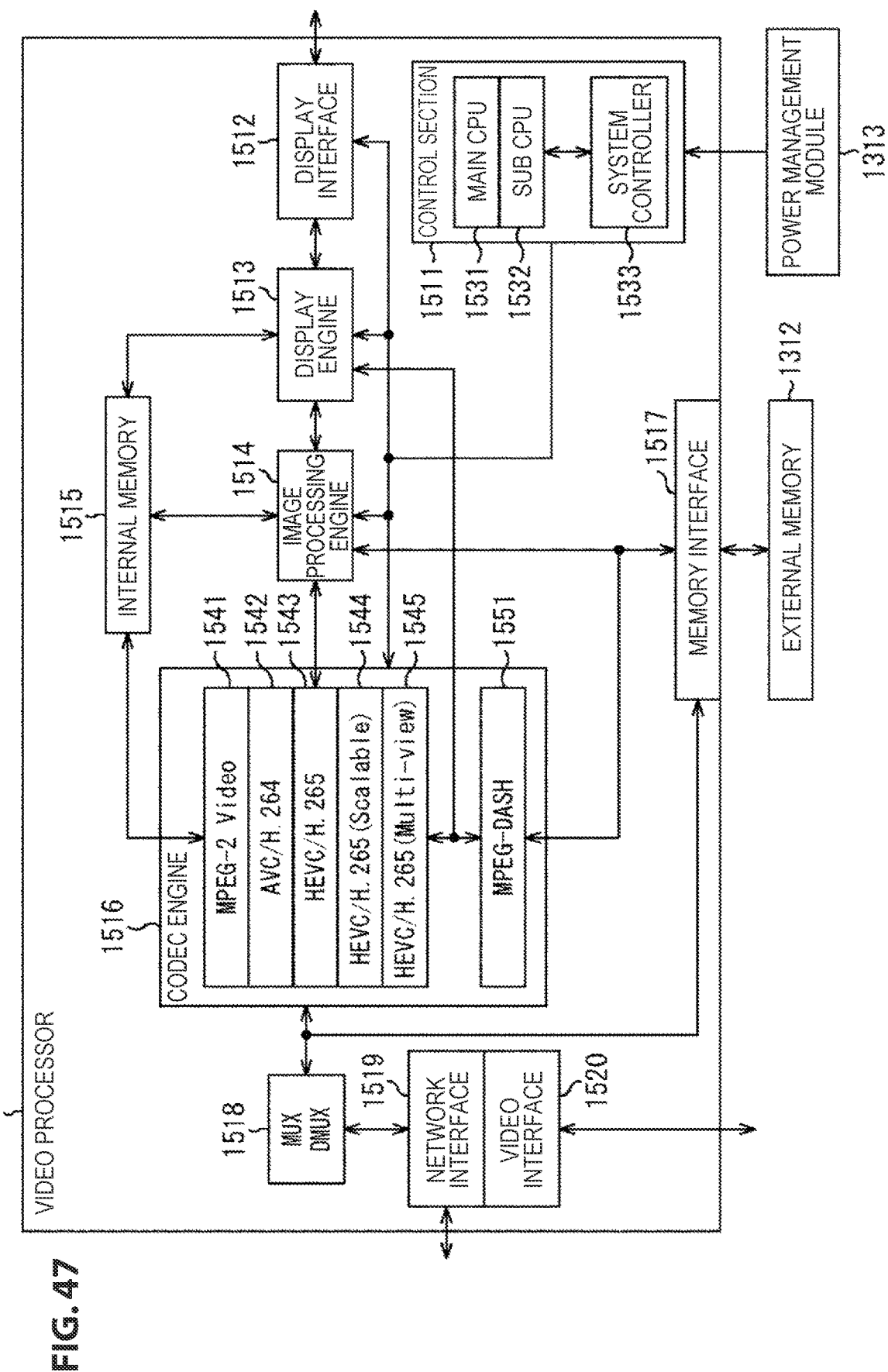
FIG. 47 is a block diagram illustrating another example of a schematic configuration of a video processor.

FIG. 47 illustrates another example of a schematic configuration of the video processor 1332 (FIG. 45) to which the present technology is applied. In the case of the example of FIG. 47, the video processor 1332 has a function of encoding and decoding video data according to a certain scheme.

More specifically, the video processor 1332 includes a control section 1511, a display interface 1512, a display engine 1513, an image processing engine 1514, and an internal memory 1515 as illustrated in FIG. 47. The video processor 1332 further includes a codec engine 1516, a memory interface 1517, a multiplexer/demultiplexer (MUX/DMUX) 1518, a network interface 1519, and a video interface 1520.

The control section 1511 controls an operation of each processing section in the video processor 1332 such as the display interface 1512, the display engine 1513, the image processing engine 1514, and the codec engine 1516.

The control section 1511 includes, for example, a main CPU 1531, a sub CPU 1532, and a system controller 1533 as illustrated in FIG. 47. The main CPU 1531 executes, for example, a program for controlling an operation of each processing section in the video processor 1332. The main CPU 1531 generates a control signal, for example, according to the program, and provides the control signal to each processing section (that is, controls an operation of each processing section). The sub CPU 1532 plays a supplementary role of the main CPU 1531. For example, the sub CPU 1532 executes a child process or a subroutine of a program executed by the main CPU 1531. The system controller 1533 controls operations of the main CPU 1531 and the sub CPU 1532, for examples, designates a program executed by the main CPU 1531 and the sub CPU 1532.

The display interface 1512 outputs image data to, for example, the connectivity 1321 (FIG. 45) or the like under control of the control section 1511. For example, the display interface 1512 converts image data of digital data into an analog signal, and outputs the analog signal to, for example, the monitor device of the connectivity 1321 (FIG. 45) as a reproduced video signal or outputs the image data of the digital data to, for example, the monitor device of the connectivity 1321 (FIG. 45).

The display engine 1513 performs various kinds of conversion processes such as a format conversion process, a size conversion process, and a color gamut conversion process on the image data under control of the control section 1511 in compliance with, for example, a hardware specification of the monitor device that displays the image.

The image processing engine 1514 performs certain image processing such as a filtering process for improving an image quality on the image data under control of the control section 1511.

The internal memory 1515 is a memory that is installed in the video processor 1332 and shared by the display engine 1513, the image processing engine 1514, and the codec engine 1516, the internal memory 1515 is used for data transfer performed among, for example, the display engine 1513, the image processing engine 1514, and the codec engine 1516. For example, the internal memory 1515 stores data provided from the display engine 1513, the image processing engine 1514, or the codec engine 1516, and provides the data to the display engine 1513, the image processing engine 1514, or the codec engine 1516 as necessary (for example, according to a request). The internal memory 1515 can be implemented by any storage device, but since the internal memory 1515 is mostly used for storage of small-capacity data such as image data of block units or parameters, it is desirable to implement the internal memory 1515 using a semiconductor memory that is relatively small in capacity (for example, compared to the external memory 1312) and fast in response speed such as a static random access memory (SRAM).

The codec engine 1516 performs processing related to encoding and decoding of image data. An encoding/decoding scheme supported by the codec engine 1516 is arbitrary, and one or more schemes may be supported by the codec engine 1516. For example, the codec engine 1516 may have a codec function of supporting a plurality of encoding/decoding schemes and perform encoding of image data or decoding of encoded data using a scheme selected from among the schemes.

In the example illustrated in FIG. 47, the codec engine 1516 includes, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551 as functional blocks of processing related to a codec.

The MPEG-2 Video 1541 is a functional block for encoding or decoding image data according to an MPEG-2 scheme. The AVC/H.264 1542 is a functional block for encoding or decoding image data according to an AVC scheme. The HEVC/H.265 1543 is a functional block for encoding or decoding image data according to an HEVC scheme. The HEVC/H.265 (Scalable) 1544 is a functional block for performing scalable coding or scalable decoding on image data according to the HEVC scheme. The HEVC/H.265 (Multi-view) 1545 is a functional block for performing multi-view encoding or multi-view decoding on image data according to the HEVC scheme.

The MPEG-DASH 1551 is a functional block for transmitting and receiving image data according to MPEG-Dynamic Adaptive Streaming over HTTP (MPEG-DASH). MPEG-DASH is a technique of streaming video using HyperText Transfer Protocol (HTTP), and has a feature of selecting an appropriate one from among a plurality of pieces of encoded data that differs in a previously prepared resolution or the like in units of segments and transmitting the one that it selects. The MPEG-DASH 1551 performs generation of a stream complying with a standard, transmission control of the stream, and the like, and uses the MPEG-2 Video 1541 to the HEVC/H.265 (Multi-view) 1545 for encoding and decoding of image data.

The memory interface 1517 is an interface for the external memory 1312. Data provided from the image processing engine 1514 or the codec engine 1516 is provided to the external memory 1312 through the memory interface 1517. Further, data read from the external memory 1312 is provided to the video processor 1332 (the image processing engine 1514 or the codec engine 1516) through the memory interface 1517.

The multiplexer/demultiplexer (MUX/DMUX) 1518 performs multiplexing and demultiplexing of various kinds of data related to an image such as a bitstream of encoded data, image data, and a video signal. The multiplexing/demultiplexing method is arbitrary. For example, in the event of multiplexing, the multiplexer/demultiplexer (MUX/DMUX) 1518 can not only combine a plurality of pieces of data into one but can also add certain header information or the like to the data. Further, in the event of demultiplexing, the multiplexer/demultiplexer (MUX/DMUX) 1518 can not only divide one piece of data into a plurality of pieces of data but can also add certain header information or the like to each divided piece of data. In other words, the multiplexer/demultiplexer (MUX/DMUX) 1518 can convert a data format through multiplexing and demultiplexing. For example, the multiplexer/demultiplexer (MUX/DMUX) 1518 can multiplex a bitstream to be converted into a transport stream serving as a bitstream of a transfer format or data (file data) of a recording file format. Of course, inverse conversion can also be performed through demultiplexing.

The network interface 1519 is an interface for, for example, the broadband modem 1333 or the connectivity 1321 (both FIG. 45). The video interface 1520 is an interface for, for example, the connectivity 1321 or the camera 1322 (both FIG. 45).

Next, an exemplary operation of the video processor 1332 will be described. For example, when the transport stream is received from the external network through, for example, the connectivity 1321 or the broadband modem 1333 (both FIG. 45), the transport stream is provided to the multiplexer/demultiplexer (MUX/DMUX) 1518 through the network interface 1519, demultiplexed, and then decoded by the codec engine 1516. Image data obtained by the decoding of the codec engine 1516 is subjected to certain image processing performed, for example, by the image processing engine 1514, subjected to certain conversion performed by the display engine 1513, and provided to, for example, the connectivity 1321 (FIG. 45) or the like through the display interface 1512, and the image is displayed on the monitor. Further, for example, image data obtained by the decoding of the codec engine 1516 is encoded by the codec engine 1516 again, multiplexed by the multiplexer/demultiplexer (MUX/DMUX) 1518 to be converted into file data, output to, for example, the connectivity 1321 (FIG. 45) or the like through the video interface 1520, and then recorded in various kinds of recording media.

Furthermore, for example, file data of encoded data obtained by encoding image data read from a recording medium (not illustrated) through the connectivity 1321 (FIG. 45) or the like is provided to the multiplexer/demultiplexer (MUX/DMUX) 1518 through the video interface 1520, and demultiplexed, and decoded by the codec engine 1516. Image data obtained by the decoding of the codec engine 1516 is subjected to certain image processing performed by the image processing engine 1514, subjected to certain conversion performed by the display engine 1513, and provided to, for example, the connectivity 1321 (FIG. 45) or the like through the display interface 1512, and the image is displayed on the monitor. Further, for example, image data obtained by the decoding of the codec engine 1516 is encoded by the codec engine 1516 again, multiplexed by the multiplexer/demultiplexer (MUX/DMUX) 1518 to be converted into a transport stream, provided to, for example, the connectivity 1321 or the broadband modem 1333 (both FIG. 45) through the network interface 1519, and transmitted to another device (not illustrated).

Further, transfer of image data or other data between the processing sections in the video processor 1332 is performed, for example, using the internal memory 1515 or the external memory 1312. Furthermore, the power management module 1313 controls, for example, power supply to the control section 1511.

When the present technology is applied to the video processor 1332 having the above configuration, it is desirable to apply the above embodiments of the present technology to the codec engine 1516. In other words, for example, it is preferable that the codec engine 1516 have a functional block for implementing the image encoding device 100 (FIG. 18) and the image decoding device 200 (FIG. 26) according to the above embodiments. Furthermore, for example, the video processor 1332 can have advantageous benefits similar to the advantageous benefits described above with reference to FIGS. 1 to 43.

Further, in the codec engine 1516, the present technology (that is, the functions of the image encoding devices or the image decoding devices according to the above embodiment) may be implemented by either or both of hardware such as a logic circuit and software such as an embedded program.

Two exemplary configurations of the video processor 1332 have been described above, but the configuration of the video processor 1332 is arbitrary and may be any configuration other than the above two exemplary configurations. Further, the video processor 1332 may be configured with a single semiconductor chip or may be configured with a plurality of semiconductor chips. For example, the video processor 1332 may be configured with a three-dimensionally stacked LSI in which a plurality of semiconductors is stacked. Further, the video processor 1332 may be implemented by a plurality of LSIs.

Application Examples to Devices

The video set 1300 may be incorporated into various kinds of devices that process image data. For example, the video set 1300 may be incorporated into the television device 900 (FIG. 38), the mobile telephone 920 (FIG. 39), the recording/reproducing device 940 (FIG. 40), the imaging device 960 (FIG. 41), or the like. As the video set 1300 is incorporated, the devices can have advantageous benefits similar to the advantageous benefits described above with reference to FIGS. 1 to 33.

Further, the video set 1300 may also be incorporated into a terminal device such as the personal computer 1004, the AV device 1005, the tablet device 1006, or the mobile telephone 1007 in the data transmission system 1000 of FIG. 42, the broadcasting station 1101 or the terminal device 1102 in the data transmission system 1100 of FIG. 43, or the imaging device 1201 or the scalable encoded data storage device 1202 in the imaging system 1200 of FIG. 44. As the video set 1300 is incorporated, the devices can have advantageous benefits similar to the advantageous benefits described above with reference to FIGS. 1 to 33. Further, the video set 1300 may be incorporated into the content reproducing system of FIG. 48 or the wireless communication system of FIG. 54.

Further, as far as including the video processor 1332, each constituent element of the video set 1300 described above can be implemented as a configuration to which the present technology is applied. For example, the video processor 1332 alone can be implemented as a video processor to which the present technology is applied. Further, for example, the processors indicated by the dotted line 1341 as described above, the video module 1311, or the like can be implemented as, for example, a processor or a module to which the present technology is applied. Further, for example, a combination of the video module 1311, the external memory 1312, the power management module 1313, and the front end module 1314 can be implemented as a video unit 1361 to which the present technology is applied.

These configurations can have advantageous benefits similar to the advantageous benefits described above with reference to FIGS. 1 to 33.

In other words, a configuration including the video processor 1332 can be incorporated into various kinds of devices that process image data, similarly to the case of the video set 1300. For example, the video processor 1332, the processors indicated by the dotted line 1341, the video module 1311, or the video unit 1361 can be incorporated into the television device 900 (FIG. 38), the mobile telephone 920 (FIG. 39), the recording/reproducing device 940 (FIG. 40), the imaging device 960 (FIG. 41), the terminal device such as the personal computer 1004, the AV device 1005, the tablet device 1006, or the mobile telephone 1007 in the data transmission system 1000 of FIG. 43, the broadcasting station 1101 or the terminal device 1102 in the data transmission system 1100 of FIG. 43, the imaging device 1201 or the scalable encoded data storage device 1202 in the imaging system 1200 of FIG. 44, or the like. Further, the configuration including the video processor 1332 may be incorporated into the content reproducing system of FIG. 48 or the wireless communication system of FIG. 54. Furthermore, by incorporating the configuration to which the present technology is applied, the devices can have advantageous benefits similar to the advantageous benefits described above with reference to FIGS. 1 to 33, similarly to the video set 1300.

The present technology can also be applied to a system of selecting appropriate data from among a plurality of pieces of encoded data having different resolutions that is prepared in advance in units of segments and using the selected data, for example, a content reproducing system of HTTP streaming or a wireless communication system of a Wi-Fi standard such as MPEG DASH which will be described later.

9. Application Example of MPEG-DASH

<Overview of Content Reproducing System>

First, a content reproducing system to which the present technology is applicable will be schematically described with reference to FIGS. 48 to 50.

A basic configuration that is common in the embodiments will be described below with reference to FIGS. 48 and 49.

Figure 48:
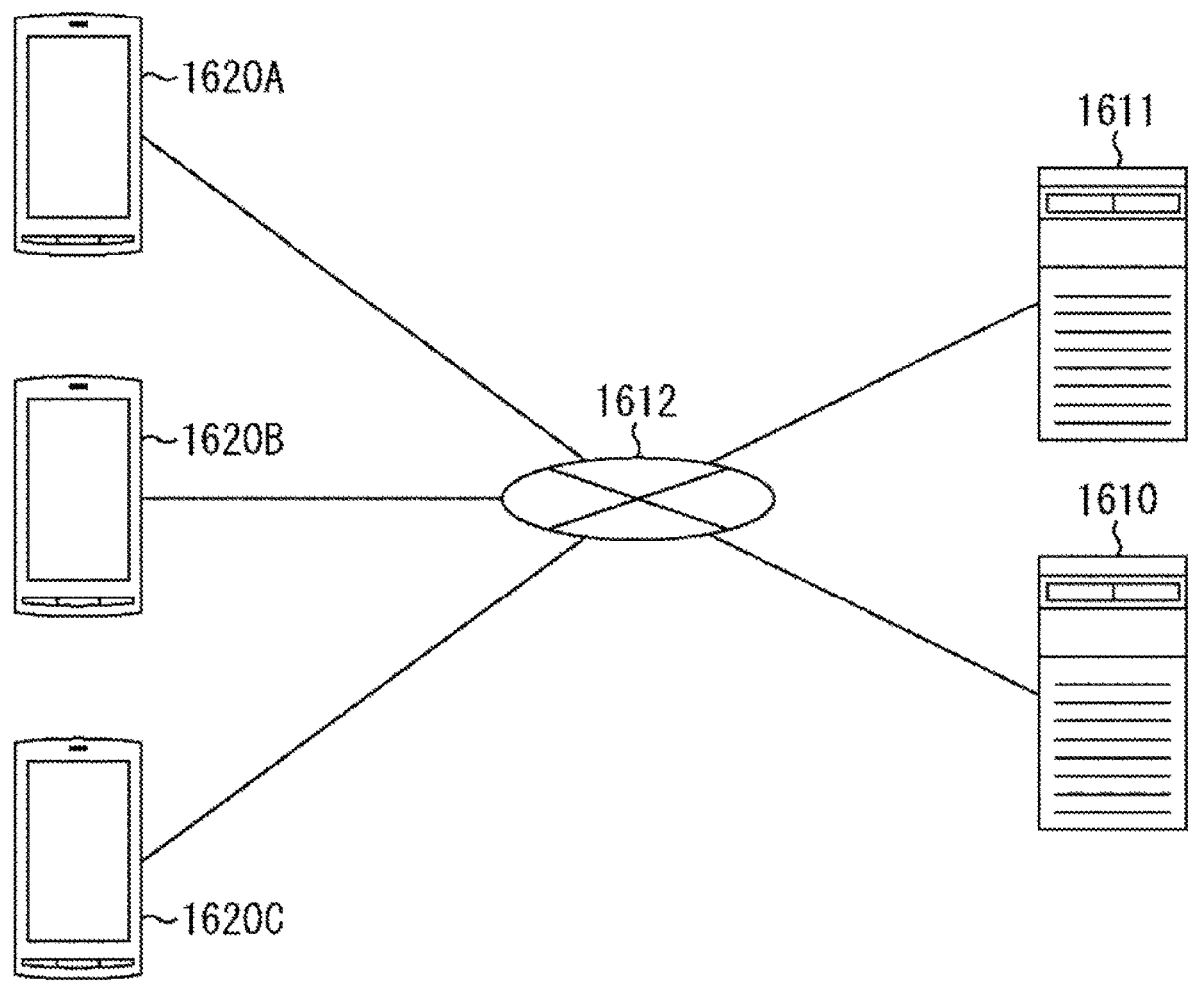
FIG. 48 is an explanatory diagram illustrating a configuration of a content reproducing system.

FIG. 48 is an explanatory diagram of a configuration of a content reproducing system. The content reproducing system includes content servers 1610 and 1611, a network 1612, and a content reproducing device 1620 (a client device) as illustrated in FIG. 48.

The content servers 1610 and 1611 are connected with the content reproducing device 1620 via the network 1612. The network 1612 is a wired or wireless transmission path of information transmitted from a device connected to the network 1612.

For example, the network 1612 may include a public line network such as the Internet, a telephone line network, or a satellite communication network, various kinds of LANs such as Ethernet (a registered trademark), a wide area network (WAN), or the like. Further, the network 1612 may include a dedicated line network such as an Internet protocol-virtual private network (IP-VPN).

The content server 1610 encodes content data, and generates and stores a data file including meta information of encoded data and encoded data. When the content server 1610 generates a data file of an MP4 format, encoded data corresponds to "mdat," and meta information corresponds to "moov."

Further, content data may be music data such as music, a lecture, or a radio program, video data such as a movie, a television program, a video program, a photograph, a document, a painting, or a graph, a game, software, or the like.

Here, the content server 1610 generates a plurality of data files for the same content at different bit rates. Further, in response to a content reproduction request received from the content reproducing device 1620, the content server 1611 includes information of a parameter added to a corresponding URL by the content reproducing device 1620 in URL information of the content server 1610, and transmits the resultant information to the content reproducing device 1620. Details on this will be described below with reference to FIG. 49.

Figure 49:
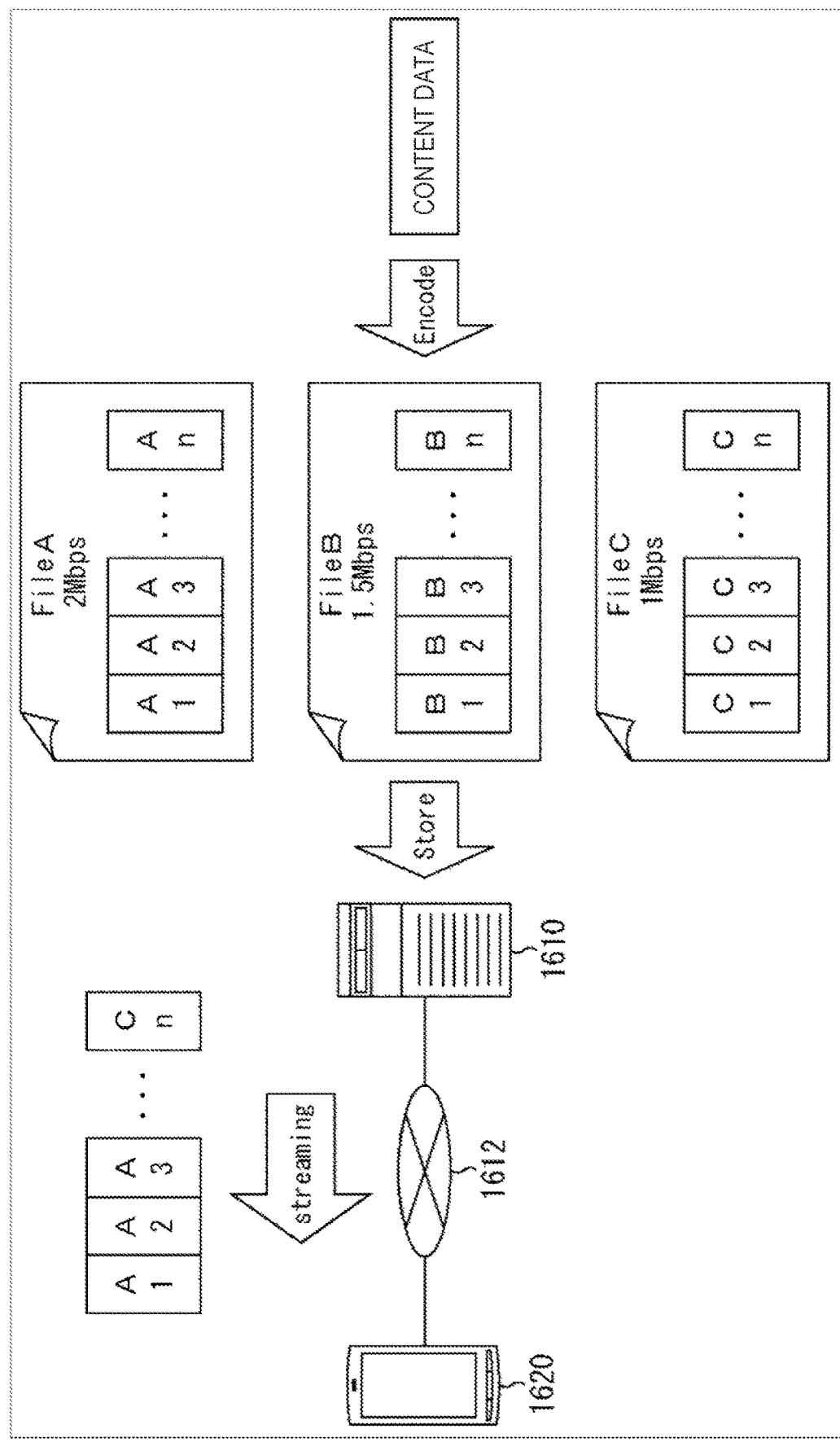
FIG. 49 is an explanatory diagram illustrating the flow of data in a content reproducing system.

FIG. 49 is an explanatory diagram of a data flow in the content reproducing system of FIG. 48. The content server 1610 encodes the same content data at different bit rates, and generates, for example, file A of 2 Mbps, file B of 1.5 Mbps, and file C of 1 Mbps as illustrated in FIG. 49. Relatively, file A has a high bit rate, file B has a standard bit rate, and file C has a low bit rate.

Further, encoded data of each file is divided into a plurality of segments as illustrated in FIG. 49. For example, encoded data of file A is divided into segments such as "A1," "A2," "A3," ..., and "An," encoded data of file B is divided into segments such as "B1," "B2," "B3," ..., and "Bn," and encoded data of file C is divided into segments such as "C1," "C2," "C3," ..., and "Cn."

Further, each segment may be configured with a configuration sample rather than one or more pieces of encoded video data and encoded audio data that starts from a sink sample of MP4 (for example, an IDR-picture in video coding of AVC/H.264) and is independently reproducible. For example, when video data of 30 frames per second is encoded by a GOP having a fixed length of 15 frames, each segment may be encoded video and audio data of 2 seconds corresponding to 4 GOPs or may be encoded video and audio data of 10 seconds corresponding to 20 GOPs.

Further, segments that are the same in an arrangement order in each file have the same reproduction ranges (ranges of a time position from the head of content). For example, the reproduction ranges of the segment "A2," the segment "B2," and the segment "C2" are the same, and when each segment is encoded data of 2 seconds, the reproduction ranges of the segment "A2," the segment "B2," and the segment "C2" are 2 to 4 seconds of content.

When file A to file C configured with a plurality of segments are generated, the content server 1610 stores file A to file C. Further, as illustrated in FIG. 49, the content server 1610 sequentially transmits segments configuring different files to the content reproducing device 1620, and the content reproducing device 1620 performs streaming reproduction on the received segments.

Here, the content server 1610 according to the present embodiment transmits a play list file (hereinafter, a "media presentation description (MPD)") including bit rate information and access information of each piece of encoded data to the content reproducing device 1620, and the content reproducing device 1620 selects any of a plurality of bit rates based on the MPD, and requests the content server 1610 to transmit a segment corresponding to the selected bit rate.

FIG. 48 illustrates only one content server 1610, but the present disclosure is not limited to this example.

Figure 50:
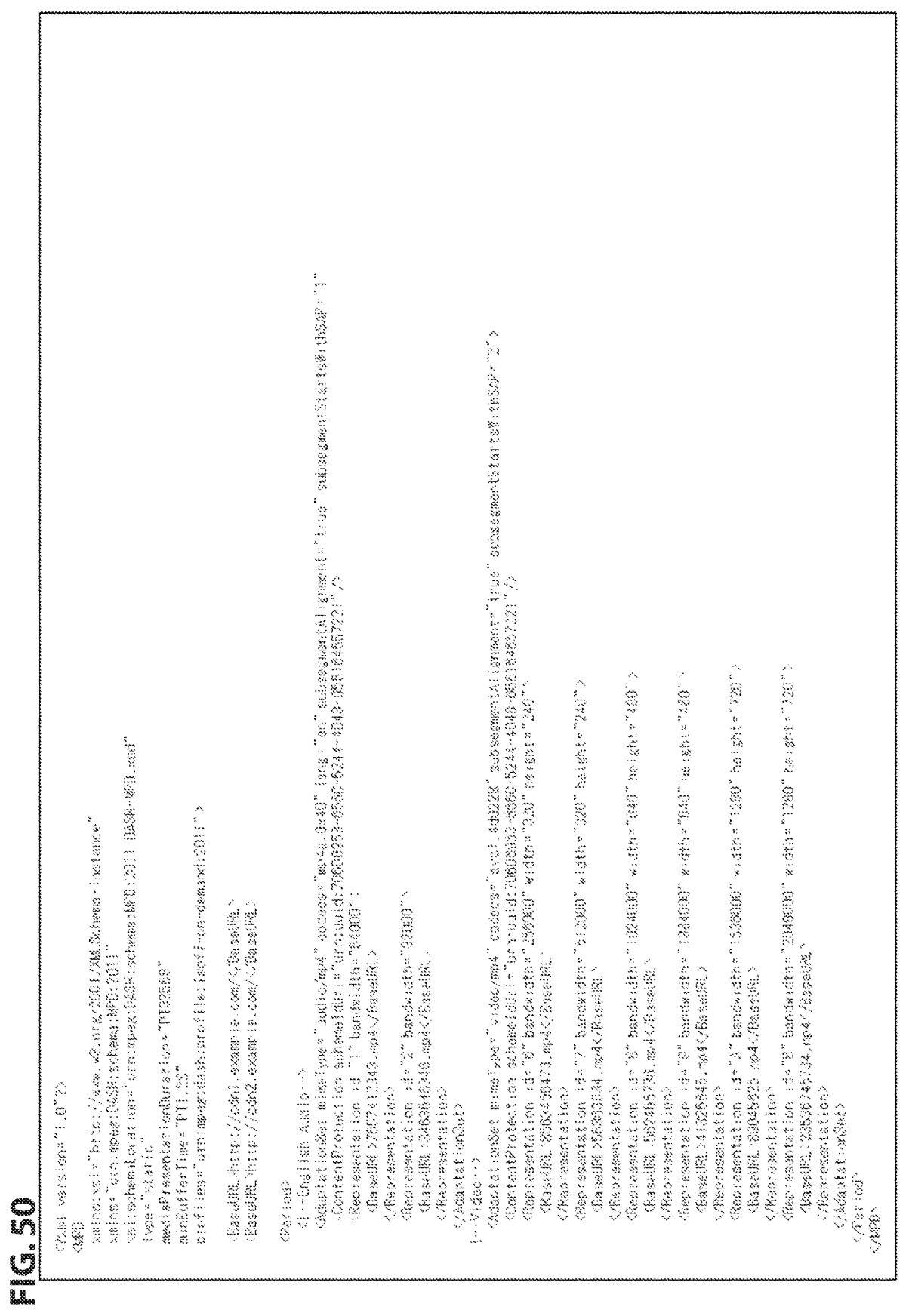

FIG. 50 is an explanatory diagram illustrating a specific example of the MPD. The MPD includes access information of a plurality of pieces of encoded data having different bit rates (bandwidths) as illustrated in FIG. 50. For example, the MPD illustrated in FIG. 50 indicates that there are encoded data of 256 Kbps, encoded data of 1.024 Mbps, encoded data of 1.384 Mbps, encoded data of 1.536 Mbps, and encoded data 2.048 Mbps, and includes access information related to each piece of encoded data. The content reproducing device 1620 can dynamically change a bit rate of encoded data that is subjected to streaming reproduction based on the MPD.

Further, FIG. 48 illustrates a mobile terminal as an example of the content reproducing device 1620, but the content reproducing device 1620 is not limited to this example. For example, the content reproducing device 1620 may be an information processing device such as a personal computer (PC), a home video processing device (a DVD recorder, a video cassette recorder (VCR)), a personal digital assistant (PDA), a home-use game machine, or a household electric appliance. Further, the content reproducing device 1620 may be an information processing device such as a mobile telephone, a personal handyphone system (PHS), a portable music player, a portable video processing device, or a portable game machine.

<Configuration of Content Server 1610>

The overview of the content reproducing system has been described above with reference to FIGS. 48 to 50. Next, a configuration of the content server 1610 will be described with reference to FIG. 51.

Figure 51:
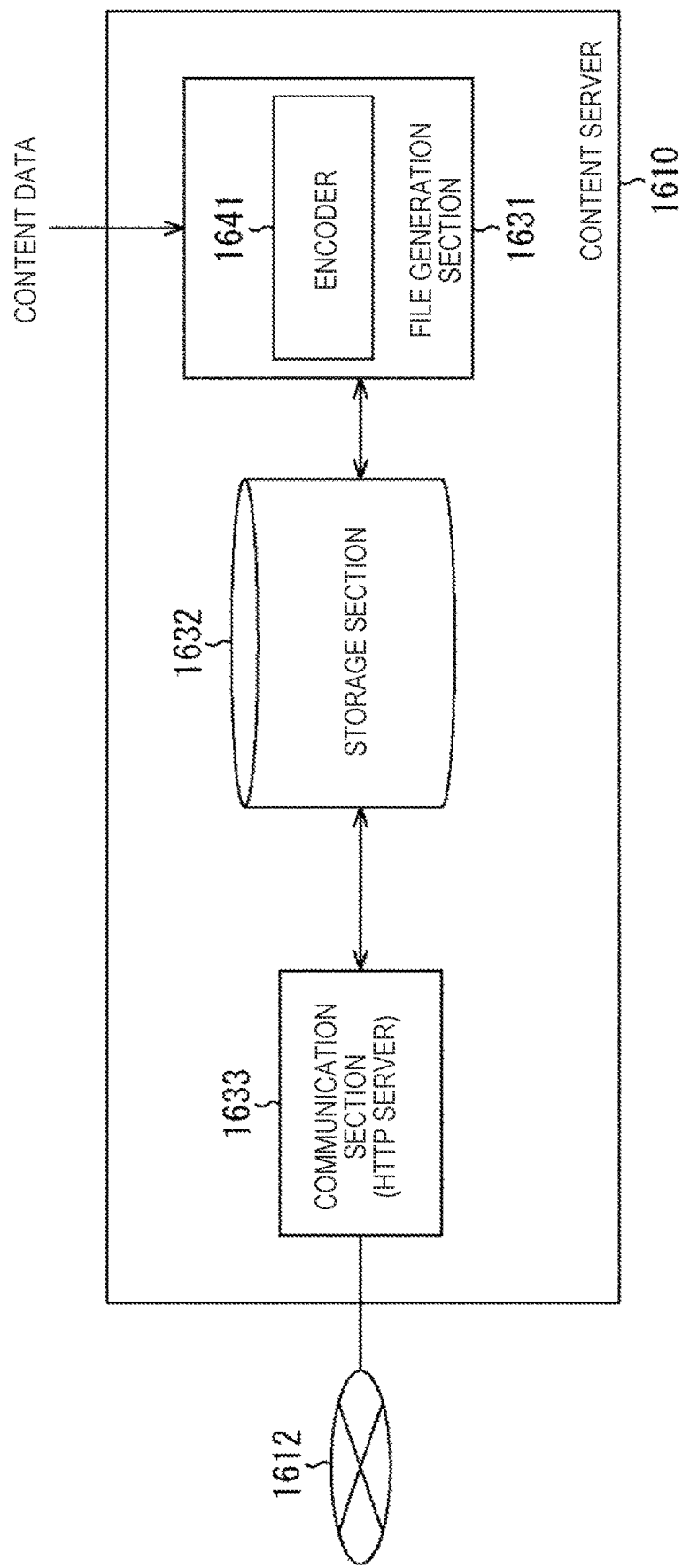
FIG. 51 is a functional block diagram illustrating a configuration of a content server of a content reproducing system.

FIG. 51 is a functional block diagram illustrating a configuration of the content server 1610. The content server 1610 includes a file generation section 1631, a storage section 1632, and a communication section 1633 as illustrated in FIG. 51.

The file generation section 1631 includes an encoder 1641 that encodes content data, and generates a plurality of pieces of encoded data having different bit rates for the same content and the MPD. For example, when encoded data of 256 Kbps, encoded data of 1.024 Mbps, encoded data of 1.384 Mbps, encoded data of 1.536 Mbps, and encoded data of 2.048 Mbps are generated, the file generation section 1631 generates the MPD illustrated in FIG. 50.

The storage section 1632 stores the plurality of pieces of encoded data having different bit rates and the MPD generated by the file generation section 1631. The storage section 1632 may be a storage medium such as a non-volatile memory, a magnetic disk, an optical disc, or a magneto optical (MO) disc. Examples of the non-volatile memory include an electrically erasable programmable read-only memory (EEPROM) and an erasable programmable ROM (EPROM). As a magnetic disk, there are a hard disk, a disk type magnetic disk, and the like. Further, as an optical disc, there are a compact disc (CD) (a digital versatile disc recordable (DVD-R), a Blu-ray Disc (BD) (a registered trademark)), and the like.

The communication section 1633 is an interface with the content reproducing device 1620, and communicates with the content reproducing device 1620 via the network 1612. In further detail, the communication section 1633 has a function as an HTTP server communicating with the content reproducing device 1620 according to HTTP. For example, the communication section 1633 transmits the MPD to the content reproducing device 1620, extracts encoded data requested based on the MPD from the content reproducing device 1620 according to the HTTP from the storage section 1632, and transmits the encoded data to the content reproducing device 1620 as an HTTP response.

<Configuration of Content Reproducing Device 1620>

The configuration of the content server 1610 according to the present embodiment has been described above. Next, a configuration of the content reproducing device 1620 will be described with reference to FIG. 52.

Figure 52:
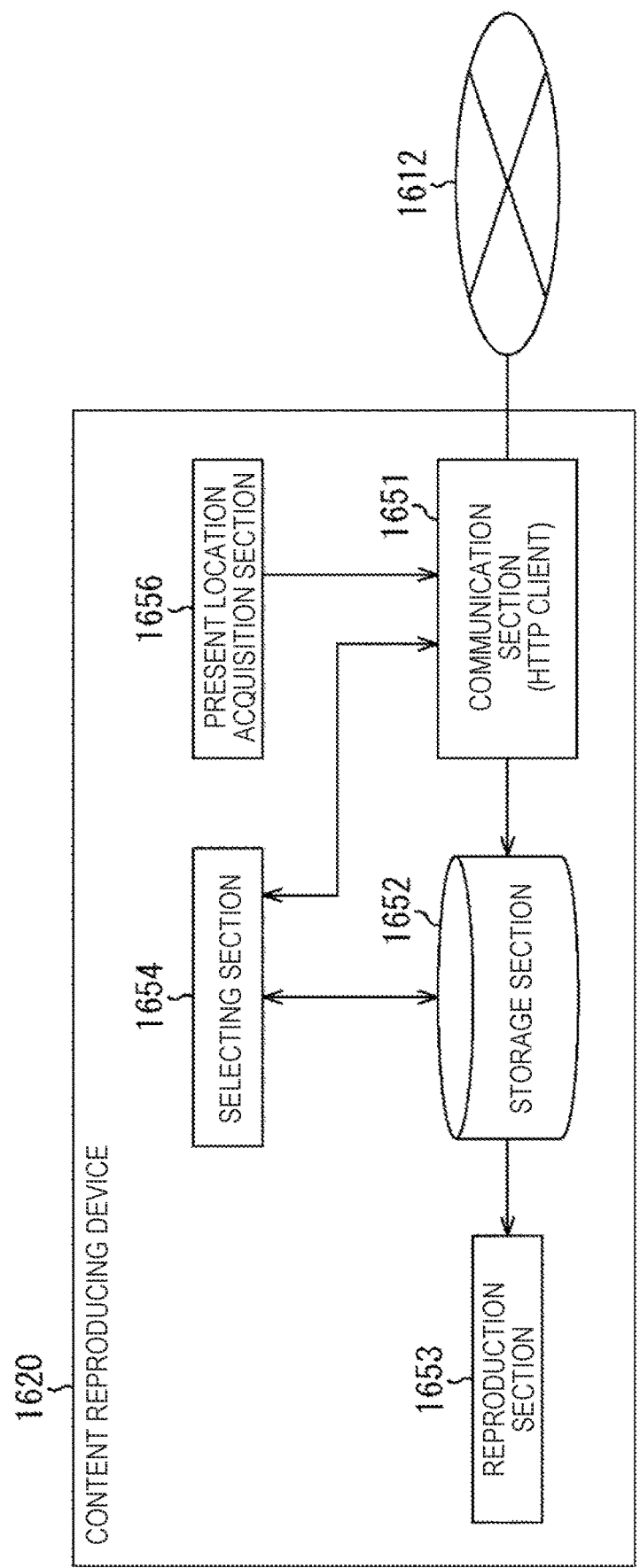
FIG. 52 is a functional block diagram illustrating a configuration of a content reproducing device of a content reproducing system.

FIG. 52 is a functional block diagram of a configuration of the content reproducing device 1620. The content reproducing device 1620 includes a communication section 1651, a storage section 1652, a reproduction section 1653, a selecting section 1654, and a present location acquisition section 1656 as illustrated in FIG. 52.

The communication section 1651 is an interface with the content server 1610, requests the content server 1610 to transmit data, and acquires data from the content server 1610. In further detail, the communication section 1651 has a function as an HTTP client communicating with the content reproducing device 1620 according to HTTP. For example, the communication section 1651 can selectively acquire the MPD and the segments of the encoded data from the content server 1610 using an HTTP range.

The storage section 1652 stores various kinds of information related to reproduction of content. For example, the segments acquired from the content server 1610 by the communication section 1651 are sequentially buffered. The segments of the encoded data buffered in the storage section 1652 are sequentially supplied to the reproduction section 1653 in a first in first out (FIFO) manner.

Further, the storage section 1652 adds a parameter to a URL through the communication section 1651 based on an instruction to add a parameter to a URL of content that is described in the MPD and requested from the content server 1611 which will be described later, and stores a definition for accessing the URL.

The reproduction section 1653 sequentially reproduces the segments supplied from the storage section 1652. Specifically, the reproduction section 1653 performs segment decoding. DA conversion, rendering, and the like.

The selecting section 1654 sequentially selects a bit rate to which a segment of encoded data to be acquired corresponds among bit rates included in the MPD in the same content. For example, when the selecting section 1654 sequentially selects the segments "A1," "B2," and "A3" according to the band frequency of the network 1612, the communication section 21651 sequentially acquires the segments "A1" "B2," and "A3" from the content server 1610 as illustrated in FIG. 49.

The present location acquisition section 1656 may be configured with a module that acquires a current position of the content reproducing device 1620, for example, acquires a current position of a Global Positioning System (GPS) receiver or the like. Further, the present location acquisition section 1656 may acquire a current position of the content reproducing device 1620 using a wireless network.

<Configuration of Content Server 1611>

Figure 53:
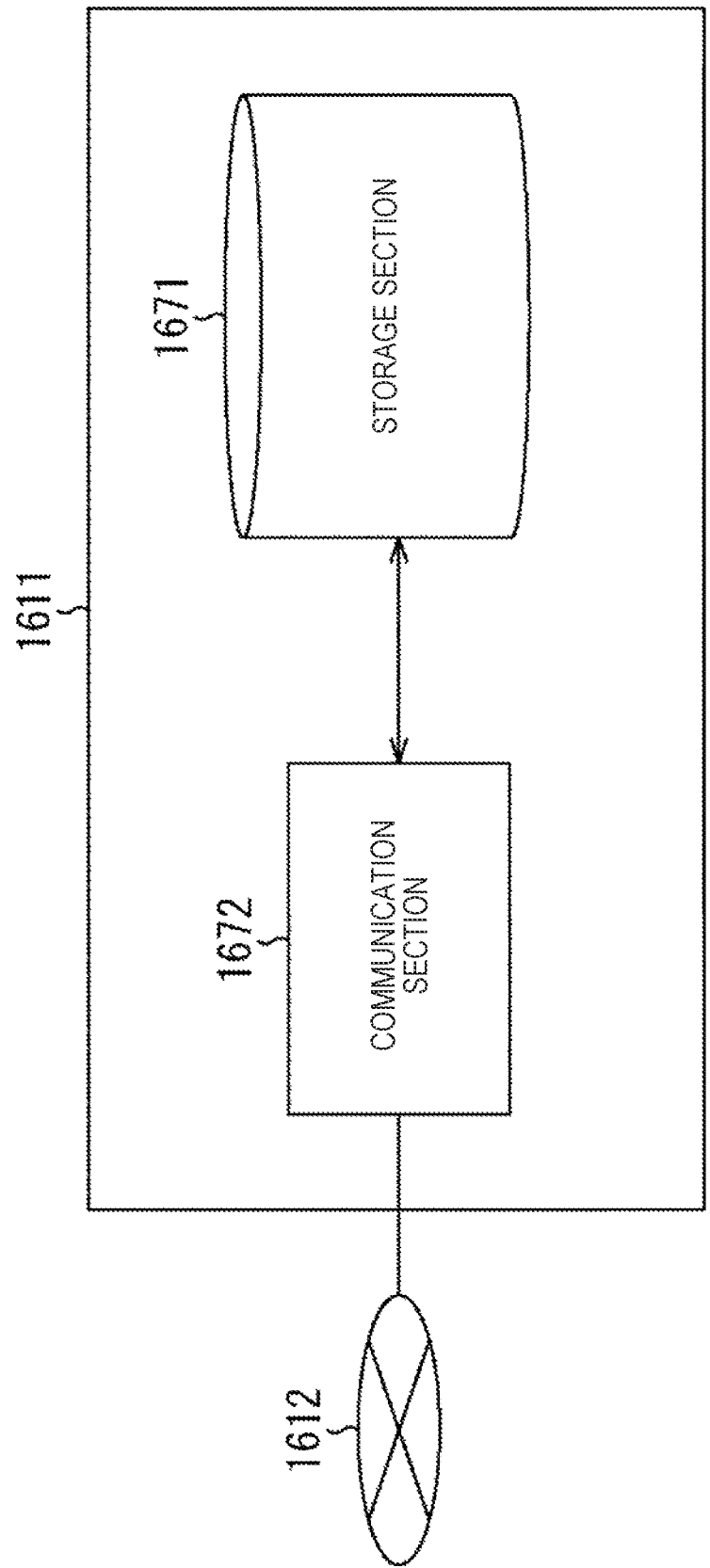
FIG. 53 is a functional block diagram illustrating a configuration of a content server of a content reproducing system.

FIG. 53 is a diagram for describing an exemplary configuration of the content server 1611. The content server 1611 includes a storage section 1671 and a communication section 1672 as illustrated in FIG. 53.

The storage section 1671 stores the URL information of the MPD. The URL information of the MPD is transmitted from the content server 1611 to the content reproducing device 1620 according to the request received from the content reproducing device 1620 that requests reproduction of content. Further, when the URL information of the MPD is provided to the content reproducing device 1620, the storage section 1671 stores definition information used when the content reproducing device 1620 adds the parameter to the URL described in the MPD.

The communication section 1672 is an interface with the content reproducing device 1620, and communicates with the content reproducing device 1620 via the network 1612. In other words, the communication section 1672 receives the request for requesting the URL information of the MPD from the content reproducing device 1620 that requests reproduction of content, and transmits the URL information of the MPD to the content reproducing device 1620. The URL of the MPD transmitted from the communication section 1672 includes information to which the parameter is added through the content reproducing device 1620.

Various settings can be performed on the parameter to be added to the URL of the MPD through the content reproducing device 1620 based on the definition information shared by the content server 1611 and the content reproducing device 1620. For example, information such as a current position of the content reproducing device 1620, a user ID of the user using the content reproducing device 1620, a memory size of the content reproducing device 1620, and the capacity of a storage of the content reproducing device 1620 may be added to the URL of the MPD through the content reproducing device 1620.

In the content reproducing system having the above configuration, as the present technology described above with reference to FIGS. 1 to 33 is applied, advantageous benefits similar to the advantageous benefits described above with reference to FIGS. 1 to 33 can be obtained.

In other words, the encoder 1641 of the content server 1610 has the function of the image encoding device 100 (FIG. 18) according to the above embodiment. Further, the reproduction section 1653 of the content reproducing device 1620 has the function of the image decoding device 200 (FIG. 26) according to the above embodiment. Thus, it is possible to suppress an increase in workload in the event of image encoding and decoding.

Further, in the content reproducing system, as data encoded according to the present technology is transmitted and received, it is possible to suppress a reduction in the encoding efficiency.

<10. Application Examples of Wireless Communication System of Wi-Fi Standard>

<Basic Operation Example of Wireless Communication Device>

A basic operation example of a wireless communication device in the wireless communication system to which the present technology is applicable will be described.

First, wireless packets are transmitted and received until a peer to peer (P2P) connection is established, and a specific application is operated.

Then, before a connection is established through a second layer, wireless packets are transmitted and received until a specific application to be used is designated, then a P2P connection is established, and a specific application is operated. Thereafter, after a connection is established through the second layer, wireless packets for activating a specific application are transmitted and received.

<Example of Communication when Operation of Specific Application Starts>

Figure 54:
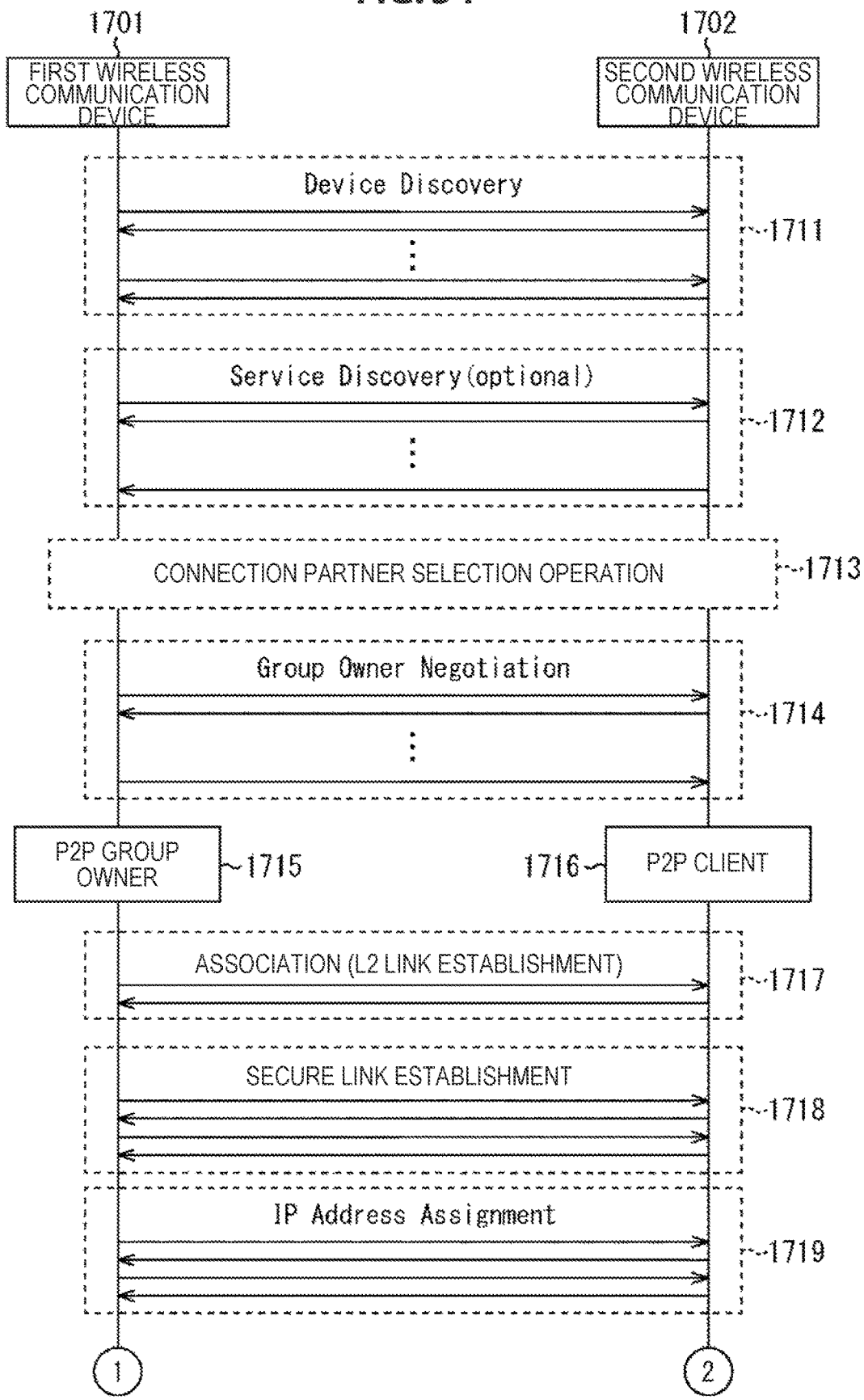
FIG. 54 is a sequence chart illustrating a communication processing example by respective devices of a wireless communication system.
Figure 55:
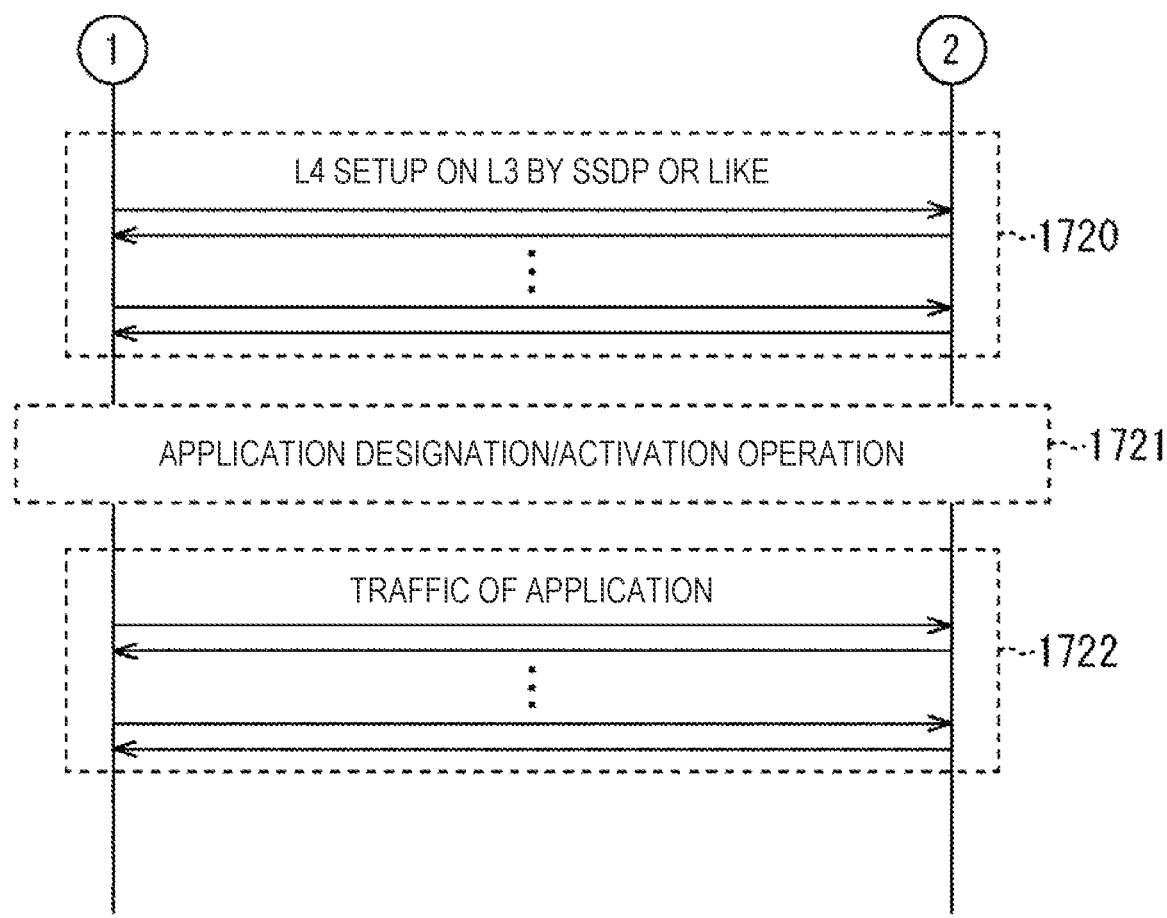
FIG. 55 is a sequence chart illustrating a communication processing example by respective devices of a wireless communication system.

FIGS. 54 and 55 are sequence charts illustrating an exemplary communication process by devices serving as the basis of wireless communication as an example of transmission and reception of wireless packets until a P2P connection is established, and a specific application is operated. Specifically, an exemplary direct connection establishment process of establishing a connection in the Wi-Fi Direct standard (which is also referred to as "Wi-Fi P2P") standardized by the Wi-Fi Alliance is illustrated.

Here, in Wi-Fi Direct, a plurality of wireless communication devices detects the presence of the wireless communication device of the other party (device discovery and service discovery). Further, when connection device selection is performed, device authentication is performed between the selected devices through Wi-Fi protected setup (WPS), and then a direct connection is established. In Wi-Fi Direct, a plurality of wireless communication devices decides whether to be a master device (a group owner) or a slave device (a client), and forms a communication group.

However, in this exemplary communication process, transmission and reception of some packets are not illustrated. For example, at the time of a first connection, packet exchange for using a WPS is unnecessary as described above, and packet exchange is also necessary in exchange of an authentication request/response or the like. However, in FIGS. 54 and 55, such packet exchange is not illustrated, and only a second connection and later are illustrated.

Further, in FIGS. 54 and 55, an exemplary communication process between a first wireless communication device 1701 and a second wireless communication device 1702 is illustrated, but what have been described above can be similarly applied to a communication process between other wireless communication devices.

First, the device discovery is performed between the first wireless communication device 1701 and the second wireless communication device 1702 (1711). For example, the first wireless communication device 1701 transmits a probe request (a response request signal), and receives a probe response (a response signal) to the probe request from the second wireless communication device 1702. Thus, the first wireless communication device 1701 and the second wireless communication device 1702 can discover the presence of the other party. Further, through the device discovery, it is possible to acquire a device name or a type (a TV, a PC, a smart phone, or the like) of the other party.

Then, the service discovery is performed between the first wireless communication device 1701 and the second wireless communication device 1702 (1712). For example, the first wireless communication device 1701 transmits a service discovery query of querying a service supported by the second wireless communication device 1702 discovered through the device discovery. Then, the first wireless communication device 1701 can acquire a service supported by the second wireless communication device 1702 by receiving a service discovery response from the second wireless communication device 1702. In other words, through the service discovery, it is possible to acquire, for example, a service executable by the other party. For example, the service executable by the other party is a service or a protocol (Digital Living Network Alliance (DLNA), Digital Media Renderer (DMR), or the like).

Then, the user performs an operation (a connection partner selection operation) of selecting a connection partner (1713). The connection partner selection operation may be performed in only one of the first wireless communication device 1701 and the second wireless communication device 1702. For example, a connection partner selection screen is displayed on a display section of the first wireless communication device 1701, and the second wireless communication device 1702 is selected on the connection partner selection screen as a connection partner according to the user's operation.

When the user performs the connection partner selection operation (1713), a group owner negotiation is performed between the first wireless communication device 1701 and the second wireless communication device 1702 (21714). In the example illustrated in FIGS. 54 and 55, as a result of the group owner negotiation, the first wireless communication device 1701 becomes a group owner 1715, and the second wireless communication device 1702 becomes a client 1716.

Then, processes (1717 to 1720) are performed between the first wireless communication device 1701 and the second wireless communication device 1702, and thus a direct connection is established. In other words, association (L2 (second layer) link establishment) (1717) and secure link establishment (1718) are sequentially performed. Further, IP address assignment (1719) and L4 setup (1720) on L3 by a simple the service discovery protocol (SSDP) are sequentially performed. Further, L2 (layer 2) indicates a second layer (a data link layer), L3 (layer 3) indicates a third layer (a network layer), and L4 (layer 4) indicates a fourth layer (a transport layer).

Then, the user performs a specific application designation operation or an activation operation (an application designation/activation operation) (1721). The application designation/activation operation may be performed in only one of the first wireless communication device 1701 and the second wireless communication device 1702. For example, an application designation/activation operation screen is displayed on a display section of the first wireless communication device 1701, and a specific application is selected on the application designation/activation operation screen according to the user's operation.

When the user performs the application designation/activation operation (1721), a specific application corresponding to application designation/activation operation is executed between the first wireless communication device 1701 and the second wireless communication device 1702 (1722).

Here, a connection is considered to be performed between access point stations (AP-STAs) within a range of a specification (a specification standardized in IEEE802.11) older than the Wi-Fi Direct standard. In this case, it is difficult to detect a device to be connected in advance before a connection is established through the second layer (in the terminology of IEEE802.11, before "association" is performed).

On the other hand, as illustrated in FIGS. 54 and 55, in Wi-Fi Direct, when a connection partner candidate is searched for through the device discovery or the service discovery (option), it is possible to acquire information of a connection partner. Examples of the information of the connection partner include a type of a basic device and a supported specific application. Further, it is possible to allow the user to select the connection partner based on the acquired information of the connection partner.

By extending this specification, it is also possible to implement a wireless communication system in which a specific application is designated before a connection is established through the second layer, a connection partner is selected, and the specific application is automatically activated after the selection. An example of a sequence of establishing a connection in this case is illustrated in FIG. 57. Further, an exemplary configuration of a frame format transmitted and received in the communication process is illustrated in FIG. 56.

<Exemplary Configuration of Frame Format>

Figure 56:
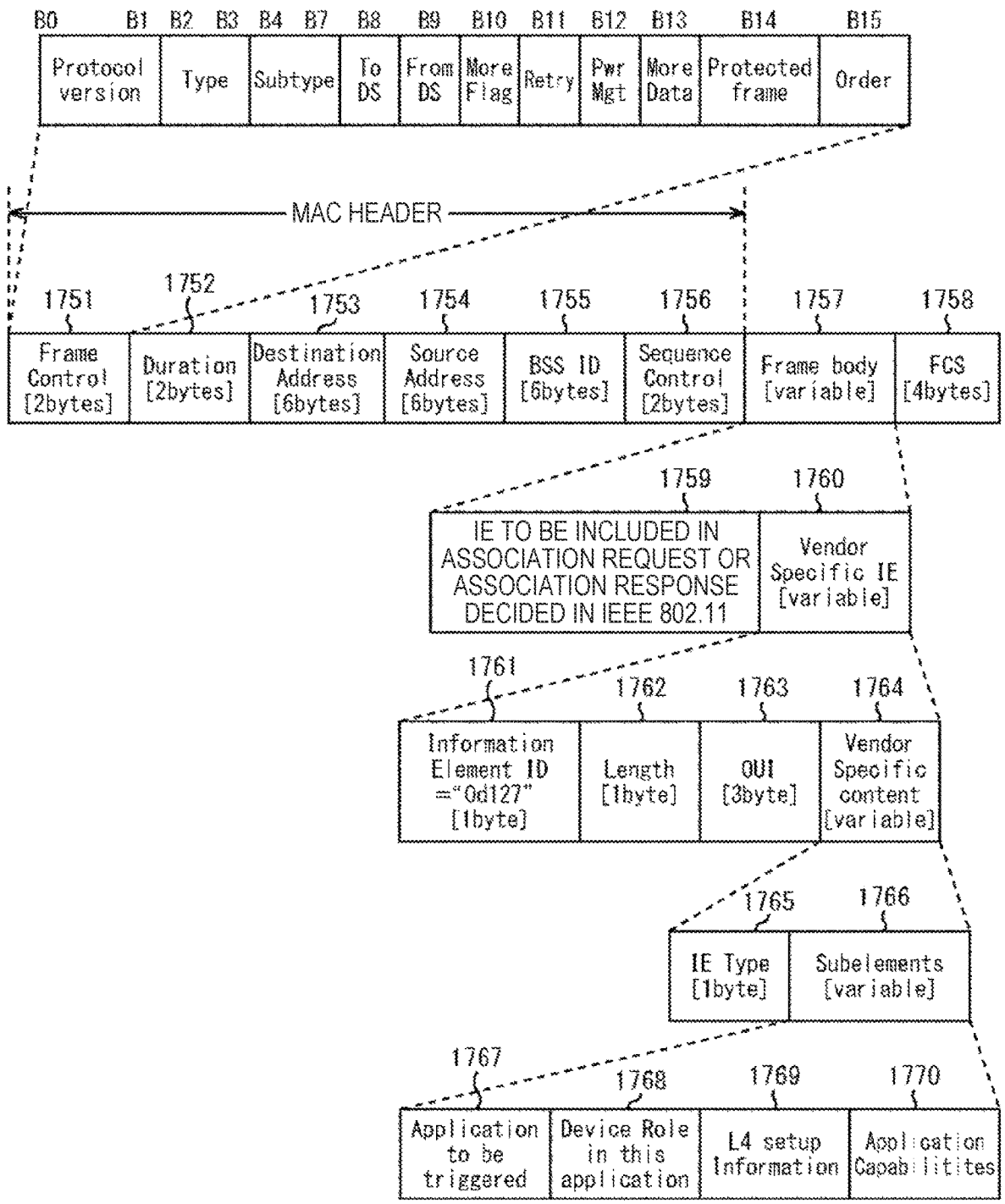
FIG. 56 is a diagram schematically illustrating an example of a configuration of a frame format transmitted and received in a communication process by respective devices of a wireless communication system.
Figure 57:
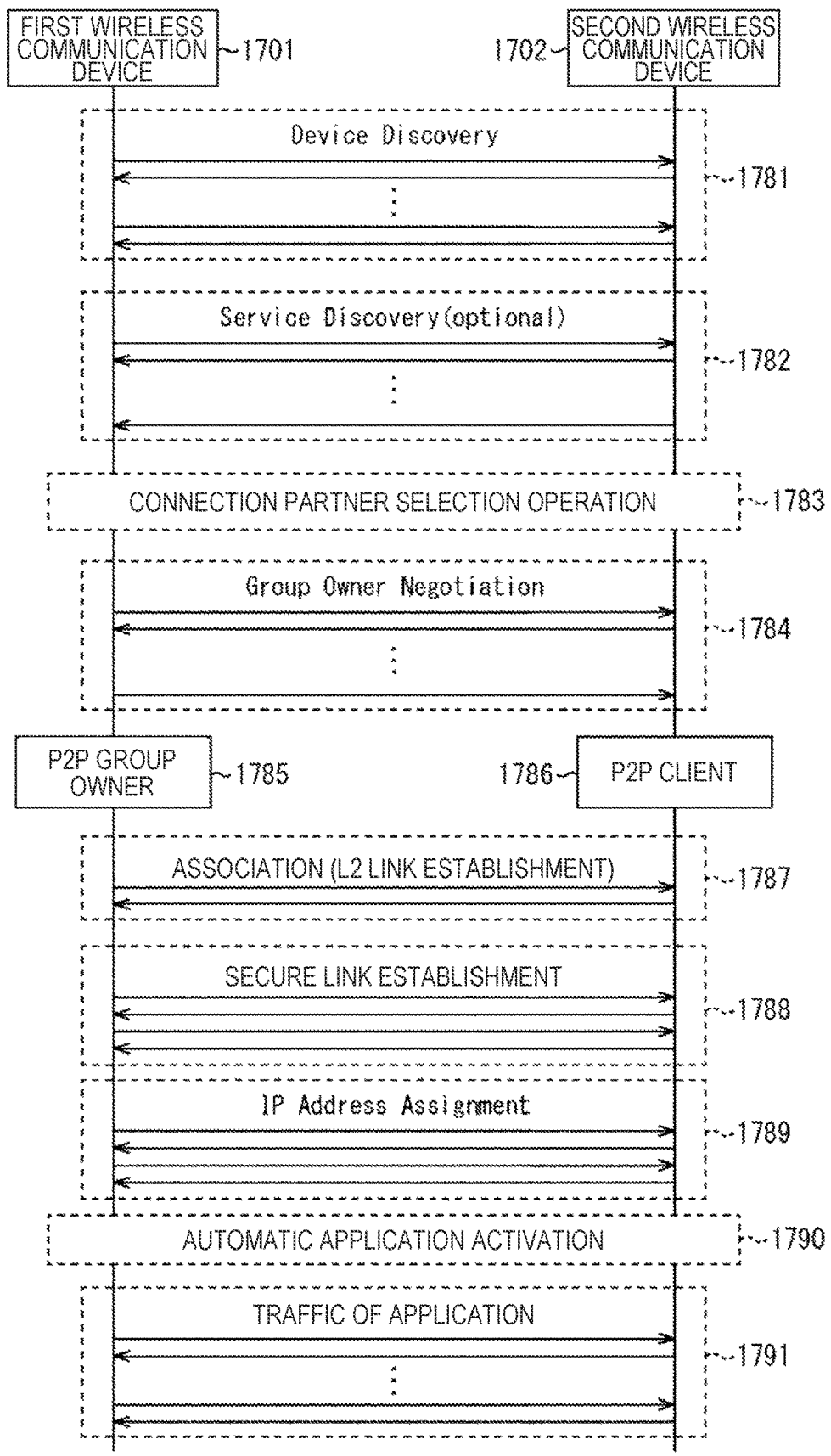
FIG. 57 is a sequence chart illustrating a communication processing example by respective devices of a wireless communication system.

FIG. 56 is a diagram schematically illustrating an exemplary configuration of a frame format transmitted and received in a communication process performed by devices serving as the basis of the present technology. In other words, FIG. 56 illustrates an exemplary configuration of an MAC frame used to establish a connection through the second layer. Specifically, an example of a frame format of an association request/response (1787) for implementing the sequence illustrated in FIG. 57 is illustrated.

A portion from the frame control (1751) to a sequence control (1756) serves as an MAC header. Further, when an association request is transmitted, B3B2="0b00" and B7B6B5B4="0b0000" are set in the frame control (1751). Further, when an association response is encapsulated, B3B2="0b00" and B7B6B5B4="0b0001" are set in the frame control (1751). Further. "0b00" is "00" in binary notation, "0b0000" is "0000" in binary notation, and "0b0001" is "0001" in binary notation.

Here, the MAC frame illustrated in FIG. 56 is basically an association request/response frame format described in sections 7.2.3.4 and 7.2.3.5 of the IEEE802.11-2007 specification. However, a difference lies in that independently extended information elements (hereinafter abbreviated as "IEs") are included in addition to IEs defined in the IEEE 802.11 specification.

Further, in order to indicate a vendor specific IE (1760), the decimal number 127 is set to an IE type (information element ID (1761)). In this case, through section 7.3.2.26 of the IEEE802.11-2007 specification, a length field (1762) and an OUI field (1763) are subsequent, and vendor specific content (1764) is subsequently arranged.

As the vendor specific content (1764), a field (IE type (1765)) indicating a type of a vendor specific IE is first set. Subsequently, a configuration capable of storing a plurality of sub elements (1766) can be considered.

As content of the sub element (1766), a name (1767) of a specific application to be used and a device role (1768) when the specific application operates can be included. Further, information (information for L4 setup) (1769) of a specific application, a port number used for control thereof, or the like and information (capability information) related to the capability in a specific application can be included. Here, for example, when a designated specific application is DLNA, the capability information is information for specifying whether or not audio transmission/reproduction is supported, whether or not video transmission/reproduction is supported, or the like.

In the wireless communication system having the above configuration, as the present technology described above with reference to FIGS. 1 to 33 is applied, advantageous benefits similar to the advantageous benefits described above with reference to FIGS. 1 to 33 can be obtained. In other words, it is possible to suppress an increase in workload in the event of image encoding and decoding. Further, in the wireless communication system, as transmission and reception of data encoded according to the present technology are performed, it is possible to suppress a reduction in the encoding efficiency.

Further, in this specification, the example in which various kinds of information are multiplexed into an encoded stream and transmitted from the encoding side to the decoding side has been described. However, a technique of transmitting the information is not limited to this example. For example, the information may be transmitted or recorded as individual data associated with an encoded bitstream without being multiplexed in the encoded stream. Here, the term "associate" refers to that an image included in the bitstream (which may be part of an image such a slice or a block) and information corresponding to the image is configured to be linked at the time of decoding. That is, the information may be transmitted on a separate transmission path from an image (or bitstream). In addition, the information may be recorded on a separate recording medium (or a separate recording area of the same recording medium) from the image (or bitstream). Further, the information and the image (or the bitstream), for example, may be associated with each other in an arbitrary unit such as a plurality of frames, one frame, or a portion within the frame.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image encoding device including:
a generation section configured to generate control information used to control a certain area in which encoding-related information, of another layer encoded for each of a plurality of certain areas obtained by dividing a picture, is referred to regarding a current layer of image data including a plurality of layers;
an encoding section configured to encode the current layer of the image data with reference to the encoding-related information of some areas of the other layer according to control of the control information generated by the generation section; and
a transmission section configured to transmit encoded data of the image data generated by the encoding section and the control information generated by the generation section.

(2)

The image encoding device according to any of (1), (3) to (9),
wherein the control information is information limiting an area in which the encoding-related information is referred to by designating an area in which reference to the encoding-related information of the other layer is permitted, designating an area in which reference to the encoding-related information is prohibited, or designating an area in which the encoding-related information is referred to.

(3)

The image encoding device according to any of (1), (2). (4) to (9),
wherein the control information designates the area using an identification number allocated in a raster scan order, information indicating positions of the area in vertical and horizontal directions in a picture, or information indicating a data position of the area in the encoded data.

(4)

The image encoding device according to any of (1) to (3) and (5) to (9),
wherein the transmission section further transmits information indicating whether or not to control an area in which the encoding-related information is referred to.

(5)

The image encoding device according to any of (1) to (4) and (6) to (9),
wherein the encoding-related information is information used for generation of a prediction image used in encoding of the image data.

(6)

The image encoding device according to any of (1) to (5) and (7) to (9),
wherein the information used for the generation of the prediction image includes information used for texture prediction of the image data and information used for syntax prediction of the image data, and
the control information is information used to independently control an area in which the information used for the texture prediction is referred to and an area in which the information used for the syntax prediction is referred to.

(7)

The image encoding device according to any of (1) to (6), (8), and (9),
wherein the generation section generates the control information for each of the plurality of certain areas obtained by dividing the picture of the current layer of the image data, and
the encoding section encodes the current layer of the image data with reference to the encoding-related information of some areas of the other layer for each of the areas according to control of the control information of each area generated by the generation section.

(8)

The image encoding device according to any of (1) to (7) and (9),
wherein the transmission section further transmits information indicating whether or not an area division of the current layer is similar to an area division of the other layer.

(9)

The image encoding device according to any of (1) to (8), wherein the area is a slice or a tile of the image data.

(10)

An image encoding method including:
generating control information used to control a certain area in which encoding-related information, of another layer encoded for each of a plurality of certain areas obtained by dividing a picture, is referred to regarding a current layer of image data including a plurality of layers;
encoding the current layer of the image data with reference to the encoding-related information of some areas of the other layer according to control of the generated control information: and
transmitting encoded data generated by encoding the image data and the generated control information.

(11)

An image decoding device including:
a reception section configured to receive encoded data of a current layer of image data including a plurality of layers and control information used to control a certain area in which encoding-related information, of another layer encoded for each of a plurality of certain areas obtained by dividing a picture of the image data, is referred to; and
a decoding section configured to decode the encoded data with reference to the encoding-related information of some areas of the other layer according to control of the control information received by the reception section.

(12)

The image decoding device according to any of (11) to (13) to (19),
wherein the control information is information limiting an area in which the encoding-related information is referred to by designating an area in which reference to the encoding-related information of the other layer is permitted, designating an area in which reference to the encoding-related information is prohibited, or designating an area in which the encoding-related information is referred to.

(13) The image decoding device according to any of (11), (12) and (14) to (19),
wherein the control information designates the area using an identification number allocated in a raster scan order, information indicating positions of the area in vertical and horizontal directions in a picture, or information indicating a data position of the area in the encoded data.

(14) The image decoding device according to any of (11) to (13) and (15) to (19),
wherein the reception section further receives information indicating whether or not to control an area in which the encoding-related information is referred to.

(15) The image decoding device according to any of (11) to (14) and (16) to (19),
wherein the encoding-related information is information used for generation of a prediction image used in decoding of the encoded data.

(16) The image decoding device according to any of (11) to (15) and (17) to (19),
wherein the information used for the generation of the prediction image includes information used for texture prediction of the image data and information used for syntax prediction of the image data, and
the control information is information used to independently control an area in which the information used for the texture prediction is referred to and an area in which the information used for the syntax prediction is referred to.

(17) The image decoding device according to any of (11) to (16), (18), and (19),
wherein the reception section receives the encoded data encoded for each of the plurality of certain areas obtained by dividing the picture of the current layer of the image data and the control information of each of the areas, and
the decoding section decodes the encoded data received by the reception section with reference to the encoding-related information of some areas of the other layer for each of the areas according to control of the control information of each area.

(18) The image decoding device according to any of (11) to (17) and (19),
wherein the reception section further receives information indicating whether or not an area division of the current layer is similar to an area division of the other layer.

(19) The image decoding device according to any of (11) to (18),
wherein the area is a slice or a tile of the image data.

(20) An image decoding method including:
receiving encoded data of a current layer of image data including a plurality of layers and control information used to control a certain area in which encoding-related information, of another layer encoded for each of a plurality of certain areas obtained by dividing a picture of the image data, is referred to; and
decoding the encoded data with reference to the encoding-related information of some areas of the other layer according to control of the received control information.

REFERENCE SIGNS LIST

100 Image encoding device
101 Base layer image encoding section
102 Enhancement layer image encoding section
103 Multiplexing unit
116 Lossless encoding section
117 Accumulation buffer
122 Frame memory
124 Intra prediction section
125 Inter prediction section
136 Lossless encoding section
137 Accumulation buffer
142 Frame memory
144 Intra prediction section
145 Inter prediction section
148 Area synchronization section
149 Up-sampling section
Base layer area division information buffer
172 Enhancement layer area division setting section
173 Area synchronization setting section
200 Image decoding device
201 Demultiplexing unit
202 Base layer image decoding section
203 Enhancement layer image decoding section
211 Accumulation buffer
212 Lossless decoding section
219 Frame memory
221 Intra prediction section
222 Inter prediction section
231 Accumulation buffer
232 Lossless decoding section
239 Frame memory
241 Intra prediction section
242 Inter prediction section
244 Area synchronization section
245 Up-sampling section
271 Base layer area division information buffer
272 Enhancement layer area division information buffer
273 Synchronization area information decoding section

The invention claimed is:

1. An image encoding device for encoding image data including a base layer and at least one enhancement layer, the image encoding device comprising:
circuitry configured to:
generate control information designating, for a tile of an enhancement layer, a permitted reference area in the base layer, wherein each of the base layer, the at least one enhancement layer, and the permitted reference area comprise one or more tiles, wherein for each of the base layer and the at least one enhancement layer a picture of the image data is divided into the tiles which are independently decodable;
encode the tile of the enhancement layer with reference to encoding-related information of the permitted reference area in the base layer according to the control information;
generate information indicating that a tile division of the enhancement layer is similar to a tile division of the base layer such that a number of tile columns and a number of tile rows of the enhancement layer is same as a number of tile columns and a number of tile rows of the base layer;

generate control information determination information serving as information used to restrict transmission of tile division information including the number of tile columns and the number of tile rows of the enhancement layer based on the information indicating that the tile division of the enhancement layer is similar to the tile division of the base layer;

generate the control information to not include the tile division information which includes the number of tile columns and the number of tile rows of the enhancement layer based on the control information determination information; and transmit encoded data of the image data and the control information which does not include the number of tile columns and the number of tile rows of the enhancement layer.

2. The image encoding device according to claim 1, wherein the control information designates the tile of the permitted reference area using an identification number allocated in a raster scan order.

3. The image encoding device according to claim 1, wherein the control information designates the tile of the permitted reference area using information indicating a position of the tile in a picture.

4. The image encoding device according to claim 1, wherein the circuitry is further configured to transmit information indicating whether or not to control a tile in which the encoding-related information is referred to.

5. The image encoding device according to claim 1, wherein the encoding-related information includes information used for generation of a prediction image used in encoding of the image data.

6. The image encoding device according to claim 5, wherein the information used for the generation of the prediction image includes information used for texture prediction of the image data and information used for syntax prediction of the image data, and the control information includes information used to independently control a tile in which the information used for the texture prediction is referred to and a tile in which the information used for the syntax prediction is referred to.

7. The image encoding device according to claim 1, wherein the control information designates a tile in which reference to the encoding-related information of the base layer is permitted.

8. The image encoding device according to claim 1, wherein the control information designates a tile in which reference to the encoding-related information of the base layer is prohibited.

9. The image encoding device according to claim 1, wherein the circuitry is further configured to:

generate the control information for each certain tile of a plurality of certain tiles obtained by dividing the picture of the enhancement layer of the image data; and encode the enhancement layer of the image data with reference to encoding-related information of some tiles of the base layer for each of the tiles according to control of the control information of each tile.

10. An image encoding method for encoding image data including a base layer and at least one enhancement layer, the method comprising:

generating control information designating, for a tile of an enhancement layer, a permitted reference area in the base layer, wherein each of the base layer, the at least one enhancement layer, and the permitted reference area comprise one or more tiles, wherein for each of the base layer and the at least one enhancement layer a picture of the image data is divided into the tiles which are independently decodable;

encoding the tile of the enhancement layer with reference to encoding-related information of the permitted reference area in the base layer according to the control information;

generating information indicating that a tile division of the enhancement layer is similar to a tile division of the base layer such that a number of tile columns and a number of tile rows of the enhancement layer is same as a number of tile columns and a number of tile rows of the base layer;

generating control information determination information serving as information used to restrict transmission of tile division information including the number of tile columns and the number of tile rows of the enhancement layer based on the information indicating that the tile division of the enhancement layer is similar to the tile division of the base layer;

generating the control information to not include the tile division information which includes the number of tile columns and the number of tile rows of the enhancement layer based on the control information determination information; and transmitting encoded data of the image data and the control information which does not include the number of tile columns and the number of tile rows of the enhancement layer.

11. An image decoding device comprising:

circuitry configured to:

receive encoded data of a tile of an enhancement layer of image data, the image data including a base layer and at least one enhancement layer, wherein each of the base layer and the at least one enhancement layer comprises one or more tiles, wherein for each of the base layer and the at least one enhancement layer a picture of the image data is divided into the tiles which are independently decodable;

receive control information designating, for the tile of the enhancement layer, a permitted reference area in the base layer, wherein reference to encoding-related information for the permitted reference area for decoding of the encoded data of the tile of the enhancement layer is permitted, wherein the permitted reference area identifies a set of tiles, wherein the control information is generated to not include tile division information which includes a number of tile columns and a number of tile rows of the enhancement layer based on control information determination information serving as information used to restrict transmission of the tile division information including the number of tile columns and the number of tile rows of the enhancement layer based on information indicating that a tile division of the enhancement layer is similar to a tile division of the base layer such that a number of tile columns and a number of tile rows of the enhancement layer is same as a number of tile columns and a number of tile rows of the base layer; and decode the encoded data with reference to the permitted reference area according to control of the control information which does not include the number of tile columns and the number of tile rows of the enhancement layer.

12. The image decoding device according to claim 11, wherein the control information designates the set of tiles using an identification number allocated in a raster scan order, information indicating positions of the tile in vertical and horizontal directions in a picture, or information indicating a data position of the tile in the encoded data.

13. The image decoding device according to claim 11, wherein the circuitry is further configured to receive information indicating whether it is possible to detect the tile division of the enhancement layer with reference to the tile division of the base layer.

14. The image decoding device according to claim 11, wherein the control information designates a tile in which the encoding-related information of the base layer is referred to.

15. An image decoding method comprising:

receiving encoded data of a tile of an enhancement layer of image data, the image data including a base layer and at least one enhancement layer, wherein each of the base layer and the at least one enhancement layer comprises one or more tiles, wherein for each of the base layer and the at least one enhancement layer a picture of the image data is divided into the tiles which are independently decodable;

receiving control information designating, for the tile of the enhancement layer, a permitted reference area in the base layer, wherein reference to encoding-related information for the permitted reference area for decoding of the encoded data of the tile of the enhancement layer is permitted, wherein the permitted reference area identifies a set of tiles, wherein the control information is generated to not include tile division information which includes a number of tile columns and a number of tile rows of the enhancement layer based on control information determination information serving as information used to restrict transmission of the tile division information including the number of tile columns and the number of tile rows of the enhancement layer based on information indicating that a tile division of the enhancement layer is similar to a tile division of the base layer such that a number of tile columns and a number of tile rows of the enhancement layer is same as a number of tile columns and a number of tile rows of the base layer; and decoding the encoded data with reference to the permitted reference area according to control of the control information which does not include the number of tile columns and the number of tile rows of the enhancement layer.

* * * * *